United States Patent
Ito et al.

(10) Patent No.: US 10,058,779 B2
(45) Date of Patent: Aug. 28, 2018

(54) GAME APPARATUS, STORAGE MEDIUM HAVING GAME PROGRAM STORED THEREON, GAME SYSTEM, AND GAME PROCESSING METHOD

(71) Applicant: NINTENDO CO., LTD., Kyoto (JP)

(72) Inventors: Jun Ito, Kyoto (JP); Shintaro Jikumaru, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/587,671

(22) Filed: May 5, 2017

(65) Prior Publication Data

US 2017/0348598 A1    Dec. 7, 2017

(30) Foreign Application Priority Data

Jun. 7, 2016 (JP) ................................. 2016-113214

(51) Int. Cl.
| | |
|---|---|
| A63F 9/24 | (2006.01) |
| A63F 13/428 | (2014.01) |
| A63F 13/211 | (2014.01) |
| A63F 13/2145 | (2014.01) |
| A63F 13/25 | (2014.01) |

(52) U.S. Cl.
CPC .......... *A63F 13/428* (2014.09); *A63F 13/211* (2014.09); *A63F 13/2145* (2014.09); *A63F 13/25* (2014.09); *A63F 2300/105* (2013.01)

(58) Field of Classification Search
None
See application file for complete search history.

(56) References Cited

U.S. PATENT DOCUMENTS

| 6,072,467 A | 6/2000 | Walker |
| 2002/0065121 A1* | 5/2002 | Fukunaga ............... A63F 13/08 463/8 |
| 2002/0072418 A1* | 6/2002 | Masuyama ........... A63F 13/422 463/43 |
| 2006/0146009 A1 | 7/2006 | Syrbe et al. |

(Continued)

FOREIGN PATENT DOCUMENTS

JP    2008-067865    3/2008

OTHER PUBLICATIONS

Office Action dated Dec. 12, 2017 issued in U.S. Appl. No. 15/677,144 (15 pgs.).

(Continued)

*Primary Examiner* — Jason Yen
(74) *Attorney, Agent, or Firm* — Nixon & Vanderhye P.C.

(57) ABSTRACT

When a first swing input is determined to have been made in a first movement start-possible state, in which a first object is allowed to start moving, and when the first object is put into the first movement start-possible state within a predetermined time period after the first swing input is determined to have been made, the first object is started to move in a virtual space based on at least the first swing input; and when a second swing input is determined to have been made in a second movement start-possible state, in which a second object is allowed to start moving, and when the second object is put into the second movement start-possible state within a predetermined time period after the second swing input is determined to have been made, the second object is started to move based on at least the second swing input.

20 Claims, 22 Drawing Sheets

(56) References Cited

U.S. PATENT DOCUMENTS

| | | | |
|---|---|---|---|
| 2008/0064498 A1 | 3/2008 | Okamura | |
| 2008/0119269 A1 | 5/2008 | Nonaka et al. | |
| 2008/0125224 A1* | 5/2008 | Pollatsek | A63F 13/10 |
| | | | 463/36 |
| 2009/0005166 A1* | 1/2009 | Sato | A63F 13/06 |
| | | | 463/37 |
| 2009/0093307 A1* | 4/2009 | Miyaki | A63F 13/06 |
| | | | 463/37 |
| 2010/0081506 A1* | 4/2010 | Yoshikawa | A63F 13/04 |
| | | | 463/37 |
| 2010/0113153 A1* | 5/2010 | Yen | A63F 13/06 |
| | | | 463/37 |
| 2012/0040759 A1* | 2/2012 | Ito | A63F 13/428 |
| | | | 463/37 |
| 2012/0086631 A1* | 4/2012 | Osman | A63F 13/655 |
| | | | 345/156 |
| 2012/0302345 A1* | 11/2012 | Shikata | A63F 13/5252 |
| | | | 463/36 |
| 2013/0109477 A1 | 5/2013 | Ito et al. | |
| 2015/0153381 A1 | 6/2015 | Pollatsek | |
| 2016/0364910 A1 | 12/2016 | Higgins | |

OTHER PUBLICATIONS

Office Action in the corresponding U.S. Appl. No. 15/677,144 dated May 8, 2018.

\* cited by examiner

F I G. 8
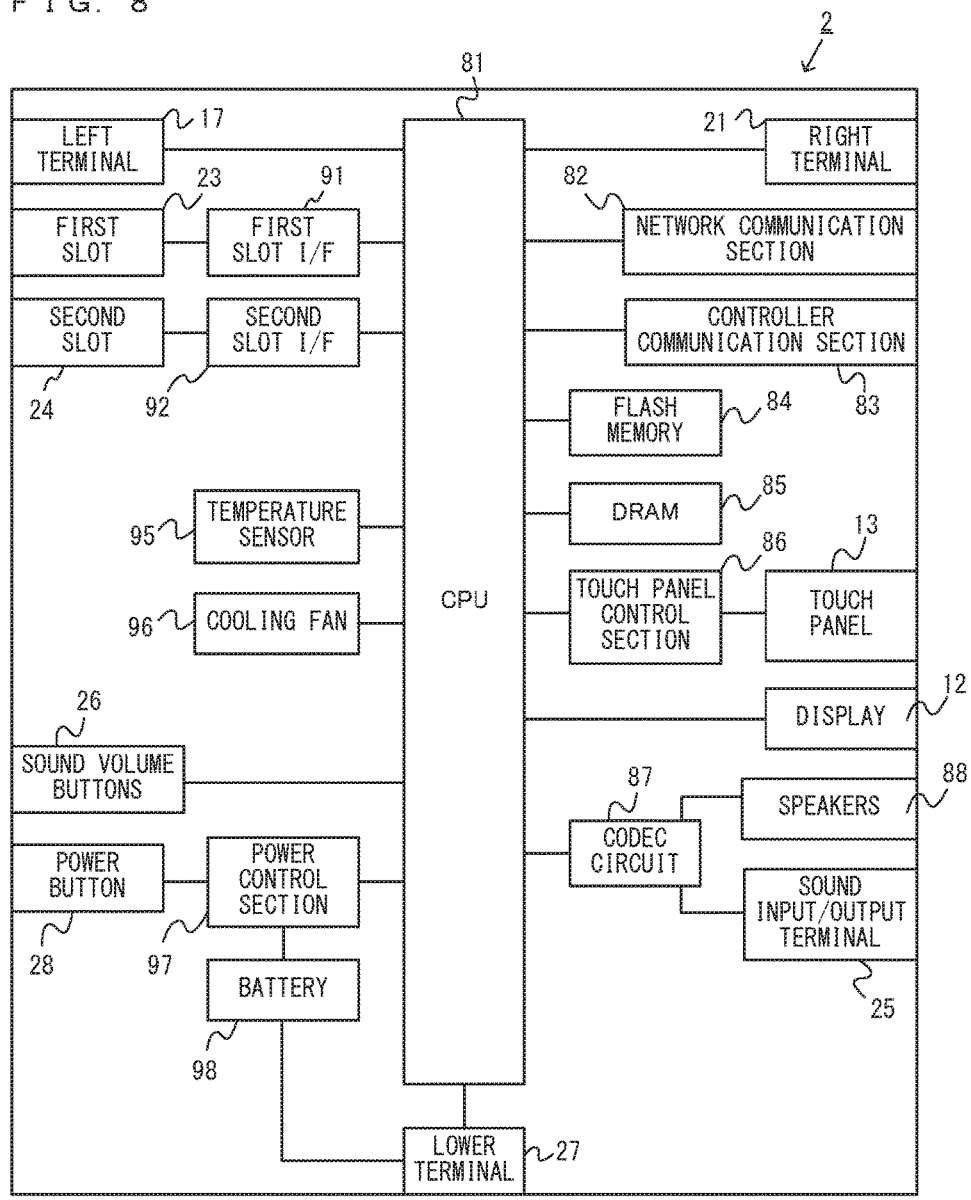

FIG. 13
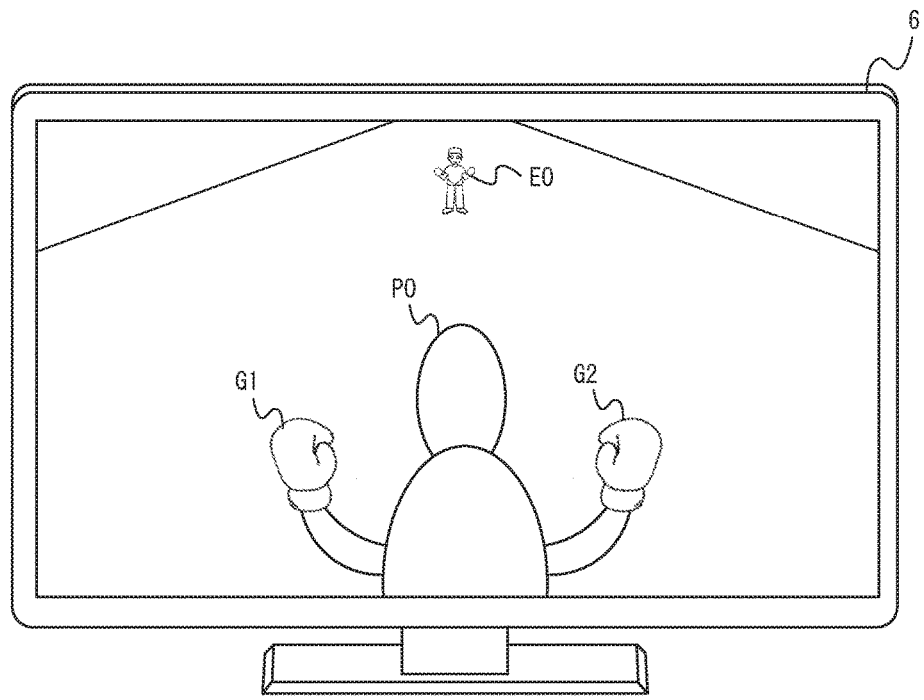
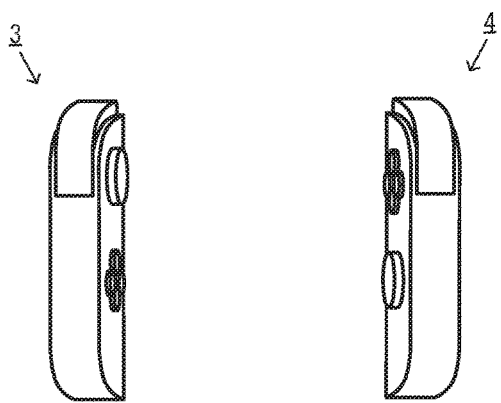

FIG. 14
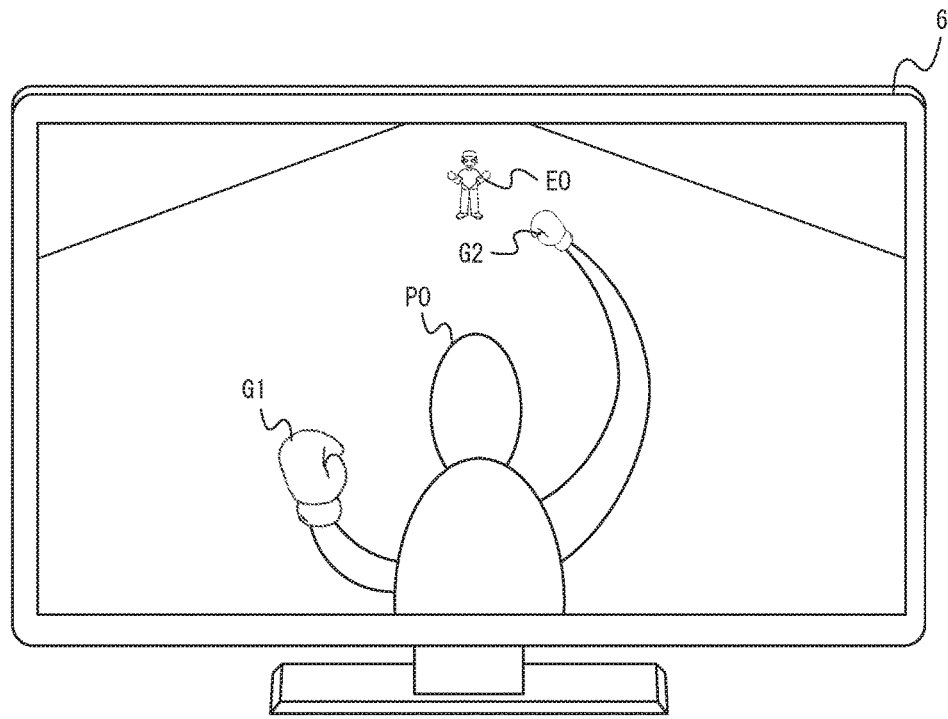
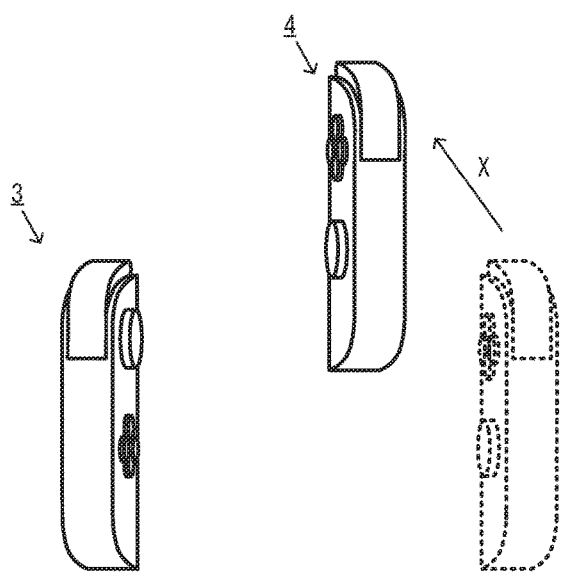

FIG. 15
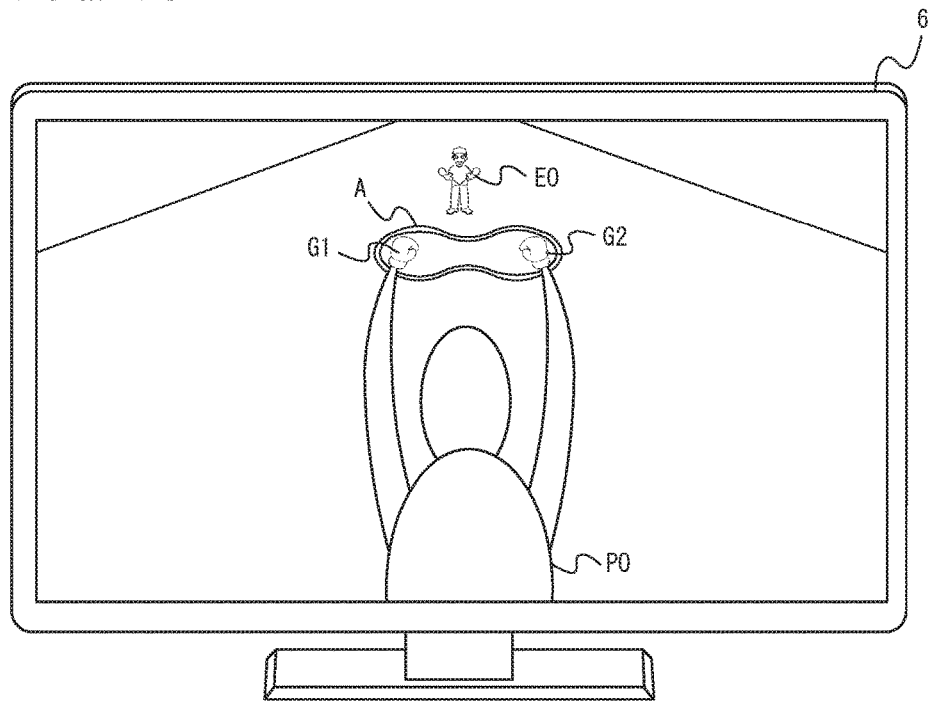
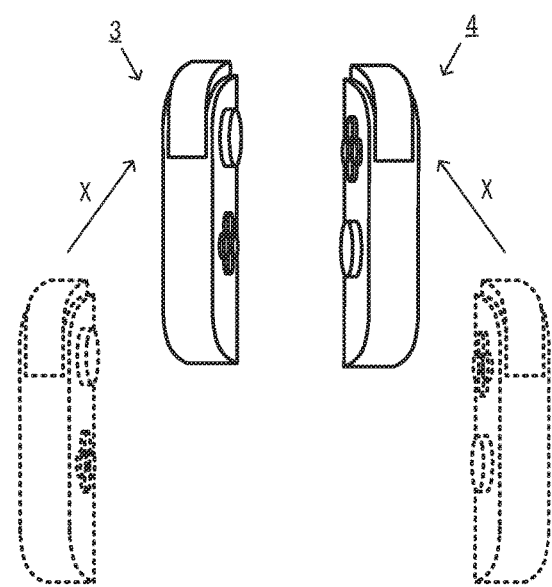

GAME APPARATUS, STORAGE MEDIUM HAVING GAME PROGRAM STORED THEREON, GAME SYSTEM, AND GAME PROCESSING METHOD

CROSS REFERENCE TO RELATED APPLICATION

The disclosure of Japanese Patent Application No. 2016-113214 filed on Jun. 7, 2016 is incorporated herein by reference.

FIELD

The technology shown herein relates to a game apparatus operable by use of a plurality of operation devices, a storage medium having a game program stored thereon, a game system, and a game processing method.

BACKGROUND AND SUMMARY

Conventionally, there is a game apparatus performing a game process by use of an input device detecting an acceleration in at least two axis direction. For example, such a game apparatus is usable to perform a game in which a virtual object is caused to box by being operated in a virtual space in accordance with the type of acceleration caused in the input device.

Generally in such a virtual boxing game, when the virtual object throws a punch, an operation determination allowing the virtual object to throw the next punch is not made until the virtual object finishes the first punch. In a case where a predetermined time period is needed from the start of the punch until the finish thereof, the player of the game may not be able to wait until finishing the first punch. In such a case, the player may result in missing the timing to start the next punch.

Therefore, it is an object of an exemplary embodiment to provide a game apparatus, a storage medium having a game program stored thereon, a game system and a game processing method by which an operation is allowed to be made easily in a game in which a state where an operation instruction is issuable is caused intermittently.

In order to achieve the above-described object, the exemplary embodiment may employ, for example, the following configurations. It is understood that, in order to interpret the claims, the scope of the claims should be interpreted only by the recitations of the claims. If there is a contradiction between the recitations of the claims and the descriptions of the specification, the recitations of the claims take precedence.

An example of game apparatus in the exemplary embodiment is configured to execute a game process based on an operation made by use of a first operation device and a second operation device each including an acceleration sensor and a gyrosensor. The game apparatus includes a computer configured to acquire, from the first operation device, first operation data including first acceleration data based on a detection result provided by the acceleration sensor and first angular velocity data based on a detection result provided by the gyrosensor; and acquire, from the second operation device, second operation data including second acceleration data based on a detection result provided by the acceleration sensor and second angular velocity data based on a detection result provided by the gyrosensor; make a swing input determination on whether or not a first swing input on the first operation device has been made based on at least the first acceleration data; and make the swing input determination on whether or not a second swing input on the second operation device has been made based on at least the second acceleration data; perform an object movement control to control a movement of a first object in a virtual space based on the first operation data, and perform the object movement control to control a movement of a second object in the virtual space based on the second operation data; and perform the game process based on the first object and the second object in the virtual space. In the object movement control, the computer is configured to make a movement start determination on whether or not to start moving the first object in the virtual space based on at least the first swing input when the first swing input is determined to have been made in a first movement start-possible state, in which the first object is allowed to start moving, and when the first object is put into the first movement start-possible state within a predetermined time period after the first swing input is determined to have been made; and make the movement start determination on whether or not to start moving the second object in the virtual space based on at least the second swing input when the second swing input is determined to have been made in a second movement start-possible state, in which the second object is allowed to start moving, and when the second object is put into the second movement start-possible state within a predetermined time period after the second swing input is determined to have been made; calculate an attitude of the first operation device based on at least the first angular velocity data, and make a movement direction setting to set a movement direction of the first object in the virtual space based on the attitude of the first operation device; and calculate an attitude of the second operation device based on at least the second angular velocity data, and make the movement direction setting to set a movement direction of the second object in the virtual space based on the attitude of the second operation device; start moving the first object in the movement direction set for the first object in the movement direction setting when it is determined in the movement start determination to start moving the first object; and start moving the second object in the movement direction set for the second object in the movement direction setting when it is determined in the movement start determination to start moving the second object; perform a track control to change a track of the first object in the virtual space in accordance with a change in the attitude of the first operation device after the first object starts moving; and perform the track control to change a track of the second object in the virtual space in accordance with a change in the attitude of the second operation device after the second object starts moving; and locate the first object at a first predetermined position to put the first object into the first movement start-possible state after the movement of the first object is finished based on a predetermined condition; and locate the second object at a second predetermined position to put the second object into the second movement start-possible state after the movement of the second object is finished based on a predetermined condition.

According to the above, the first object and the second object, even while moving, may each have the track thereof changed by an operation made by use of the first operation device or the second operation device. Therefore, it may require a long time until the first object or the second object is put into the first movement start-possible state or the second movement start-possible state. However, even when the first object is not in the first movement start-possible state, the motion of the first object is made controllable based on the first swing input as long as the first object is put into the first movement start-possible state within a predetermined time period after the first swing input is made on the first operation device. Even when the second object is not in the second movement start-possible state, the motion of the second object is made controllable based on the second swing input as long as the second object is put into the second movement start-possible state within a predetermined time period after the second swing input is made on the second operation device. Therefore, even in a case where it takes time until the first object and/or the second object is put into the first movement start-possible state or the second movement start-possible state, an operation is allowed to be made easily.

In the movement start determination, the computer may be configured to, when it is determined to start moving one of the first object and the second object within a predetermined time period after the other of the first object and the second object starts moving, further determine whether or not to start a predetermined action to be made by the first object and the second object as a pair.

According to the above, the predetermined action is made based on the relationship between the timing at which the first object starts moving and the timing at which the second object starts moving. Therefore, a game based on a novel operation environment that is not available conventionally is realized.

In the game process, the computer may be configured to make a collision determination on whether or not the first object and/or the second object has collided against another object in the virtual space, and when the collision determination provides a positive determination result, to perform a predetermined process on the another object. In the collision determination, the computer may be configured to, when it is determined in the movement start determination to start the predetermined action, further determine whether or not a predetermined region set between the first object and the second object has collided against the another object in the virtual space.

According to the above, in addition to the first object and the second object, the collision region between the first object and the second object is set. Therefore, a game providing various strategic possibilities is realized.

In the track control, the computer may be configured to, even while the predetermined action is being made, change the track of the first object in accordance with the change in the attitude of the first operation device, and change the track of the second object in accordance with the change in the attitude of the second operation device.

According to the above, the track of the first object and/or the second object is changed while the first object and/or the second object is moving to change the relationship between the pair of the first object and the second object. Therefore, a game providing further various strategic possibilities is realized.

In the swing input determination, the computer may be configured to determine whether or not the first swing input has been made based on whether or not the magnitude of acceleration represented by the first acceleration data has exceeded a first threshold value, and to determine whether or not the second swing input has been made based on whether or not the magnitude of acceleration represented by the second acceleration data has exceeded a second threshold value.

According to the above, each of the first operation device and the second operation device may be swung with a motion exceeding a predetermined acceleration to make a game operation.

In the movement direction setting, the computer may be configured to calculate the attitude of the first operation device based on an inclination of a left-right direction axis of the first operation device with respect to a gravitational direction in a real space, and to calculate the attitude of the second operation device based on an inclination of a left-right direction axis of the second operation device with respect to the gravitational direction.

According to the above, the first operation device and/or the second operation device may be inclined in the roll direction in the real space to control the movement direction of the first object and/or the second object.

In the track control, the computer may be configured to calculate the change in the attitude of the first operation device based on a change in a rotation angle of a left-right direction axis of the first operation device about a front-rear direction of the first operation device, and to calculate the change in the attitude of the second operation device based on a change in a rotation angle of a left-right direction axis of the second operation device about a front-rear direction of the second operation device.

According to the above, the first operation device and/or the second operation device may be rotated in the roll direction to control the track of the first object and/or the second object while the first object and/or the second object is moving.

In the track control, the computer may be configured to calculate the change in the attitude of the first operation device based on a change in a rotation angle of a front-rear direction axis of the first operation device with respect to a gravitational direction in a real space, and to calculate the change in the attitude of the second operation device based on a change in a rotation angle of a front-rear direction axis of the second operation device with respect to the gravitational direction.

According to the above, the first operation device and/or the second operation device may be rotated in the yaw direction in the real space to control the track of the first object and/or the second object while the first object and/or the second object is moving.

In the object movement control, the computer may be configured to move a player object based on both of the attitude of the first operation device based on at least the first angular velocity data and the attitude of the second operation device based on at least the second angular velocity data, and thus to move the first predetermined position and the second predetermined position set at positions with respect to the position of the player object.

According to the above, the position from which each of the first object and the second object start moving may be changed based on the attitudes of both of the first operation device and the second operation device. Therefore, a wider variety of game operation is realized.

The exemplary embodiment may be carried out in the form of a storage medium having a game program stored thereon, a game system, and a game processing method.

According to the exemplary embodiment, even in a case where it takes time until the object is put into a movement start-possible state, an operation is allowed to be made easily.

These and other objects, features, aspects and advantages of the exemplary embodiment will become more apparent

BRIEF DESCRIPTION OF THE DRAWINGS

FIG. 8 is a block diagram showing a non-limiting example of internal configuration of the main body apparatus 2;

FIG. 13 shows a non-limiting example of game image displayed during a game played by the left controller 3 and the right controller 4 being moved;

FIG. 14 shows a non-limiting example of game image displayed during the game played by the left controller 3 and the right controller 4 being moved;

FIG. 15 shows a non-limiting example of game image displayed during the game played by the left controller 3 and the right controller 4 being moved;

DETAILED DESCRIPTION OF NON-LIMITING EXAMPLE EMBODIMENTS

Figure 1:
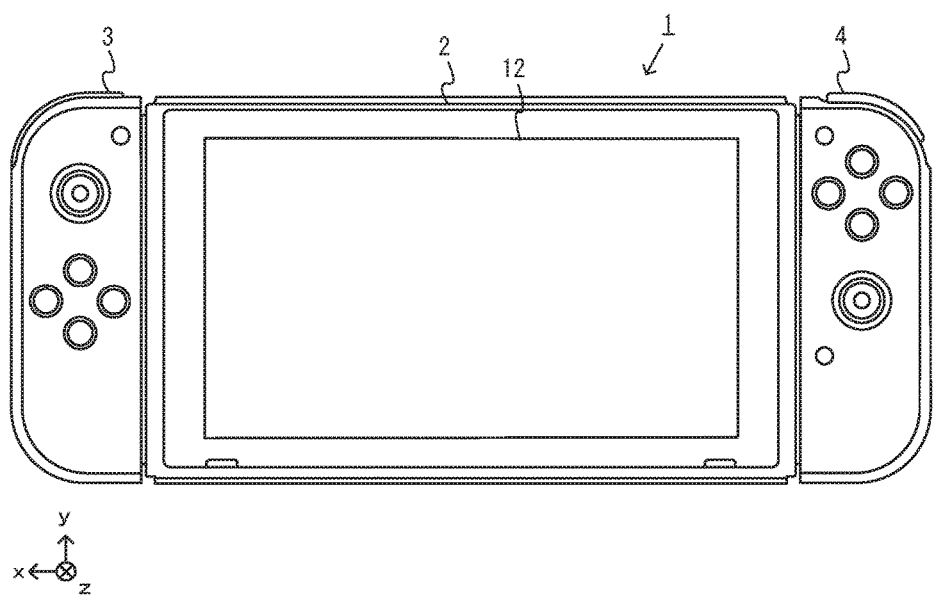
FIG. 1 shows a non-limiting example of state of an information processing system 1 according to the exemplary embodiment where a left controller 3 and a right controller 4 are attached to a main body apparatus 2.

A description is given below of a game apparatus, a game program, a game system, and a game processing method according to an exemplary embodiment. An information processing system 1 as an example of game system according to the exemplary embodiment includes a main body apparatus (information processing apparatus; acts as a game apparatus main body in the exemplary embodiment) 2, a left controller 3, and a right controller 4. In another form, the information processing system may further include a cradle 5 (see FIG. 6, FIG. 7, and the like) in addition to the above elements. In the information processing system 1 according to the exemplary embodiment, the left controller 3 and the right controller 4 are attachable to, and detachable from, the main body apparatus 2. The information processing system 1 is usable as an integrated apparatus in a state where the left controller 3 and the right controller 4 are attached to the main body apparatus 2. Alternatively, the main body apparatus 2, the left controller 3 and the right controller 4 are usable as separate bodies (see FIG. 2). The information processing system 1 is usable in a form in which an image is displayed on the main body apparatus 2, and in a form in which an image is displayed on another display apparatus such as a TV or the like. In the former form, the information processing system 1 is usable as a mobile apparatus (e.g., a mobile game apparatus). In the latter form, the information processing system 1 is usable as a stationary apparatus (e.g., a stationary game apparatus).

FIG. 1 shows a state where the left controller 3 and the right controller 4 are attached to the main body apparatus 2 in an example of the information processing system 1 according to the exemplary embodiment. As shown in FIG. 1, the information processing system 1 includes the main body apparatus 2, the left controller 3, and the right controller 4. The left controller 3 and the right controller 4 are attached to, and integrated with, the main body apparatus 2. The main body apparatus 2 is an apparatus that executes various processes (e.g., game process) in the information processing system 1. The main body apparatus 2 includes a display 12. The left controller 3 and the right controller 4 are each a device including an operation section allowing a user to make an input thereto.

Figure 2:
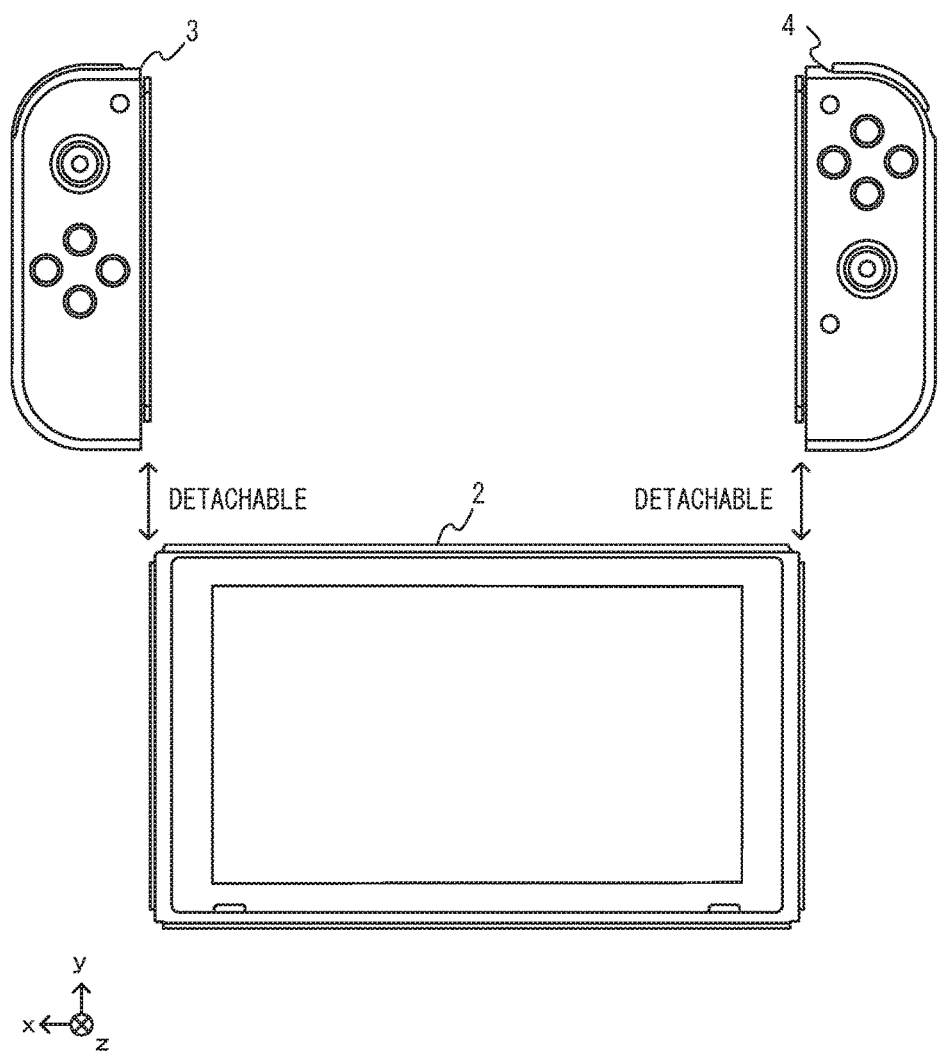
FIG. 2 shows a non-limiting example of state where the left controller 3 and the right controller 4 are detached from the main body apparatus 2.

FIG. 2 shows an example of state where the left controller 3 and the right controller 4 are detached from the main body apparatus 2. As shown in FIG. 1 and FIG. 2, the left controller 3 and the right controller 4 are attachable to, and detachable from, the main body apparatus 2. The left controller 3 is attachable to a left side surface (side surface on a positive side in an x-axis direction shown in FIG. 1) of the main body apparatus 2, and is attachable to, and detachable from, the main body apparatus 2 by being slid along the left side surface of the main body apparatus 2 in a y-axis direction shown in FIG. 1. The right controller 4 is attachable to a right side surface (side surface on a negative side in the x-axis direction shown in FIG. 1) of the main body apparatus 2, and is attachable to, and detachable from, the main body apparatus 2 by being slide along the right side surface of the main body apparatus 2 in the y-axis direction shown in FIG. 1. Hereinafter, the left controller 3 and the right controller 4 will occasionally be referred to collectively as "controllers". In the exemplary embodiment, an "operation device" operable by a single user may be a single controller (e.g., one of the left controller 3 and the right controller 4) or a plurality of controllers (e.g., both the left controller 3 and the right controller 4, or at least either the left controller 3 or the right controller 4 and another controller). The "operation device" includes at least one controller. Hereinafter, an example of specific configuration of the main body apparatus 2, the left controller 3, and the right controller 4 will be described.

Figure 3:
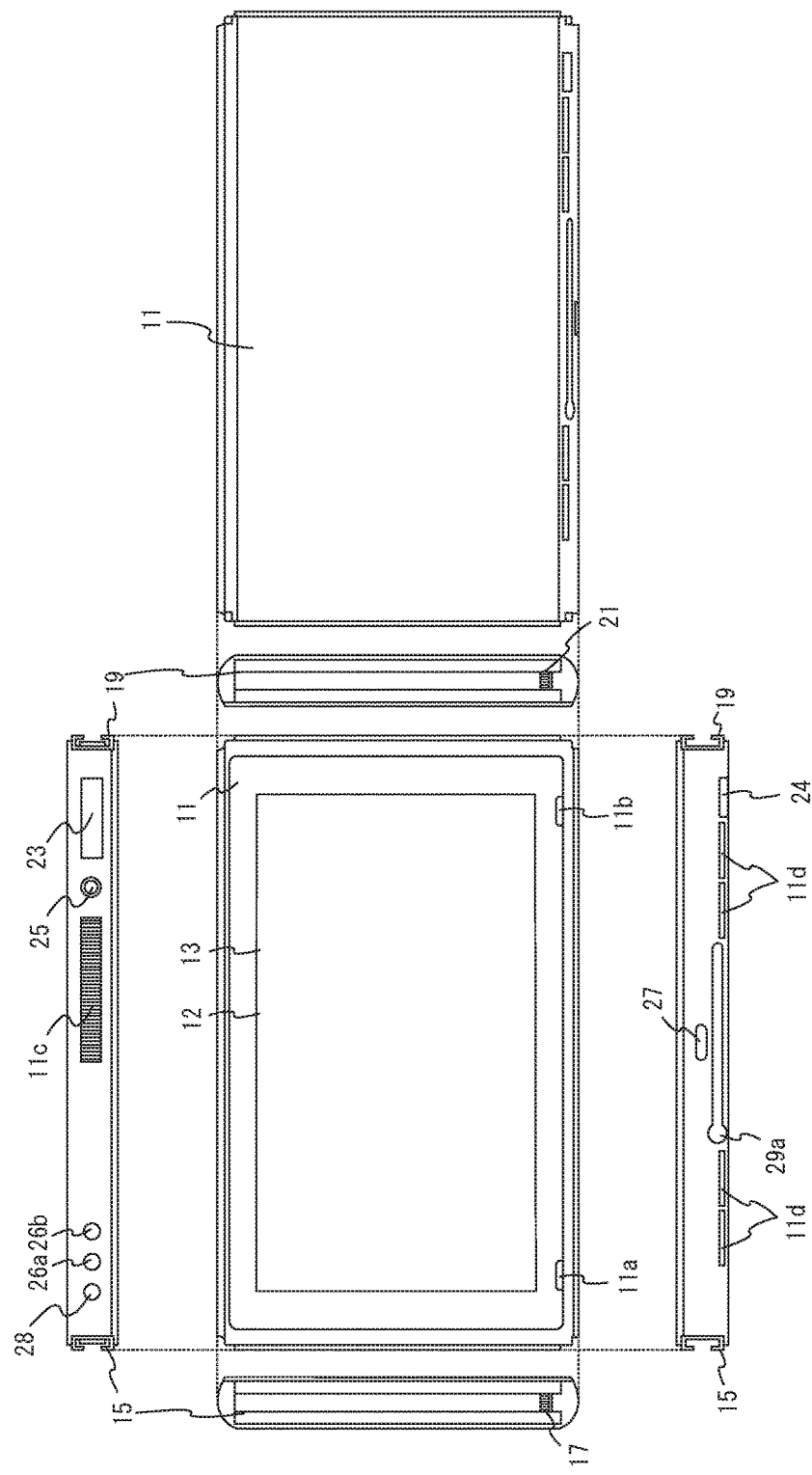
FIG. 3 provides six orthogonal views showing a non-limiting example of the main body apparatus 2.

FIG. 3 provides six orthogonal views showing an example of the main body apparatus 2. As shown in FIG. 3, the main body apparatus 2 includes a generally plate-shaped housing 11. In the exemplary embodiment, a main surface of the housing 11 (in other words, a front surface, i.e., a surface on which the display 12 is provided) has a roughly rectangular shape. In the exemplary embodiment, the housing 11 is longer in a left-right direction as described below. In the exemplary embodiment, a longer direction of the main surface of the housing 11 (i.e., x-axis direction shown in FIG. 1) will be referred to as a "width direction" (also referred to as the "left-right direction"), and a short direction of the main surface (i.e., y-axis direction shown in FIG. 1) will be referred to as a "length direction" (also referred to as an "up-down direction"). A direction perpendicular to the main surface (i.e., z-axis direction shown in FIG. 1) will be referred to as a "depth direction" (also referred to as a "front-rear direction"). The main body apparatus 2 is usable in an orientation in which the width direction extends in the horizontal direction. The main body apparatus 2 is also usable in an orientation in which the length direction extends in the horizontal direction. In this case, the housing 11 may be considered as being longer in the vertical direction.

The housing 11 may have any shape and size. For example, the housing 11 may have a mobile size. A single body of the main body apparatus 2, or an integrated apparatus including the main body apparatus 2 and the left and right controllers 3 and 4 attached thereto, may act as a mobile apparatus. Alternatively, the main body apparatus 2 or the integrated apparatus may act as a handheld apparatus. Still alternatively, the main body apparatus 2 or the integrated apparatus may act as a portable apparatus.

As shown in FIG. 3, the main body apparatus 2 includes the display 12 provided on the main surface of the housing 11. The display 12 displays an image (a still image or a moving image) acquired or generated by the main body apparatus 2. In the exemplary embodiment, the display 12 is a liquid crystal display device (LCD). Alternatively, the display 12 may be a display apparatus of any type.

The main body apparatus 2 includes a touch panel 13 provided on a screen of the display 12. In the exemplary embodiment, the touch panel 13 is of a type that allows a multi-touch input to be made (e.g., of an electrostatic capacitance type). Alternatively, the touch panel 13 may be of any type. For example, the touch panel 13 may be of a type that allows a single-touch input to be made (e.g., of a resistive type).

The main body apparatus 2 includes speakers (speakers 88 shown in FIG. 8) accommodated in the housing 11. As shown in FIG. 3, the main surface of the housing 11 has speaker holes 11a and 11b formed therein. The speakers 88 output a sound through the speaker holes 11a and 11b.

As shown in FIG. 3, the main body apparatus 2 includes a left rail member 15 provided on the left side surface of the housing 11. The left rail member 15 is provided to allow the left controller 3 to be detachably attached to the main body apparatus 2. The left rail member 15 extends in the up-down direction on the left side surface of the housing 11. The left rail member 15 is so shaped as to be engageable with a slider in the left controller 3 (slider 40 shown in FIG. 4), and a slide mechanism includes the left rail member 15 and the slider 40. The slide mechanism allows the left controller 3 to be slidably and detachably attached to the main body apparatus 2.

The main body apparatus 2 includes a left terminal 17. The left terminal 17 allows the main body apparatus 2 to communicate with the left controller 3 in a wired manner. The left terminal 17 is provided at a position where, in a case where the left controller 3 is attached to the main body apparatus 2, the left terminal 17 comes into contact with a terminal in the left controller 3 (terminal 42 shown in FIG. 4). The specific position of the left terminal 17 is optional. In the exemplary embodiment, as shown in FIG. 3, the left terminal 17 is provided on a bottom surface of a groove in the left rail member 15. In the exemplary embodiment, the left terminal 17 is provided near a lower end on the bottom surface of the groove of the left rail member 15.

As shown in FIG. 3, components similar to the components provided on the left side surface of the housing 11 are provided on the right side of the housing 11. Specifically, the main body apparatus 2 includes a right rail member 19 provided on the right side surface of the housing 11. The right rail member 19 extends in the up-down direction on the right side surface of the housing 11. The right rail member 19 is so shaped as to be engageable with a slider in the right controller 4 (slider 62 shown in FIG. 5), and a slide mechanism includes the right rail member 19 and the slider 62. The slide mechanism allows the right controller 4 to be slidably and detachably attached to the main body apparatus 2.

The main body apparatus 2 includes a right terminal 21. The right terminal 21 is provided to allow the main body apparatus 2 to communicate with the right controller 4 in a wired manner. The right terminal 21 is provided at a position where, in a case where the right controller 4 is attached to the main body apparatus 2, the right terminal 21 comes into contact with a terminal in the right controller 4 (terminal 64 shown in FIG. 5). The specific position of the right terminal 21 is optional. In the exemplary embodiment, as shown in FIG. 3, the right terminal 21 is provided on a bottom surface of a groove in the right rail member 19. In the exemplary embodiment, the right terminal 21 is provided near a lower end of the bottom surface of the groove of the right rail member 19.

As shown in FIG. 3, the main body apparatus 2 includes a first slot 23. The first slot 23 is provided in an upper side surface of the housing 11. The first slot 23 is so shaped as to allow a first type storage medium to be attached to the first slot 23. The first type storage medium is, for example, a dedicated storage medium (e.g., dedicated memory card) for the information processing system 1 and an information processing apparatus of the same type as that of the information processing system 1. The first type storage medium is used to, for example, store data usable by the main body apparatus 2 (e.g., saved data of an application or the like) and/or a program executable by the main body apparatus 2 (e.g., program for an application or the like). The main body apparatus 2 includes a power button 28. As shown in FIG. 3, the power button 28 is provided on the upper side surface of the housing 11. The power button 28 is provided to switch the power supply of the main body apparatus 2 between an on-state and an off-state.

The main body apparatus 2 includes a sound input/output terminal (specifically, earphone jack) 25. That is, the main body apparatus 2 allows a microphone or an earphone to be attached to the sound input/output terminal 25. As shown in FIG. 3, the sound input/output terminal 25 is provided on the upper side surface of the housing 11.

The main body apparatus 2 includes sound volume buttons 26a and 26b. As shown in FIG. 3, the sound volume buttons 26a and 26b are provided on the upper side surface of the housing 11. The sound volume buttons 26a and 26b are provided to give an instruction to adjust the volume of a sound output from the main body apparatus 2. The sound volume button 26a is provided to give an instruction to turn down the sound volume, and the sound volume button 26b is provided to give an instruction to turn up the sound volume.

The housing 11 includes an exhaust hole 11c formed thereon. As shown in FIG. 3, the exhaust hole 11c is formed in the upper side surface of the housing 11. The exhaust hole 11c is formed to exhaust (in other words, release) heat generated inside the housing 11 to outside the housing 11. That is, the exhaust hole 11c may be called a heat discharge hole.

The main body apparatus 2 includes a lower terminal 27. The lower terminal 27 is provided to allow the main body apparatus 2 to communicate with the cradle 5 described below. As shown in FIG. 3, the lower terminal 27 is provided on a lower side surface of the housing 11. In a case where the main body apparatus 2 is attached to the cradle 5, the lower terminal 27 is connected to a terminal of the cradle 5 (main body terminal 73 shown in FIG. 7). In the exemplary embodiment, the lower terminal 27 is a USB connector (more specifically, a female connector).

The main body apparatus 2 includes a second slot 24. In the exemplary embodiment, the second slot 24 is provided in the lower side surface of the housing 11. In another exemplary embodiment, the second slot 24 may be provided in the same surface as the first slot 23. The second slot 24 is so shaped as to allow a second type storage medium, different from the first type storage medium, to be attached to the second slot 24. The second type storage medium may be, for example, a general-purpose storage medium. For example, the second type storage medium may be an SD card. Similarly to the first type storage medium, the second type storage medium is used to, for example, store data usable by the main body apparatus 2 (e.g., saved data of an application or the like) and/or a program executable by the main body apparatus 2 (e.g., program for an application or the like).

The housing 11 includes an absorption holes 11d formed therein. As shown in FIG. 3, the air absorption holes 11d are formed in the lower side surface of the housing 11. The absorption holes 11d are formed to absorb (in other words, introduce) air outside the housing 11 into the housing 11. In the exemplary embodiment, the air absorption holes 11d are formed in the surface opposite to the surface in which the exhaust hole 11c is formed. Thus, heat in the housing 11 is released efficiently.

The shapes, the numbers, and the installation positions of the above-described components provided in the housing 11 (specifically, the buttons, the slots, the terminals, and the like) are optional. For example, in another exemplary embodiment, at least one of the power button 28 and the slots 23 and 24 may be provided on/in another side surface or a rear surface of the housing 11. Alternatively, in another exemplary embodiment, the main body apparatus 2 may not include at least one of the above-described components.

Figure 4:
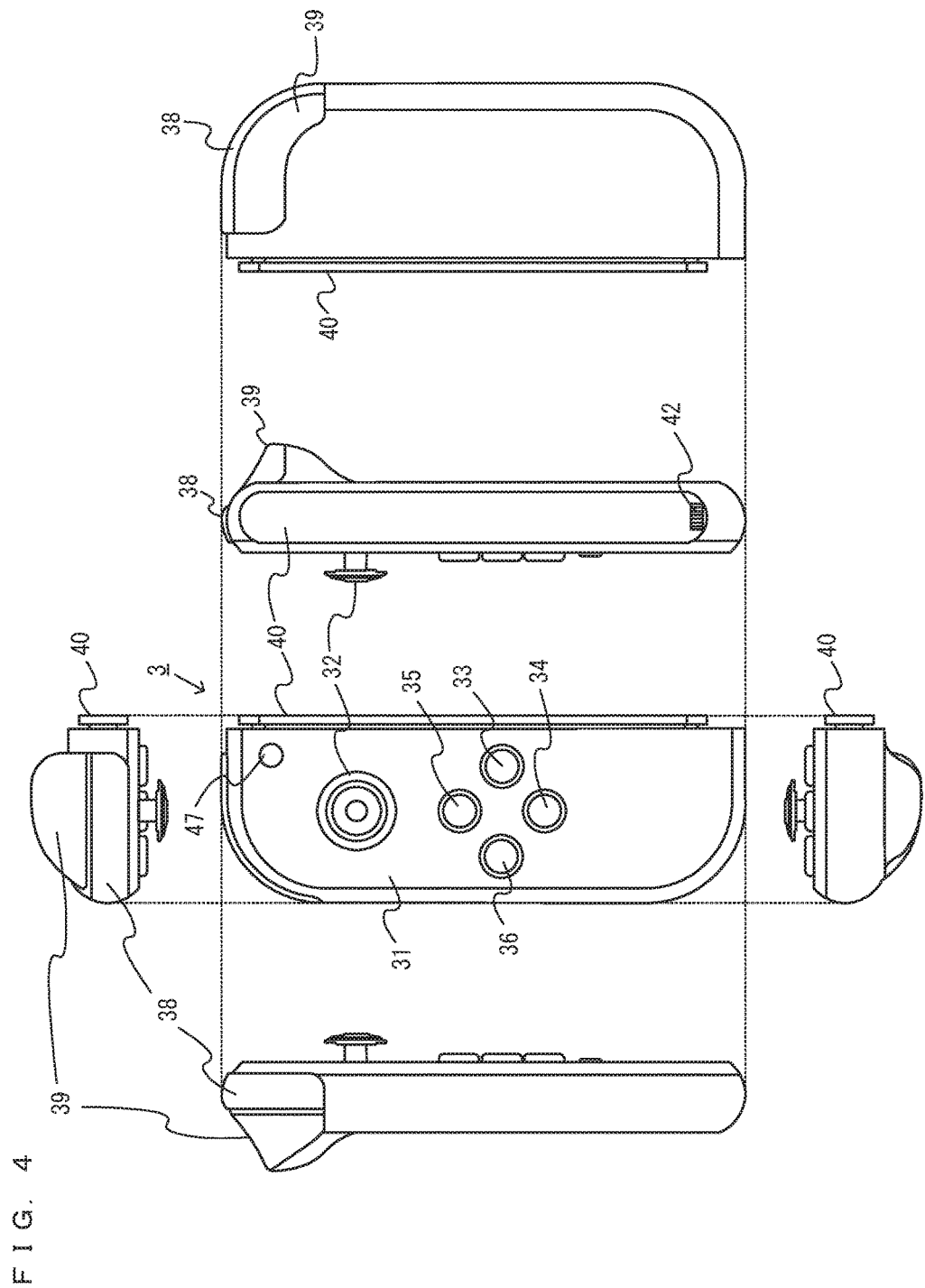
FIG. 4 provides six orthogonal views showing a non-limiting example of the left controller 3.

FIG. 4 provides six orthogonal views showing an example of the left controller 3. As shown in FIG. 4, the left controller 3 includes a housing 31. In the exemplary embodiment, the housing 31 is generally plate-shaped. A main surface of the housing 31 (in other words, a front surface. i.e., a surface on a negative side in the z-axis direction shown in FIG. 1) has a roughly rectangular shape. In the exemplary embodiment, the housing 31 is longer in the up-down direction in FIG. 1A (i.e., in the y-axis direction shown in FIG. 1). In a state of being detached from the main body apparatus 2, the left controller 3 may be held in an orientation in which the longer side extends in the vertical direction. The housing 31 has such a shape and such a size as to be held by one hand, particularly, with the left hand when being held in an orientation in which the longer side extends in the vertical direction. The left controller 3 may also be held in an orientation in which the longer side extends in the horizontal direction. In a case of being held in an orientation in which the longer side extends in the horizontal direction of, the left controller 3 may be held with both of two hands of the user. The housing 31 has any shape. In another exemplary embodiment, the housing 31 may not be generally plate-shaped. The housing 31 may not be rectangular, and may be, for example, semicircular. The housing 31 may not be vertically long.

The length in the up-down direction of the housing 31 is approximately equal to the length in the up-down direction of the housing 11 of the main body apparatus 2. The thickness of the housing 31 (i.e., length in the front-rear direction, in other words, the length in the z-axis direction shown in FIG. 1) is approximately equal to the thickness of the housing 11 of the main body apparatus 2. Thus, in a case where the left controller 3 is attached to the main body apparatus 2 (see FIG. 1), the user can hold the main body apparatus 2 and the left controller 3 with a feeling that he/she holds an integrated apparatus.

As shown in FIG. 4, the main surface of the housing 31 is shaped such that left corners thereof are more rounded than right corners thereof. Specifically, a connection portion between an upper side surface and a left side surface of the housing 31 and a connection portion between a lower side surface and the left side surface of the housing 31 are more rounded (in other words, are chamfered to have a greater roundness) than a connection portion between the upper side surface and a right side surface of the housing 31 and a connection portion between the lower side surface and the right side surface of the housing 31. Thus, in a case where the left controller 3 is attached to the main body apparatus 2 (see FIG. 1), the information processing system 1 as the integrated apparatus has a rounded shape on the left side. The information processing system 1 having such a shape is easy for the user to hold.

The left controller 3 includes an analog stick 32. As shown in FIG. 4, the analog stick 32 is provided on the main surface of the housing 31. The analog stick 32 is an example of direction input section usable to input a direction. The analog stick 32 includes a stick member that can be inclined in all directions parallel to the main surface of the housing 31 (i.e., 360° directions including up, down, left, right, and oblique directions). The user may incline the stick member to input a direction corresponding to a direction of the inclination (and to input a magnitude corresponding to an angle of the inclination). The direction input section may be a cross key, a slide stick, or the like. In the exemplary embodiment, the stick member may be pressed (in a direction perpendicular to the housing 31) to make an input operation. That is, the analog stick 32 is an input section usable to input a direction and a magnitude corresponding to the direction of inclination and the amount of inclination of the stick member, and also usable to make a press input operation on the stick member.

The left controller 3 includes four operation buttons 33 through 36 (specifically, a right direction button 33, a down direction button 34, an up direction button 35, and a left direction button 36). As shown in FIG. 4, the four operation buttons 33 through 36 are provided below the analog stick 32 on the main surface of the housing 31. In the exemplary embodiment, the four operation buttons are provided on the main surface of the left controller 3. The number of operation buttons is optional. The operation buttons 33 through 36 are used to give instructions corresponding to various programs executable by the main body apparatus 2 (e.g., an OS program and an application program). In the exemplary embodiment, the operation buttons 33 through 36 are usable to input directions, and thus are termed the right direction button 33, the down direction button 34, the up direction button 35, and the left direction button 36. Alternatively, the operation buttons 33 through 36 may be used to give instructions other than directions.

The left controller 3 includes a "−" (minus) button 47. As shown in FIG. 4, the "−" button 47 is provided on the main surface of the housing 31, more specifically, is provided on an upper right area of the main surface. The "−" button 47 is used to give instructions corresponding to various programs executable by the main body apparatus 2 (e.g., an OS program and an application program). The "−" button 47 is used as, for example, a select button in a game application (e.g., as a button used to switch a selectable item).

In a case where the left controller 3 is attached to the main body apparatus 2, the operation sections provided on the main surface of the left controller 3 (specifically, the analog stick 32 and the buttons 33 through 36 and 47) are operated with, for example, the thumb of the left hand of the user holding the information processing system 1 as the integrated apparatus. In a case where the left controller 3 is used while being detached from the main body apparatus 2 and held in a horizontal orientation with both of two hands of the user, the above-described operation sections are operated with, for example, the thumbs of the left and right hands of the user holding the left controller 3. Specifically, in this case, the analog stick 32 is operated with the thumb of the left hand of the user, and the operation buttons 33 through 36 are operated with the thumb of the right hand of the user.

The left controller 3 includes a first L-button 38. The left controller 3 includes a ZL-button 39. Similarly to the operation buttons 33 through 36, the operation buttons 38 and 39 are used to give instructions corresponding to various programs executable by the main body apparatus 2. As shown in FIG. 4, the first L-button 38 is provided on an upper left portion of the side surface of the housing 31. The ZL-button 39 is provided on an upper left portion from the side surface to a rear surface of the housing 31 (more precisely, an upper left portion when the housing 31 is viewed from the front side thereof). That is, the ZL-button 39 is provided to the rear of the first L-button 38 (on a positive side in the z-axis direction shown in FIG. 1). In the exemplary embodiment, the upper left portion of the housing 31 has a rounded shape. Therefore, the first L-button 38 and the ZL-button 39 each have a rounded shape corresponding to the roundness of the upper left portion of the housing 31. In a case where the left controller 3 is attached to the main body apparatus 2, the first L-button 38 and the ZL-button 39 are located on an upper left portion of the information processing system 1 as the integrated apparatus.

The left controller 3 includes the slider 40 described above. As shown in FIG. 4, the slider 40 extends in the up-down direction on the right side surface of the housing 31. The slider 40 is so shaped as to be engageable with the left rail member 15 of the main body apparatus 2 (more specifically, with the groove in the left rail member 15). Thus, the slider 40, when being engaged with the left rail member 15, is secured so as not to be detached in a direction perpendicular to a slide direction (the slide direction is, in other words, the direction in which the left rail member 15 extends).

The left controller 3 includes the terminal 42 usable by the left controller 3 to communicate with the main body apparatus 2 in a wired manner The terminal 42 is provided at a position where, in a case where the left controller 3 is attached to the main body apparatus 2, the terminal 42 comes into contact with the left terminal 17 (FIG. 3) of the main body apparatus 2. The specific position of the terminal 42 is optional. In the exemplary embodiment, as shown in FIG. 4, the terminal 42 is provided on an attachment surface to which the slider 40 is attached. In the exemplary embodiment, the terminal 42 is provided near a lower end on the attachment surface of the slider 40.

Figure 5:
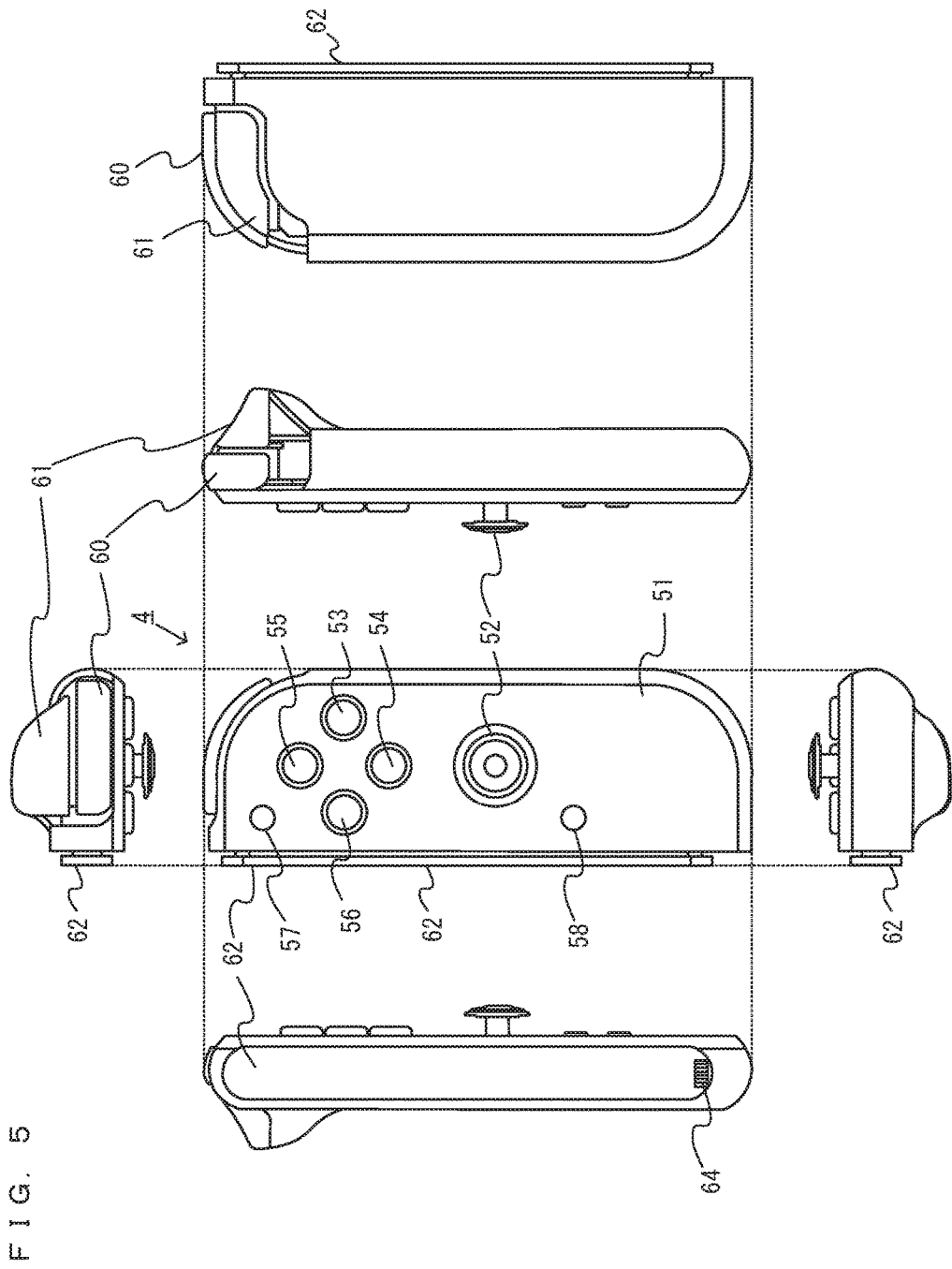
FIG. 5 provides six orthogonal views showing a non-limiting example of the right controller 4.

FIG. 5 provides six orthogonal views showing an example of the right controller 4. As shown in FIG. 5, the right controller 4 includes a housing 51. In the exemplary embodiment, the housing 51 is generally plate-shaped. A main surface of the housing 51 (in other words, a front surface, i.e., a surface on the negative side in the z-axis direction shown in FIG. 1) has a roughly rectangular shape. In the exemplary embodiment, the housing 51 is longer in the up-down direction in FIG. 1A. In a state of being detached from the main body apparatus 2, the right controller 4 may be held in an orientation in which the longer side extends in the vertical direction. The housing 51 has such a shape and such a size as to be held by one hand, particularly, with the right hand when being held in an orientation in which the longer side extends in the vertical direction. The right controller 4 may also be held in an orientation in which the longer side extends in the horizontal direction. In a case of being held in an orientation in which the longer side extends in the horizontal direction, the right controller 4 may be held with both of two hands of the user.

Similarly to the case of the housing 31 of the left controller 3, the length in the up-down direction of the housing 51 of the right controller 4 is approximately equal to the length in the up-down direction of the housing 11 of the main body apparatus 2, and the thickness of the housing 51 is approximately equal to the thickness of the housing 11 of the main body apparatus 2. Thus, in a case where the right controller 4 is attached to the main body apparatus 2 (see FIG. 1), the user can hold the main body apparatus 2 and the right controller 4 with a feeling that he/she holds an integrated apparatus.

As shown in FIG. 5, the main surface of the housing 51 is shaped such that right corners thereof are more rounded than left corners thereof. Specifically, a connection portion between an upper side surface and a right side surface of the housing 51 and a connection portion between a lower side surface and the right side surface of the housing 51 are more rounded (in other words, are chamfered to have a greater roundness) than a connection portion between the upper side surface and a left side surface of the housing 51 and a connection portion between the lower side surface and the left side surface of the housing 51. Thus, in a case where the right controller 4 is attached to the main body apparatus 2 (see FIG. 1), the information processing system 1 as the integrated apparatus has a rounded shape on the right side. The information processing system 1 having such a shape is easy for the user to hold.

Similarly to the left controller 3, the right controller 4 includes an analog stick 52 as a direction input section. In the exemplary embodiment, the analog stick 52 has the same configuration as that of the analog stick 32 of the left controller 3. Similarly to the left controller 3, the right controller 4 includes four operation buttons 53 through 56 (specifically, an A-button 53, a B-button 54, an X-button 55, and a Y-button 56). In the exemplary embodiment, the four operation buttons 53 through 56 have the same mechanism as that of the four operation buttons 33 through 36 of the left controller 3. As shown in FIG. 5, the analog stick 52 and the operation buttons 53 through 56 are provided on the main surface of the housing 51. In the exemplary embodiment, the four operation buttons are provided on the main surface of the right controller 4. The number of operation buttons is optional.

Now, in the exemplary embodiment, the positional relationship between the two types of operation sections (the analog stick and the operation buttons) of the right controller 4 is opposite to the positional relationship between the corresponding two types of operation sections of the left controller 3. That is, in the right controller 4, the analog stick 52 is located below the operation buttons 53 through 56, whereas in the left controller 3, the analog stick 32 is located above the operation buttons 33 through 36. With such a positional arrangement, the left controller 3 and the right controller 4 are usable with similar operation feelings to each other when being detached from the main body apparatus 2.

The right controller 4 includes a "+" (plus) button 57. As shown in FIG. 5, the "+" button 57 is provided on the main surface of the housing 51, more specifically, is provided on an upper left area of the main surface. Similarly to the other operation buttons 53 through 56, the "+" button 57 is used to give instructions corresponding to various programs executable by the main body apparatus 2 (e.g., an OS program and an application program). The "+" button 57 is used as, for example, a start button in a game application (e.g., as a button used to give an instruction to start a game).

The right controller 4 includes a home button 58. As shown in FIG. 5, the home button 58 is provided on the main surface of the housing 51, more specifically, is provided on a lower left area of the main surface. The home button 58 is used to display a predetermined menu screen on the display 12 of the main body apparatus 2. The menu screen, for example, allows an application, specified by the user from one or more applications executable by the main body apparatus 2, to be started. The menu screen may be displayed, for example, when the main body apparatus 2 is started. In the exemplary embodiment, when the home button 58 is pressed in the state where an application is being executed by the main body apparatus 2 (i.e., in the state where an image of the application is displayed on the display 12), a predetermined operation screen may be displayed on the display 12 (at this point, the menu screen may be displayed instead of the operation screen). The operation screen, for example, allows an instruction to finish the application and display the menu screen on the display 12, an instruction to resume the application, or the like, to be given.

In a case where the right controller 4 is attached to the main body apparatus 2, the operation sections (specifically, the analog stick 52 and the buttons 53 through 58) provided on the main surface of the right controller 4 are operated with, for example, the thumb of the right hand of the user holding the information processing system 1. In a case where the right controller 4 is used while being detached from the main body apparatus 2 and held in a horizontal orientation with both of two hands of the user, the above-described operation sections are operated with, for example, the thumbs of the left and right hands of the user holding the right controller 4. Specifically, in this case, the analog stick 52 is operated with the thumb of the left hand of the user, and the operation buttons 53 through 56 are operated with the thumb of the right hand of the user.

The right controller 4 includes a first R-button 60. The right controller 4 includes a ZR-button 61. As shown in FIG. 5, the first R-button 60 is provided on an upper right portion of the side surface of the housing 51. The ZR-button 61 is provided on an upper right portion from the side surface to a rear surface of the housing 51 (more precisely, an upper right portion when the housing 51 is viewed from the front side thereof). That is, the ZR-button 61 is provided to the rear of the first R-button 60 (on the positive side in the z-axis direction shown in FIG. 1). In the exemplary embodiment, the upper right portion of the housing 51 has a rounded shape. Therefore, the first R-button 60 and the ZR-button 61 each have a rounded shapes corresponding to the roundness of the upper right portion of the housing 51. In a case where the right controller 4 is attached to the main body apparatus 2, the first R-button 60 and the ZR-button 61 are located on an upper right portion of the information processing system 1.

The left controller 3 includes a slider mechanism similar to that of the left controller 3. That is, the right controller 4 includes the slider 62 described above. As shown in FIG. 5, the slider 62 extends in the up-down direction on the left side surface of the housing 51. The slider 62 is so shaped as to be engageable with the right rail member 19 of the main body apparatus 2 (more specifically, with the groove in the right rail member 19). Thus, the slider 62, when being engaged with the right rail member 19, is secured so as not to be detached in a direction perpendicular to the slide direction (the slide direction is, in other words, the direction in which the right rail member 19 extends).

The right controller 4 includes the terminal 64 usable by the right controller 4 to communicate with the main body apparatus 2 in a wired manner The terminal 64 is provided at a position where, in a case where the right controller 4 is attached to the main body apparatus 2, the terminal 64 comes into contact with the right terminal 21 (FIG. 3) of the main body apparatus 2. The specific position of the terminal 64 is optional. In the exemplary embodiment, as shown in FIG. 5, the terminal 64 is provided on an attachment surface to which the slider 62 is attached. In the exemplary embodiment, the terminal 64 is provided near a lower end on the attachment surface of the slider 62.

Regarding the left controller 3 and the right controller 4, the shapes, the numbers, and the installation positions of the above-described components provided in the housings 31 and 51 (specifically, the sliders, the sticks, the buttons, and the like) are optional. For example, in another exemplary embodiment, the left controller 3 and the right controller 4 may each include a direction input section of a type different from that of the analog stick. The slider 40 or 62 may be located at a position corresponding to the position of the rail member 15 or 19 provided in the main body apparatus 2, for example, on the main surface or the rear surface of the housing 31 or 51. In still another exemplary embodiment, the left controller 3 and the right controller 4 may not include at least one of the above-described components.

Figure 6:
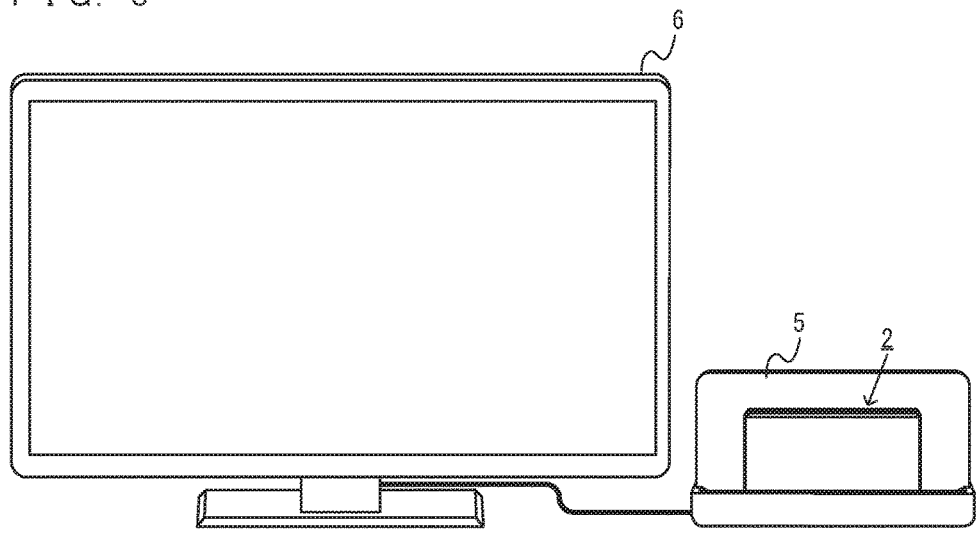
FIG. 6 shows an overall configuration of another non-limiting example of the information processing system according to the exemplary embodiment.

FIG. 6 shows an overall configuration of another example of information processing system according to the exemplary embodiment. As shown in FIG. 6, for example, only the main body apparatus 2, with the left controller 3 and the right controller 4 being detached therefrom, may be mounted on the cradle 5. In another example, the integrated apparatus including the main body apparatus 2 and the left and right controllers 3 and 4 attached thereto may be mounted on the cradle 5. The cradle 5 is communicable (via wired communication or wireless communication) with the stationary monitor 6 (e.g., stationary TV), which is an example of external display apparatus separate from the display 12. As described below in detail, in a case where the integrated apparatus or a single body of the main body apparatus 2 is mounted on the cradle 5, the information processing system 1 displays, on the stationary monitor 6, an image acquired or generated by the main body apparatus 2. In the exemplary embodiment, the cradle 5 has a function of charging the integrated apparatus or a single body of the main body apparatus 2 mounted thereon. The cradle 5 has a function of a hub apparatus (specifically, a USB hub).

Figure 7:
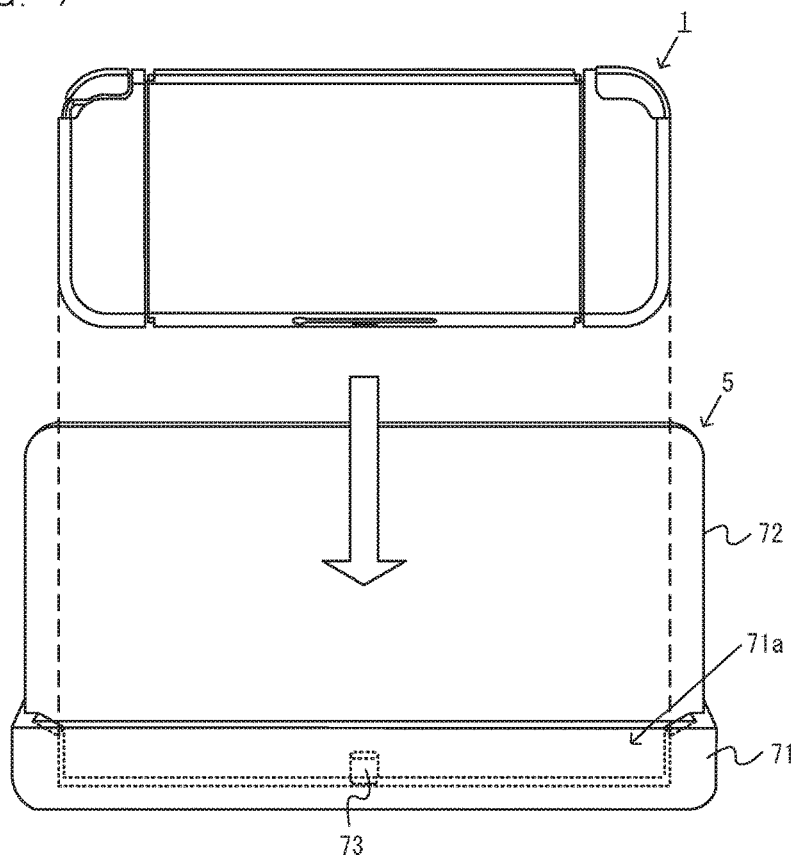
FIG. 7 shows a non-limiting example of external configuration of a cradle 5.

FIG. 7 shows an example of external configuration of the cradle 5. The cradle 5 includes a housing on which the integrated apparatus or only the main body apparatus 2 is detachably mountable (or attachable). In the exemplary embodiment, as shown in FIG. 7, the housing includes a first supporting portion 71 including a groove 71a formed therein, and a generally planar second supporting portion 72.

As shown in FIG. 7, the groove 71a formed in the first supporting portion 71 has a shape corresponding to the shape of a lower portion of the above-described integrated apparatus. Specifically, the groove 71a is so shaped as to allow the lower portion of the integrated apparatus to be inserted thereto. More specifically, the shape of the groove 71a is generally matched to the shape of the lower portion of the main body apparatus 2. Therefore, the lower portion of the integrated apparatus may be inserted into the groove 71a, so that the integrated apparatus is mounted on the cradle 5. The second supporting portion 72 supports a front surface of the integrated apparatus having the lower portion inserted into the groove 71a (i.e., supports the surface on which the display 12 is provided). The second supporting portion 72 allows the cradle 5 to support the integrated apparatus more stably. The shape of the housing shown in FIG. 7 is merely illustrative. In another exemplary embodiment, the housing of the cradle 5 may have any shape that allows the main body apparatus 2 to be mounted thereon.

As shown in FIG. 7, the cradle 5 includes the main body terminal 73 usable by the cradle 5 to communicate with the integrated apparatus. As shown in FIG. 7, the main body terminal 73 is provided on a bottom surface of the groove 71a, which is formed in the first supporting portion 71. More specifically, the main body terminal 73 is provided at a position where, in a case where the integrated apparatus is attached to the cradle 5, the lower terminal 27 of the main body apparatus 2 comes into contact with the main body terminal 73. In the exemplary embodiment, the main body terminal 73 is a USB connector (more specifically, a male connector). In the exemplary embodiment, the integrated apparatus is attachable to the cradle 5 in any of two orientations in the depth direction, namely, regardless of whether the front surface of the integrated apparatus faces the second support portion 72 or a rear surface of the integrated apparatus faces the second support portion 72. The lower terminal 27 of the main body apparatus 2 and the main body terminal 73 of the cradle 5 have symmetrical shapes in the depth direction (i.e., the z-axis direction shown in FIG. 1), and thus the main body apparatus 2 and the cradle 5 are communicable with each other in whichever orientation, among the above-mentioned two orientations in the depth direction, the integrated apparatus may be mounted on the cradle 5.

Figure 10:
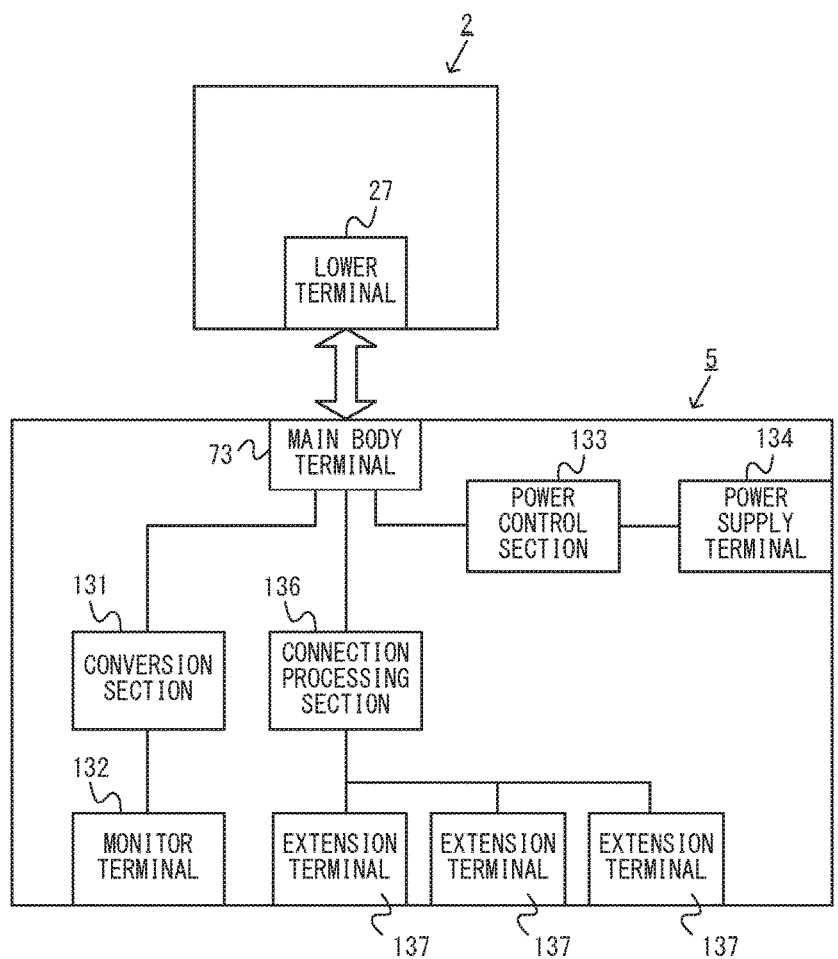
FIG. 10 is a block diagram showing a non-limiting example of internal configuration of the cradle 5.

Although not shown in FIG. 7, the cradle 5 includes a terminal on a rear surface of the housing (in the exemplary embodiment, includes a plurality of terminals, specifically, a monitor terminal 132, a power supply terminal 134, and extension terminals 137 shown in FIG. 10). The details of these terminals will be described below.

Regarding the cradle 5, the shapes, the numbers, and the installation positions of the above-described components (specifically, the housing, the terminals, the buttons, and the like) are optional. For example, in another exemplary embodiment, the housing may have another shape with which the integrated apparatus including the main body apparatus 2 and the left and right controllers 3 and 4 attached thereto, or a single body of the main body apparatus 2, is supported. Some of the terminals provided in the housing may be provided on a front surface of the housing. In still another exemplary embodiment, the cradle 5 may not include at least one of the above-described components.

FIG. 8 is a block diagram showing an example of internal configuration of the main body apparatus 2. The main body apparatus 2 includes components 81 through 98 shown in FIG. 8 in addition to the components shown in FIG. 3. At least one of the components 81 through 98 may be mounted as an electronic component on an electronic circuit board and accommodated in the housing 11.

The main body apparatus 2 includes a CPU (Central Processing Unit) 81. The CPU 81 is an information processing section that executes various types of information process executable by the main body apparatus 2. The CPU 81 executes an information processing program (e.g., game program) stored on a storage section (specifically, an internal storage medium such as a flash memory 84 or the like, an external storage medium attached to each of the slots 23 and 24, or the like) to execute various types of information process.

The main body apparatus 2 includes the flash memory 84 and the DRAM (Dynamic Random Access Memory) 85 as examples of internal storage medium built in the main body apparatus 2. The flash memory 84 and the DRAM 85 are connected with the CPU 81. The flash memory 84 is mainly usable to store various pieces of data (or programs) to be saved on the main body apparatus 2. The DRAM 85 is usable to temporarily store various pieces of data used for the information process.

The main body apparatus 2 includes a first slot interface (hereinafter, the "interface" will be abbreviated as "I/F") 91. The main body apparatus 2 includes a second slot I/F 92. The first slot I/F 91 and the second slot I/F 92 are connected with the CPU 81. The first slot I/F 91 is connected with the first slot 23, and follows an instruction from the CPU 81 to read and write data from and to the first type storage medium (e.g., SD card) attached to the first slot 23. The second slot I/F 92 is connected with the second slot 24, and follows an instruction from the CPU 81 to read and write data from and to the second type storage medium (e.g., dedicated memory card) attached to the second slot 24.

The CPU 81 appropriately transfers data between the flash memory 84/the DRAM 85 and the above-described storage mediums to execute the above-described information process.

The main body apparatus 2 includes a network communication section 82. The network communication section 82 is connected with the CPU 81. The network communication section 82 communicates (specifically, via wireless communication) with an external apparatus via a network. In the exemplary embodiment, in a first communication form, the network communication section 82 is connected with a wireless LAN by a system compliant with the Wi-Fi standards to communicate with an external apparatus. In a second communication form, the network communication section 82 wirelessly communicates with another main body apparatus 2 of the same type by a predetermined communication system (e.g., communication based on an original protocol or infrared light communication). The wireless communication in the second communication form may be performed with another main body apparatus 2 located in a closed local network area and thus realizes a so-called "local communication", in which a plurality of the main body apparatuses 2 are communicated directly to each other to transmit and receive data.

The main body apparatus 2 includes a controller communication section 83. The controller communication section 83 is connected with the CPU 81. The controller communication section 83 wirelessly communicates with the left controller 3 and/or the right controller 4. The communication system between the main body apparatus 2 and the left controller 3 or the right controller 4 is optional. In the exemplary embodiment, the controller communication section 83 performs communication compliant with the Bluetooth (registered trademark) standards with the left controller 3 and with the right controller 4.

The CPU 81 is connected with the left terminal 17, the right terminal 21, and the lower terminal 27. When communicating with the left controller 3 in a wired manner, the CPU 81 transmits data to the left controller 3 via the left terminal 17 and also receives operation data from the left controller 3 via the left terminal 17. When communicating with the right controller 4 in a wired manner, the CPU 81 transmits data to the right controller 4 via the right terminal 21 and also receives operation data from the right controller 4 via the right terminal 21. When communicating with the cradle 5, the CPU 81 transmits data to the cradle 5 via the lower terminal 27. As described above, in the exemplary embodiment, the main body apparatus 2 can perform both wired communication and wireless communication with each of the left controller 3 and the right controller 4. In a case where the integrated apparatus including the main body apparatus 2 and the left and right controllers 3 and 4 attached thereto, or a single body of the main body apparatus 2, is attached to the cradle 5, the main body apparatus 2 outputs data (e.g., image data or sound data) to the stationary monitor 6 via the cradle 5.

The main body apparatus 2 can communicate with a plurality of the left controllers 3 simultaneously (in other words, in parallel). The main body apparatus 2 can communicate with a plurality of the right controllers 4 simultaneously (in other words, in parallel). Thus, the user can input data to the main body apparatus 2 using the plurality of left controllers 3 and the plurality of right controllers 4.

The main body apparatus 2 includes a touch panel controller 86, which is a circuit that controls the touch panel 13. The touch panel controller 86 is connected between the touch panel 13 and the CPU 81. Based on a signal from the touch panel 13, the touch panel controller 86 generates data indicating, for example, the position where a touch input has been provided. Then, the touch panel controller 86 outputs the data to the CPU 81.

The display 12 is connected with the CPU 81. The CPU 81 displays, on the display 12, an generated image (e.g., image generated by executing the above-described information process) and/or an externally acquired image.

The main body apparatus 2 includes a codec circuit 87 and the speakers (specifically, a left speaker and a right speaker) 88. The codec circuit 87 is connected with the speakers 88 and the sound input/output terminal 25 and also connected with the CPU 81. The codec circuit 87 controls the input and output of sound data to and from the speakers 88 and the sound input/output terminal 25. Specifically, when receiving sound data from the CPU 81, the codec circuit 87 performs D/A conversion on the sound data and outputs a resultant sound signal to the speakers 88 or the sound input/output terminal 25. As a result, a sound is output from the speakers 88 or a sound output section (e.g., earphone) connected with the sound input/output terminal 25. When receiving a sound signal from the sound input/output terminal 25, the codec circuit 87 performs A/D conversion on the sound signal and outputs resultant sound data in a predetermined format to the CPU 81. The sound volume buttons 26 are connected with the CPU 81. Based on an input to the sound volume buttons 26, the CPU 81 controls the volume of the sound to be output from the speakers 88 or the sound output section.

The main body apparatus 2 includes a power control section 97 and a battery 98. The power control section 97 is connected with the battery 98 and the CPU 81. Although not shown in FIG. 8, the power control section 97 is connected with various components of the main body apparatus 2 (specifically, components that receive power supplied from the battery 98, the left terminal 17, and the right terminal 21). Based on a command from the CPU 81, the power control section 97 controls the supply of power from the battery 98 to the above-mentioned components. The power control section 97 is connected with the power button 28. Based on an input to the power button 28, the power control section 97 controls the supply of power to the above-mentioned components. Specifically, in a case where an operation of turning off the power supply is performed on the power button 28, the power control section 97 stops the supply of power to all or a part of the above-mentioned components. In a case where an operation of turning on the power supply is performed on the power button 28, the power control section 97 starts the supply of power to all or a part of the above-mentioned components. The power control section 97 outputs, to the CPU 81, information indicating an input to the power button 28 (specifically, information indicating whether or not the power button 28 has been pressed).

The battery 98 is connected with the lower terminal 27. In a case where an external charging apparatus (e.g., cradle 5) is connected with the lower terminal 27 and power is supplied to the main body apparatus 2 via the lower terminal 27, the battery 98 is charged with the supplied power.

The main body apparatus 2 includes a cooling fan 96 usable to release heat inside the main body apparatus 2. The cooling fan 96 is operated to introduce air outside the housing 11 through the absorption holes 11*d* and also to release air inside the housing 11 through the exhaust hole 11*c*, so that heat inside the housing 11 is released. The cooling fan 96 is connected with the CPU 81, and the operation of the cooling fan 96 is controlled by the CPU 81. The main body apparatus 2 includes a temperature sensor 95, which detects the temperature inside the main body apparatus 2. The temperature sensor 95 is connected with the CPU 81, and a detection result provided by the temperature sensor 95 is output to the CPU 81. Based on the detection result provided by the temperature sensor 95, the CPU 81 controls the operation of the cooling fan 96.

Figure 9:
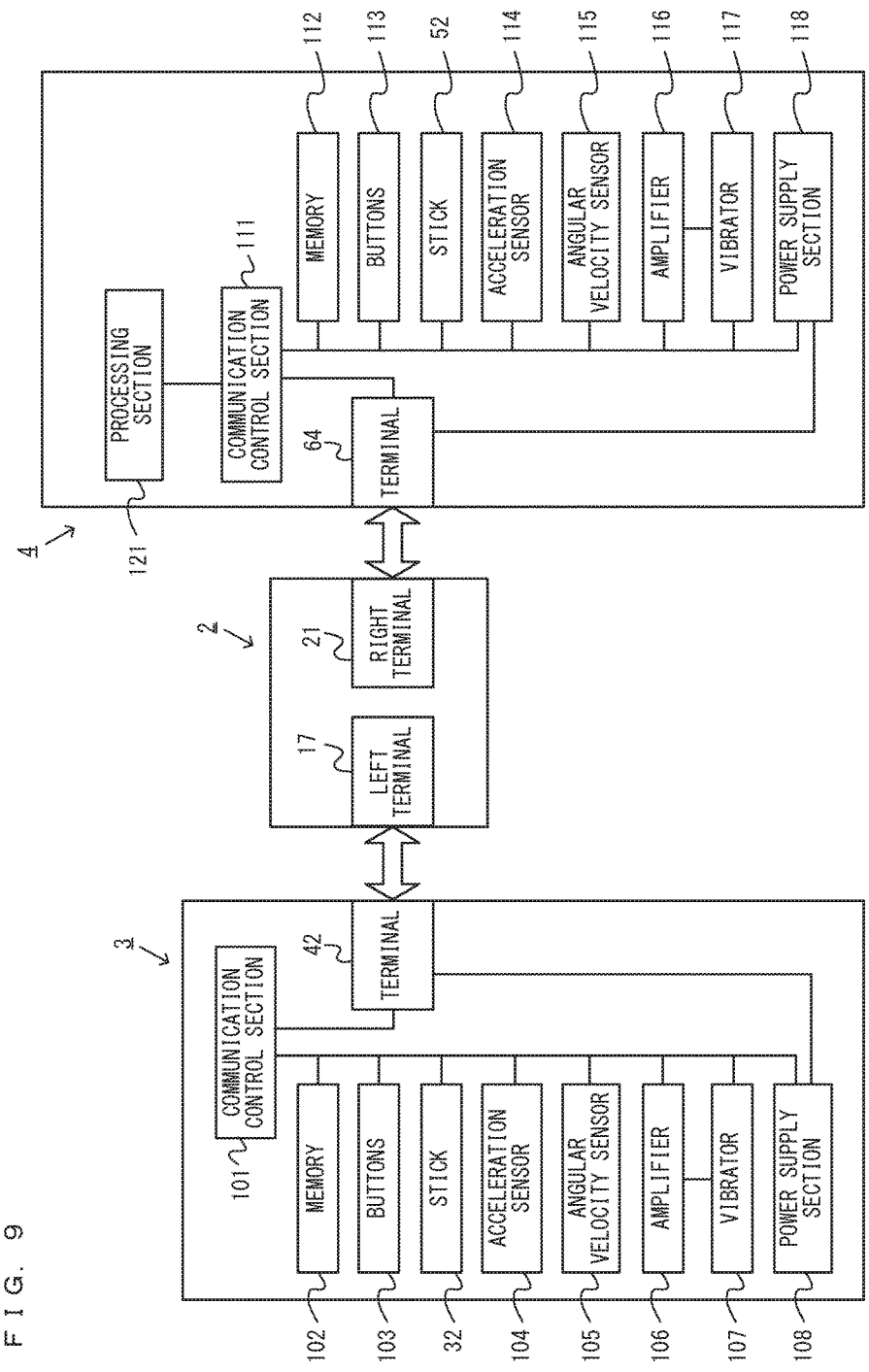
FIG. 9 is a block diagram showing a non-limiting example of internal configuration of the information processing system 1.

FIG. 9 is a block diagram showing an example of internal configuration of the information processing system 1. Among the components of the information processing system 1, the components of the main body apparatus 2 are shown in detail in FIG. 8 and thus are omitted in FIG. 9.

The left controller 3 includes a communication control section 101, which communicates with the main body apparatus 2. As shown in FIG. 9, the communication control section 101 is connected with components including the terminal 42. In the exemplary embodiment, the communication control section 101 can communicate with the main body apparatus 2 by wired communication via the terminal 42 and also by wireless communication with no use of the terminal 42. The communication control section 101 controls a method of communication performed by the left controller 3 with the main body apparatus 2. In in a case where the left controller 3 is attached to the main body apparatus 2, the communication control section 101 communicates with the main body apparatus 2 via the terminal 42. In a case where the left controller 3 is detached from the main body apparatus 2, the communication control section 101 wirelessly communicates with the main body apparatus 2 (specifically, the controller communication section 83). The wireless communication between the controller communication section 83 and the communication control section 101 is performed in conformity to, for example, the Bluetooth (registered trademark) standards.

The left controller 3 includes a memory 102 such as, for example, a flash memory or the like. The communication control section 101 includes, for example, a microcomputer (or a microprocessor) and executes firmware stored on the memory 102 to perform various types of process.

The left controller 3 includes buttons 103 (specifically, the buttons 33 through 39, 43 and 44). The left controller 3 includes the analog stick ("stick" in FIG. 9) 32. The buttons 103 and the analog stick 32 each output information regarding an operation performed thereon to the communication control section 101 repeatedly at appropriate timing.

The left controller 3 includes an acceleration sensor 104. In the exemplary embodiment, the acceleration sensor 104 detects magnitudes of linear accelerations in predetermined three axis directions (e.g., X-, Y- and Z-axis directions shown in FIG. 11). The acceleration sensor 104 may detect an acceleration in one axis direction or accelerations in two axis directions. The left controller 3 includes an angular velocity sensor 105. In the exemplary embodiment, the angular velocity sensor 105 detects angular velocities about predetermined three axes (e.g., X, Y and Z axes shown in FIG. 11). The angular velocity sensor 105 may detect an angular velocity about one axis or angular velocities about two axes. The acceleration sensor 104 and the angular velocity sensor 105 are connected with the communication control section 101. Detection results provided by the acceleration sensor 104 and the angular velocity sensor 105 are each output to the communication control section 101 repeatedly at appropriate timing.

The communication control section 101 acquires information regarding an input (specifically, information regarding an operation or a detection result provided by any of the sensors) from each of the input sections (specifically, the buttons 103, the analog stick 32, and the sensors 104 and 105). The communication control section 101 transmits, to the main body apparatus 2, operation data including the acquired information (or information obtained by performing a predetermined process on the acquired information). The operation data is transmitted repeatedly at a rate of once every predetermined time period. The interval at which information regarding an input is transmitted to the main body apparatus 2 may or may not be the same among the input sections.

The above-mentioned operation data is transmitted to the main body apparatus 2, so that the main body apparatus 2 obtains the inputs provided to the left controller 3. That is, the main body apparatus 2 distinguishes operations made on the buttons 103 and the analog stick 32 from each other, based on the operation data. The main body apparatus 2 computes information regarding the motion and/or the attitude of the left controller 3 based on the operation data (specifically, the detection results provided by the acceleration sensor 104 and the angular velocity sensor 105).

The left controller 3 includes a vibrator 107 usable to give notification to the user by a vibration. In the exemplary embodiment, the vibrator 107 is controlled by a command from the main body apparatus 2. Specifically, upon receipt of the above-mentioned command from the main body apparatus 2, the communication control section 101 drives the vibrator 107 in accordance with the command The left controller 3 includes an amplifier 106. Upon receipt of the above-mentioned command, the communication control section 101 outputs a control signal corresponding to the command to the amplifier 106. The amplifier 106 amplifies the control signal from the communication control section 101, generates a driving signal for driving the vibrator 107, and outputs the driving signal to the vibrator 107. As a result, the vibrator 107 is operated.

The left controller 3 includes a power supply section 108. In the exemplary embodiment, the power supply section 108 includes a battery and a power control circuit. Although not shown in FIG. 9, the power control circuit is connected with the battery and also connected with components of the left controller 3 (specifically, components that receive power supplied from the battery). The power control circuit controls the supply of power from the battery to the above-mentioned components. The battery is connected with the terminal 42. In the exemplary embodiment, in a case where the left controller 3 is attached to the main body apparatus 2, the battery is charged via the terminal 42 with power supplied from the main body apparatus 2 under a predetermined condition.

As shown in FIG. 9, the right controller 4 includes a communication control section 111, which communicates with the main body apparatus 2. The right controller 4 includes a memory 112, which is connected with the communication control section 111. The communication control section 111 is connected with components including the terminal 64. The communication control section 111 and the memory 112 have functions similar to those of the communication control section 101 and the memory 102, respectively, of the left controller 3. Thus, the communication control section 111 can communicate with the main body apparatus 2 by wired communication via the terminal 64 and also by wireless communication with no use of the terminal 64 (specifically, communication compliant with the Bluetooth (registered trademark) standards). The communication control section 111 controls a method of communication performed by the right controller 4 with the main body apparatus 2.

The right controller 4 includes input sections similar to the input sections of the left controller 3 (specifically, buttons 113, the analog stick 52, an acceleration sensor 114, and an angular velocity sensor 115). These input sections have functions similar to those of the input sections of the left controller 3 and operate similarly to the input sections of the left controller 3.

The right controller 4 includes a vibrator 117 and an amplifier 116. The vibrator 117 and the amplifier 116 operate similarly to the vibrator 107 and the amplifier 106, respectively, of the left controller 3. Specifically, the communication control section 111, in accordance with a command from the main body apparatus 2, uses the amplifier 116 to cause the vibrator 117 to operate.

The right controller 4 includes a power supply section 118. The power supply section 118 has a function similar to that of the power supply section 108 of the left controller 3, and operates similarly to the power supply section 108. That is, the power supply section 118 controls the supply of power to components that receive power supplied from a battery. In a case where the right controller 4 is attached to the main body apparatus 2, the battery is charged via the terminal 64 with power supplied from the main body apparatus 2 under a predetermined condition.

The right controller 4 includes a processing section 121. The processing section 121 is connected with the communication control section 111 and is also connected with an NFC communication section 122. The processing section 121, in accordance with a command from the main body apparatus 2, performs a process of managing the NFC communication section 122. For example, the processing section 121 controls an operation of the NFC communication section 122 in accordance with a command from the main body apparatus 2. The processing section 121 controls the start of the NFC communication section 122 or controls an operation of the NFC communication section 122 (specifically, reading, writing, or the like) performed on a communication partner thereof (e.g., NFC tag). The processing section 121 receives, from the main body apparatus 2 via the communication control section 111, information to be transmitted to the communication partner and passes the information to the NFC communication section 122. The processing section 121 also acquires, via the NFC communication section 122, information received from the communication partner and transmits the information to the main body apparatus 2 via the communication control section 111. In accordance with a command from the main body apparatus 2, the processing section 121 performs a process of managing an infrared image capturing section 123. For example, the processing section 121 causes the infrared image capturing section 123 to perform an image capturing operation, or acquires information based on an image capturing result (information of a captured image, information computed from such information, or the like) and transmits the information to the main body apparatus 2 via the communication control section 111.

FIG. 10 is a block diagram showing an example of internal configuration of the cradle 5. The internal configuration of the main body apparatus 2 is shown in detail in FIG. 8 and thus is omitted in FIG. 10.

As shown in FIG. 10, the cradle 5 includes a conversion section 131 and a monitor terminal 132. The conversion section 131 is connected with the main body terminal 73 and the monitor terminal 132. The conversion section 131 converts formats of signals of an image (or video) and a sound received from the main body apparatus 2 into formats in which the image and the sound are to be output to the stationary monitor 6. In the exemplary embodiment, the main body apparatus 2 outputs an image signal and a sound signal as display port signals (i.e., signals compliant with the DisplayPort standard) to the cradle 5. In the exemplary embodiment, the communication between the cradle 5 and the stationary monitor 6 is performed based on the HDMI (registered trademark) standard. That is, the monitor terminal 132 is an HDMI terminal, and the cradle 5 and the stationary monitor 6 are connected to each other by an HDMI cable. The conversion section 131 converts display port signals (specifically, signals representing the video and the sound) received from the main body apparatus 2 via the main body terminal 73 into HDMI signals. The HDMI signals obtained as a result of the conversion are output to the stationary monitor 6 via the monitor terminal 132.

The cradle 5 includes a power control section 133 and a power supply terminal 134. The power supply terminal 134 is connectable with a charging apparatus (e.g., an AC adapter or the like; not shown). In the exemplary embodiment, the power supply terminal 134 is connected with an AC adapter, and mains electricity is supplied to the cradle 5. In a case where the main body apparatus 2 is attached to the cradle 5, the power control section 133 supplies power from the power supply terminal 134 to the main body apparatus 2 via the main body terminal 73. As a result, the battery 98 of the main body apparatus 2 is charged.

The cradle 5 includes a connection processing section 136 and extension terminals 137. The extension terminals 137 are each connectable with another apparatus. In the exemplary embodiment, the cradle 5 includes a plurality of (more specifically, three) USB terminals as the extension terminals 137. The connection processing section 136 is connected with the main body terminal 73 and the extension terminals 137. The connection processing section 136 has a function of a USB hub and, for example, manages the communication between an apparatus connected with any of the extension terminals 137 and the main body apparatus 2 connected with the main body terminal 73 (i.e., transmits a signal from a certain apparatus to other apparatuses while distributing the signal appropriately). As described above, in the exemplary embodiment, the information processing system 1 is communicable with another apparatus via the cradle 5. The connection processing section 136 may be capable to change the communication speed, or supply power to an apparatus connected to any of the extension terminals 137.

As described above, in the information processing system 1 according to the exemplary embodiment, the left controller 3 and the right controller 4 are attachable to, and detachable from, the main body apparatus 2. The integrated apparatus including the main body apparatus 2 and the left and right controllers 3 and 4 attached thereto, or a single body of the main body apparatus 2, may be attached to the cradle 5 to output an image (and a sound) to the stationary monitor 6. Hereinafter, an operation of the information processing system 1 will be described in which the main body apparatus 2, in a state where the left controller 3 and the right controller 4 are detached therefrom, is attached to the cradle 5 to output an image (or a sound) to the stationary monitor 6.

As described above, in the exemplary embodiment, the information processing system 1 is usable in the state where the left controller 3 and the right controller 4 are detached from the main body apparatus 2 (referred to as a "separate state"). The information processing system 1 in the separate state is usable to make an operation on the same application (e.g., a game application) in a case where a single user uses both of the left controller 3 and the right controller 4. In a case where a plurality of users make an operation on the same application, a plurality of pairs of the left controller 3 and the right controller 4 may be prepared, so that each of the users uses one of such pairs.

Figure 11:
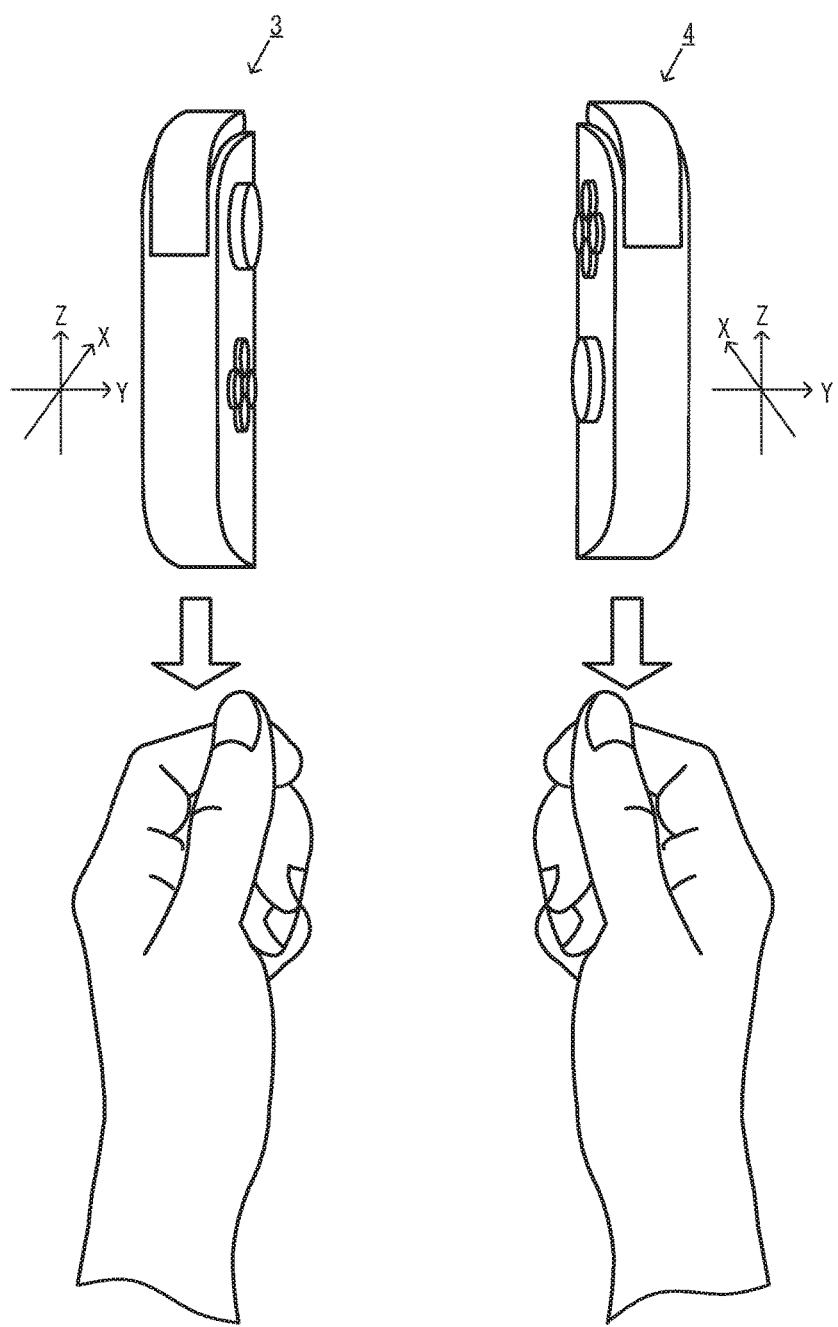
FIG. 11 shows a non-limiting example of how a single user uses the information processing system 1 while holding a pair of the left controller 3 and the right controller 4 in a state where the left controller 3 and the right controller 4 are detached from the main body apparatus 2.
Figure 12:
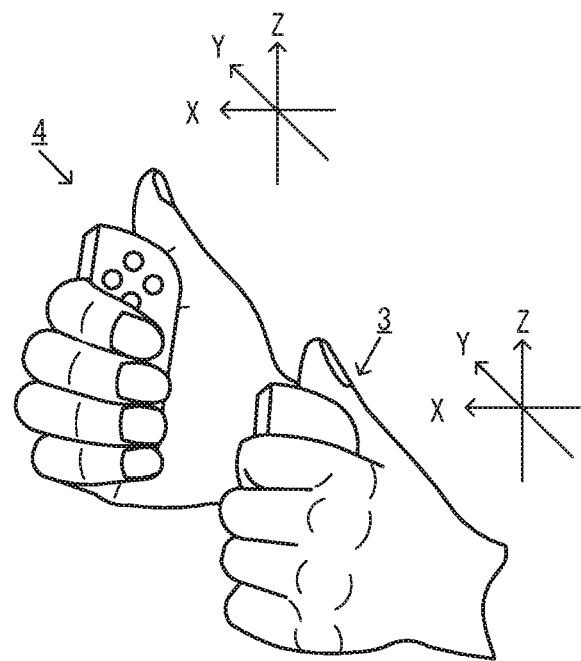
FIG. 12 shows a non-limiting example of how a single user uses the information processing system 1 while holding the pair of the left controller 3 and the right controller 4 in a state where the left controller 3 and the right controller 4 are detached from the main body apparatus 2.

FIG. 11 and FIG. 12 show an example in which a single user uses the information processing system 1 in the separate state while holding a pair of the left controller 3 and the right controller 4. As shown in FIG. 11 and FIG. 12, in the separate state, the user can view an image displayed on the stationary monitor 6 while holding the left controller 3 with his/her left hand and holding the right controller 4 with his/her right hand to make an operation.

For example, in the exemplary embodiment, the user holds the left controller 3, which is longer in the up-down direction in FIG. 1A and is generally plate-shaped, with his/her left hand such that the left controller 3 is oriented as follows: a downward direction in the longer direction (the negative y-axis direction shown in FIG. 1) is downward in the vertical direction, the side surface facing the main body apparatus 2 when the left controller 3 is attached to the main body apparatus 2 (side surface on which the slider 40 is provided) is directed forward, (direction away from the user), and the main surface (surface on which the analog stick 32 and the like are provided) is directed rightward. The user holds the right controller 4, which is longer in the up-down direction in FIG. 1A and is generally plate-shaped, with his/her right hand such that the right controller 4 is directed as follows: a downward direction in the longer direction (the negative y-axis direction shown in FIG. 1) is downward in the vertical direction, the side surface facing the main body apparatus 2 when the right controller 4 is attached to the main body apparatus 2 (side surface on which the slider 62 is provided) is directed forward, and the main surface (surface on which the analog stick 52 and the like are provided) is directed leftward. From the state of holding the left controller 3 with his/her left hand and holding the right controller 4 with his/her right hand (hereinafter, the attitude of each of the left controller 3 and the right controller 4 in the above-described orientation may be referred to as a "reference attitude"), the user moves each of the controllers 3 and 4 upward, downward, leftward, rightward, forward or rearward, rotates each of the controllers 3 and 4, or swings each of the controllers 3 and 4. Thus, a game is played in accordance with the motion or the attitude of each of the controllers 3 and 4.

For easier understanding of the direction of acceleration or angular velocity caused in the left controller 3, the following directions will be defined for the left controller 3.

The forward direction in the above-described held state (direction from the rounded side surface toward the side surface attachable to the main body apparatus 2; the negative x-axis direction shown in FIG. 1) will be referred to as a "positive X-axis direction". The rightward direction in the above-described held state (direction from the rear surface toward the main surface; the negative z-axis direction shown in FIG. 1) will be referred to as a "positive Y-axis direction". The upward direction in the above-described held state (upward direction in the longer direction; the positive y-axis direction shown in FIG. 1) will be referred to as a "positive Z-axis direction". The acceleration sensor 104 of the left controller 3 is capable of detecting an acceleration in each of the X-, Y- and Z-axis directions. The angular velocity sensor 105 is capable of detecting an angular velocity about each of the X-, Y- and Z-axis directions. For easier understanding of the direction of acceleration or angular velocity caused in the right controller 4, the following directions will be defined for the right controller 4. The forward direction in the above-described held state (direction from the rounded side surface toward the side surface attachable to the main body apparatus 2; the positive x-axis direction shown in FIG. 1) will be referred to as a "positive X-axis direction". The rightward direction in the above-described held state (direction from the main surface toward the rear surface; the positive z-axis direction shown in FIG. 1) will be referred to as a "positive Y-axis direction". The upward direction in the above-described held state (upward direction in the longer direction; the positive y-axis direction shown in FIG. 1) will be referred to as a "positive Z-axis direction". The acceleration sensor 114 of the right controller 4 is capable of detecting an acceleration in each of the X-, Y- and Z-axis directions. The angular velocity sensor 115 is capable of detecting an angular velocity about each of the X-, Y- and Z-axis directions.

FIG. 13 through FIG. 15 each show an example of game image displayed in a game played by the left controller 3 and the right controller 4 being moved. As shown in FIG. 13, in this game example, an image of a game in which a player object PO and an opponent object EO fight against each other (e.g., boxing game) is displayed on the stationary monitor 6. The user operating the left controller 3 and the right controller 4 may swing the left controller 3 and/or the right controller 4 or change the attitude of the left controller 3 and/or the right controller 4 to operate the player object PO. For example, the user may swing the left controller 3 to control the motion of a first object G1, which represents the left glove (left fist) of the player object PO, and may swing the right controller 4 to control the motion of a second object G2, which represents the right glove (right fist) of the player object PO. Specifically, in a case where the user makes an operation of swinging his/her left hand holding the left controller 3 as if throwing a left punch, the first object G1 representing the left glove of the player object PO moves toward a position where the opponent object EO is located. In a case where the user makes an operation of swinging his/her right hand holding the right controller 4 as if throwing a right punch, the second object G2 representing the right glove of the player object PO moves toward the position where the opponent object EO is located.

For example, as shown in FIG. 14, in a case where the right controller 4 is swung as if being protruded forward (in the positive X-axis direction of the right controller 4) from a state shown in FIG. 13 where neither the left controller 3 nor the right controller 4 is moved, the second object G2 of the player object PO moves toward the opponent object EO in accordance with the movement of the right controller 4. As a result, a game image showing that the player object PO throws a right punch to the opponent object EO is displayed.

The direction of the movement of the first object G1 is set by the attitude of the left controller 3 when the left controller 3 is swung as if being protruded. The direction of the movement of the second object G2 is set by the attitude of the right controller 4 when the right controller 4 is swung as if being protruded. In a case where, for example, the right controller 4 is moved in the positive X-axis direction as shown in FIG. 14, the movement direction of the second object G2 is set in accordance with the attitude in the roll direction of the right controller 4 at the time of the movement. For example, in exemplary embodiment, an inclination of the Y-axis direction of the right controller 4 with respect to the direction in which the gravitational acceleration acts in a real space while the right controller 4 is moving is calculated, and the movement direction of the second object G2 is calculated based on the resultant inclination of the Y-axis direction. Specifically, in a case where the inclination of the Y-axis direction indicates that the right controller 4 is rotated rightward in the roll direction with respect to the reference attitude, the second object G2 moves rightward in a virtual space. In a case where the inclination of the Y-axis direction indicates that the right controller 4 is rotated leftward in the roll direction with respect to the reference attitude, the second object G2 moves leftward in the virtual space. The angle at which the movement direction is shifted in the rightward direction or the leftward direction is calculated in accordance with the angle of inclination of the Y-axis direction.

In this game example, even in a case where the distance between the player object PO and the opponent object EO is relatively long in the virtual space, a punch may be thrown. One of the arms of the player object PO is extended, so that the first object G1 or the second object G2 move a relatively long distance. The first object G1 or the second object G2 finishes moving after colliding against another object (e.g., opponent object EO) or after moving a predetermined distance, and returns to a movement start position, from which the first object G1 or the second object G2 started moving (e.g., the position of the left hand or the right hand of the player object PO shown in FIG. 13). The first object G1 or the second object G2 returns to the movement start position, and thus a next movement toward the opponent object EO is permitted to be made. In other words, the next punch is permitted to be thrown. Therefore, a time period from the start of the movement of the first object G1 or the second object G2 from the movement start position until the return thereof to the movement start position is longer than such a time period of a general boxing game.

In this game example, such a movement time period may be utilized to change a track of the movement in accordance with the attitude or the motion of the left controller 3 or the right controller 4 even while the first object G1 or the second object G2 is moving (typically, while the first object G1 or the second object G2 is moving toward the opponent object EO). For example, in a case where the left controller 3 or the right controller 4 is rotated in the roll direction or in the yaw direction from the attitude thereof at the time of start of the movement of the first object G1 or the second object G2, the track of the first object G1 or the second object G2 is changed in accordance with the rotation.

In an example, in the exemplary embodiment, the rotation rate (angular velocity) of the left controller 3 or the right controller 4 about the X axis after the first object G1 or the second object G2 starts moving is set as the rotation rate in the roll direction. The track of the first object G1 or the second object G2 is changed based on the rotation rate about the X axis while the first object G1 or the second object G2 is moving. Specifically, in a case where the rotation rate at which the left controller 3 is rotated about the X axis rightward in the roll direction while the first object G1 is moving is obtained, the track of the first object G1 is changed rightward in the virtual space. In a case where the rotation rate at which the left controller 3 is rotated about the X axis leftward in the roll direction while the first object G1 is moving is obtained, the track of the first object G1 is changed leftward in the virtual space. In a case where the rotation rate at which the right controller 4 is rotated about the X axis rightward in the roll direction while the second object G2 is moving is obtained, the track of the second object G2 is changed rightward in the virtual space. In a case where the rotation rate at which the right controller 4 is rotated about the X axis leftward in the roll direction while the second object G2 is moving is obtained the track of the second object G2 is changed leftward in the virtual space.

In another example, in the exemplary embodiment, the rotation rate (angular velocity) of the left controller 3 or the right controller 4 about the gravity direction in the real space after the first object G1 or the second object G2 starts moving is set as the rotation rate in the yaw direction. The track of the first object G1 or the second object G2 is changed based on the rotation rate about the gravity direction while the first object G1 or the second object G2 is moving. Specifically, in a case where the rotation rate at which the left controller 3 is rotated about the gravity direction rightward in the yaw direction while the first object G1 is moving is obtained, the track of the first object G1 is changed rightward in the virtual space. In a case where the rotation rate at which the left controller 3 is rotated about the gravity direction leftward in the yaw direction while the first object G1 is moving is obtained, the track of the first object G1 is changed leftward in the virtual space. In a case where the rotation rate at which the right controller 4 is rotated about the gravity direction rightward in the yaw direction while the second object G2 is moving is obtained, the track of the second object G2 is changed rightward in the virtual space. In a case where the rotation rate at which the right controller 4 is rotated about the gravity direction leftward in the yaw direction while the second object G2 is moving is obtained, the track of the second object G2 is changed leftward in the virtual space.

In this game example, a determination on whether or not the left controller 3 or the right controller 4 has been swung is made based on the magnitude of the acceleration caused in the left controller 3 or the right controller 4. When the left controller 3 is determined to have been swung in the positive X-axis direction in a state where the first object G1 is located at the movement start position (hereinafter, this state will be referred to as a "first movement start-possible state"), the first object G1 starts moving from the movement start position toward the opponent object EO. When the right controller 4 is determined to have been swung in the positive X-axis direction in a state where the second object G2 is located at the movement start position (hereinafter, this state will be referred to as a "second movement start-possible state"), the second object G2 starts moving from the movement start position toward the opponent object EO. In the exemplary embodiment, even when the first object G1 is not in the first movement start-possible state, as long as the first object G1 is put into the first movement start-possible state within a predetermined time period after the left controller 3 is determined to have been swung in the positive X-axis direction, the movement of the first object G1 may be started from the movement start position toward the opponent object EO in accordance with the swing operation made on the left controller 3. Even when the second object G2 is not in the second movement start-possible state, as long as the second object G2 is put into the second movement start-possible state within a predetermined time period after the right controller 4 is determined to have been swung in the positive X-axis direction, the movement of the second object G2 may be started from the movement start position toward the opponent object EO in accordance with the swing operation made on the right controller 4. As described above, in the exemplary embodiment, even when the first object G1 and/or the second object G2 is not in the first movement start-possible state and/or the second movement start-possible state, the left controller 3 and/or the right controller 4 may be swung to issue an instruction to start moving the first object G1 and/or the second object G2. Therefore, even in a game in which a state where an operation instruction is issuable is caused intermittently, an operation is allowed to be made easily. Namely, as described above, in this game example, the time period from the start of the movement of the first object G1 or the second object G2 from the movement start position until the return thereof to the movement start position is longer than such a time period of a general boxing game. Therefore, it is conceivable that an operation of swinging the left controller 3 or the right controller 4 is made before the first object G1 or the second object G2 is put into the first movement start-possible start state or the second movement start-possible start state. Even when such an operation is made, such an operation is not invalidated but may be utilized for the game operation.

In this game example, as shown in FIG. 15, the first object G1 and the second object G2 may start moving at the same time from the movement start position to perform a predetermined action. For example, in a case where one of the first object G1 and the second object G2 starts moving and the other of the first object G1 and the second object G2 starts moving within a predetermine time period after the start of the one object, a "both-hand punch action", by which the first object G1 and the second object G2 act as a pair, is started. The "both-hand punch action" is as follows. It is displayed in the game image that a collision region A is formed between the first object G1 and the second object G2 while the first object G1 and the second object G2 are moving in the virtual space, and the first object G1 and the second object G2 move toward the opponent object EO in a state where the collision region A is formed. When the first object G1, the second object G2 or the collision region A, while moving, collides against the opponent object EO, a predetermined action is made on the opponent object EO that causes heavier damage thereon than when only the first object G1 or only the second object G2 collides against the opponent object EO. In an example, the "both-hand punch action" may provide an action of flinging the opponent object EO at the time of the collision or an action of making the opponent object EO unable to move. Even during the execution of the "both-hand punch action", the track of the movement of the first object G1 and/or the second object G2 may be changed in accordance with the attitude or the motion of the left controller 3 and/or the right controller 4. The track of the movement of the first object G1 and/or the second object G2 may be changed, so that the range of the collision region A is changed. Therefore, a strategic attack may be made to the opponent object EO.

In this game example, the player object PO may be moved in the virtual space in accordance with the motion or the attitude of both of the left controller 3 and the right controller 4. For example, when the both of the left controller 3 and the right controller 4 are rotated in the pitch direction or in the roll direction in the real space, the player object PO may be moved in accordance with the post-rotation inclination thereof. This will be described specifically. The inclination angles of the X-axis direction and the Y-axis direction of the left controller 3 with respect to the gravity direction in the real space, and the inclination angles of the X-axis direction and the Y-axis direction of the right controller 4 with respect to the gravity direction in the real space, are calculated. When the both of the left controller 3 and the right controller 4 are determined, based on the resultant inclination angles, to be inclined forward, the player object PO is moved forward in the virtual space by the movement amount in accordance with the forward inclination angles of both of the left controller 3 and the right controller 4 (e.g., the average value of the inclination angles of the left controller 3 and the right controller 4). When the both of the left controller 3 and the right controller 4 are determined, based on the resultant inclination angles, to be inclined rearward, the player object PO is moved rearward in the virtual space by the movement amount in accordance with the rearward inclination angles of both of the left controller 3 and the right controller 4 (e.g., the average value of the inclination angles of the left controller 3 and the right controller 4). When the both of the left controller 3 and the right controller 4 are determined, based on the resultant inclination angles, to be inclined leftward, the player object PO is moved leftward in the virtual space by the movement amount in accordance with the leftward inclination angles of both of the left controller 3 and the right controller 4 (e.g., the average value of the inclination angles of the left controller 3 and the right controller 4). When the both of the left controller 3 and the right controller 4 are determined, based on the resultant inclination angles, to be inclined rightward, the player object PO is moved rightward in the virtual space by the movement amount in accordance with the rightward inclination angles of both of the left controller 3 and the right controller 4 (e.g., the average value of the inclination angles of the left controller 3 and the right controller 4).

Shown with reference to FIG. 13 through FIG. 15 is an example of game played by one user with the stationary monitor 6 (for example, the opponent object EO is automatically controlled by the CPU 81). The game may be played by a plurality of users. In a case where the game is played by, for example, two users, the users each hold a pair of the left controller 3 and the right controller 4, and the users operate different player objects from each other. A display region of the stationary monitor 6 is divided into two regions, and an image for each of the users (image, as seen from the player object operated by each user, of the player object operated by the other player) is displayed in each of the divided regions. The users each make an operation of throwing a punch to the player object operated by the other user in such an operation environment, so that the player object of one of the users fights against the player object operated by the other user.

In a case where a plurality of users play a game, the information processing system 1 may communicate with another apparatus (e.g., another information processing system 1) to transmit and receive game data necessary to play the game. In such a case, the information processing apparatus may transmit and receive data with another apparatus connected with the Internet (wide area network) via the network communication section 82 described above, or may transmit and receive data by use of a so-called "local communication", by which communication is directly made with another apparatus located in a closed local network area.

Figure 16:
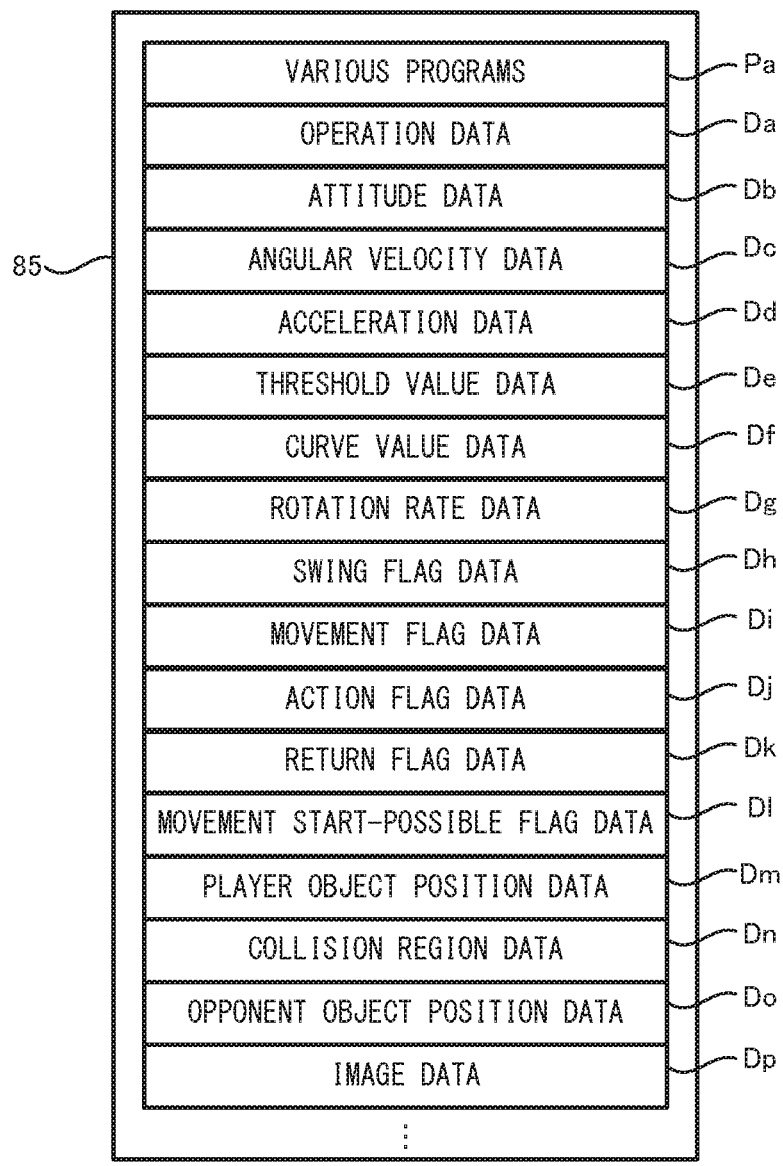
FIG. 16 shows a non-limiting example of data region set for a DRAM 85 in the main body apparatus 2 in the exemplary embodiment.

Now, with reference to FIG. 16 through FIG. 23, an example of process executed by the information processing system 1 in the exemplary embodiment will be described. FIG. 16 shows an example of data area set in the DRAM 85 of the main body apparatus 2 in the exemplary embodiment. In the DRAM 85, data used in another process is stored in addition to the data shown in FIG. 16. Such data used in another process will not be described in detail.

In a program storage area of the DRAM 85, various programs Pa executable by the information processing system 1 is stored. In the exemplary embodiment, the various programs Pa include a communication program usable for wireless communication with the left controller 3 or the right controller 4 described above, an application program usable to perform an information process (e.g., game process) based on data acquired from the left controller 3 and/or the right controller 4, a program usable to switch display devices on which images are to be displayed in accordance with the attachment or detachment of the main body apparatus 2 to or from the cradle 5, and the like. The various programs Pa may be stored on the flash memory 84 in advance, may be acquired from a storage medium attachable to, or detachable from, the information processing system 1 (e.g., the first type storage medium attached to the first slot 23 or the second type storage medium attached to the second slot 24) and stored on the DRAM 85, or may be acquired from another apparatus via a network such as the Internet or the like and stored on the DRAM 85. The CPU 81 executes the various programs Pa stored on the DRAM 85.

In a data storage area of the DRAM 85, various types of data usable for a communication process, an information process or the like executable by the information processing system 1 are stored. In the exemplary embodiment, operation data Da, attitude data Db, angular velocity data Dc, acceleration data Dd, threshold value data De, curve value data Df, rotation rate data Dg, swing flag data Dh, movement flag data Di, action flag data Dj, return flag data Dk, movement start-possible flag data Dl, player object position data Dm, collision region data Dn, opponent object position data Do, image data Dp and the like are stored.

The operation data Da is operation data appropriately acquired from the left controller 3 and the right controller 4. As described above, the operation data transmitted from each of the left controller 3 and the right controller 4 includes information regarding inputs from the input sections (specifically, the buttons, the analog sticks, and the sensors) (the information regarding the inputs specifically include information on the operations and detection results provided by the sensors). In the exemplary embodiment, the operation data is transmitted from the left controller 3 and the right controller 4 at a predetermined cycle via wireless communication, and the operation data Da is appropriately updated using the received operation data. The operation data Da may be updated every frame, which is a cycle of the process executed by the information processing system 1 as described below, or may be updated every cycle by which the operation data is transmitted via the above-described wireless communication.

The attitude data Db represents an attitude of each of the left controller 3 and the right controller 4 with respect to the direction of the gravitational acceleration in the real space. For example, the attitude data Db includes, for example, data representing the direction of the gravitational acceleration acting on each of the left controller 3 and the right controller 4, data representing the X-, Y- and Z-axis directions with respect to the gravitational acceleration direction.

The angular velocity data Dc represents an angular velocity caused in each of the left controller 3 and the right controller 4. For example, the angular velocity data Dc includes data representing the angular velocity about the X, Y- and Z axes caused in each of the left controller 3 and the right controller 4.

The acceleration data Dd represents an acceleration caused in each of the left controller 3 and the right controller 4. For example, the acceleration data Dd includes data representing the acceleration caused in each of the left controller 3 and the right controller 4 in each of the X-, Y- and Z-axis directions excluding the gravitational acceleration.

The threshold value data De represents a threshold value usable to make a determination on a swing motion made on each of the left controller 3 and the right controller 4. The curve value data Df represents a curve value C usable to calculate the movement direction or the track of each of the first object G1 and the second object G2. The rotation rate data Dg represents a motion of each of the left controller 3 and the right controller 4 (rotation rate V of each of the left controller 3 and the right controller 4) while the first object G1 or the second object G2 is moving.

The swing flag data Dh represents a swing flag, which is set to ON when the left controller 3 and the right controller 4 are each determined to have been swung. The movement flag Di represents a movement flag, which is set to ON when the first object G1 and the second object G2 are each moving in the virtual space. The action flag data Dj represents an action flag, which is set to ON when an action is being performed by use of the first object G1 and the second object G2 as a pair. The return flag data Dk represents a return flag, which is set to ON when the first object G1 and the second object G2 are each moving in a return path toward the movement start position in the virtual space. The movement start-possible flag data Dl represents a movement start-possible flag, which is set to ON when the first object G1 is put into the first movement start-possible state or the second object G2 is put into the second movement start-possible state.

The player object position data Dm represents the position and the direction (movement direction) of each of the first object G1, the second object G2, and the player object PO in the virtual space. The collision region data Dn represents the position, the shape, and the range of the collision region A in the virtual space. The opponent object position data Do represents the position and the orientation of the opponent object EO in the virtual space or represents the position and the orientation of an object released from the opponent object EO (e.g., object representing the left glove (left fist) or the right glove (right fist)) in the virtual space.

The image data Dp is usable to display an image (e.g., an image of a virtual object, an image of the field, or an image of the background) on the display screen of the display 12 of the main body apparatus 2 or the stationary monitor 6 during the game.

Figure 17:
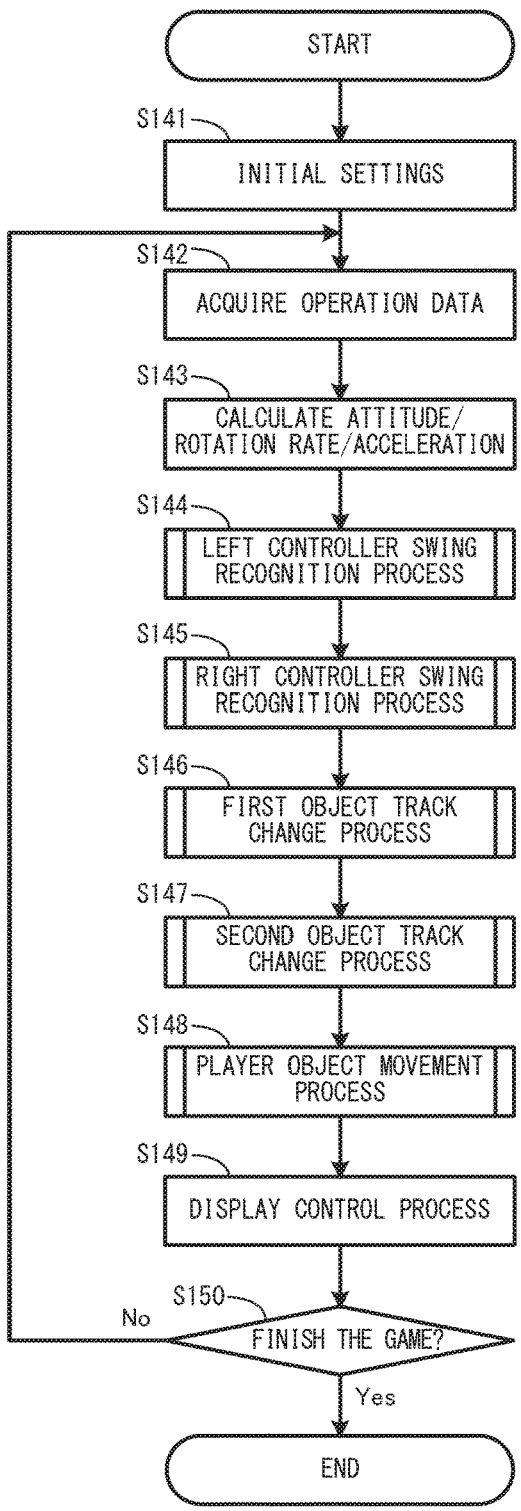
FIG. 17 is a flowchart showing a non-limiting example of game process executable by the information processing system 1.
Figure 18:
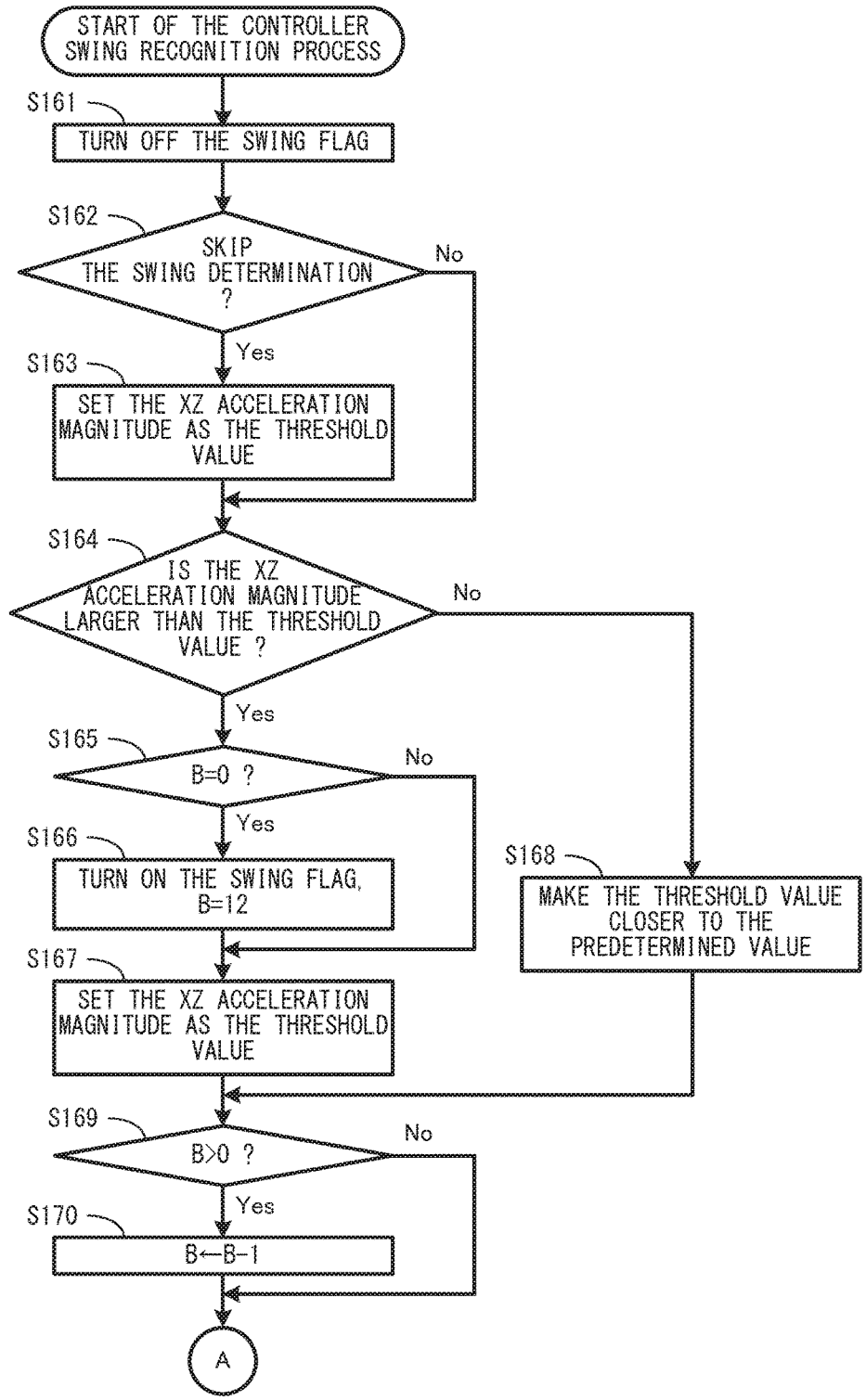
FIG. 18 shows a non-limiting example of sub routine representing details of a controller swing recognition process executed in step S144 and step S144 shown in FIG. 17.
Figure 19:
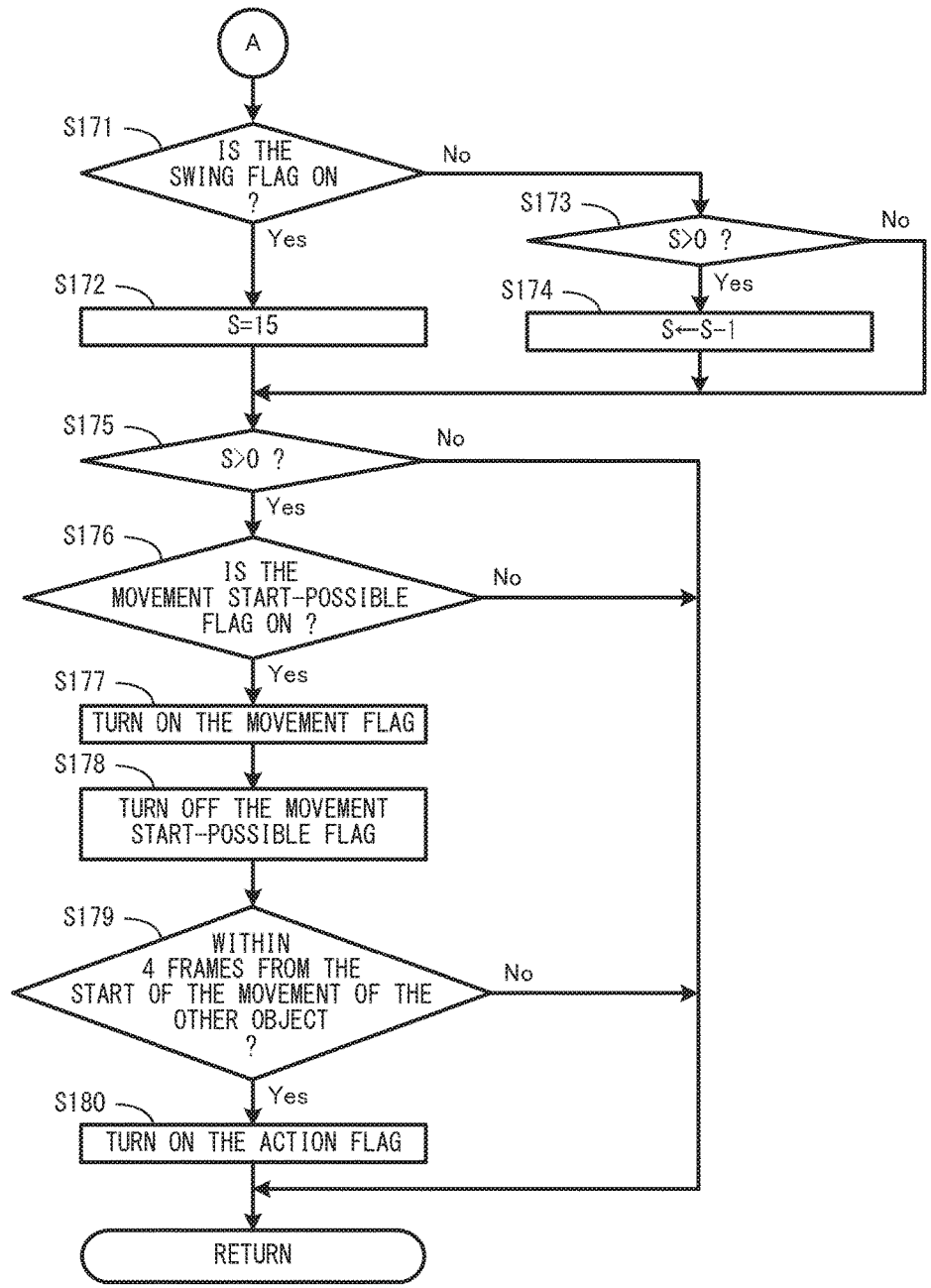
FIG. 19 shows a non-limiting example of sub routine representing details of the controller swing recognition process executed in step S144 and step S144 shown in FIG. 17.
Figure 20:
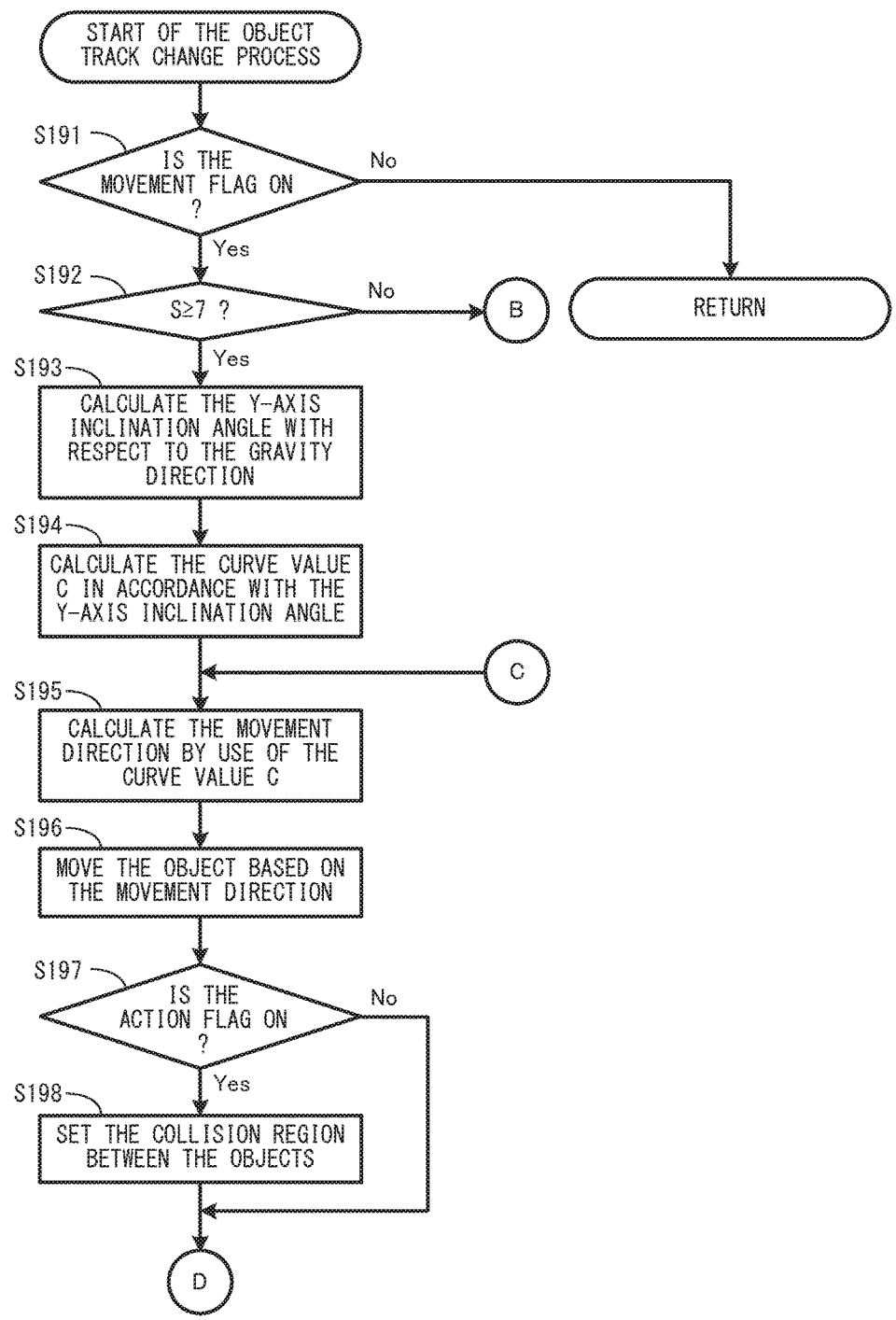
FIG. 20 shows a non-limiting example of sub routine representing details of an object track change process executed in step S146 and step S147 shown in FIG. 17.
Figure 21:
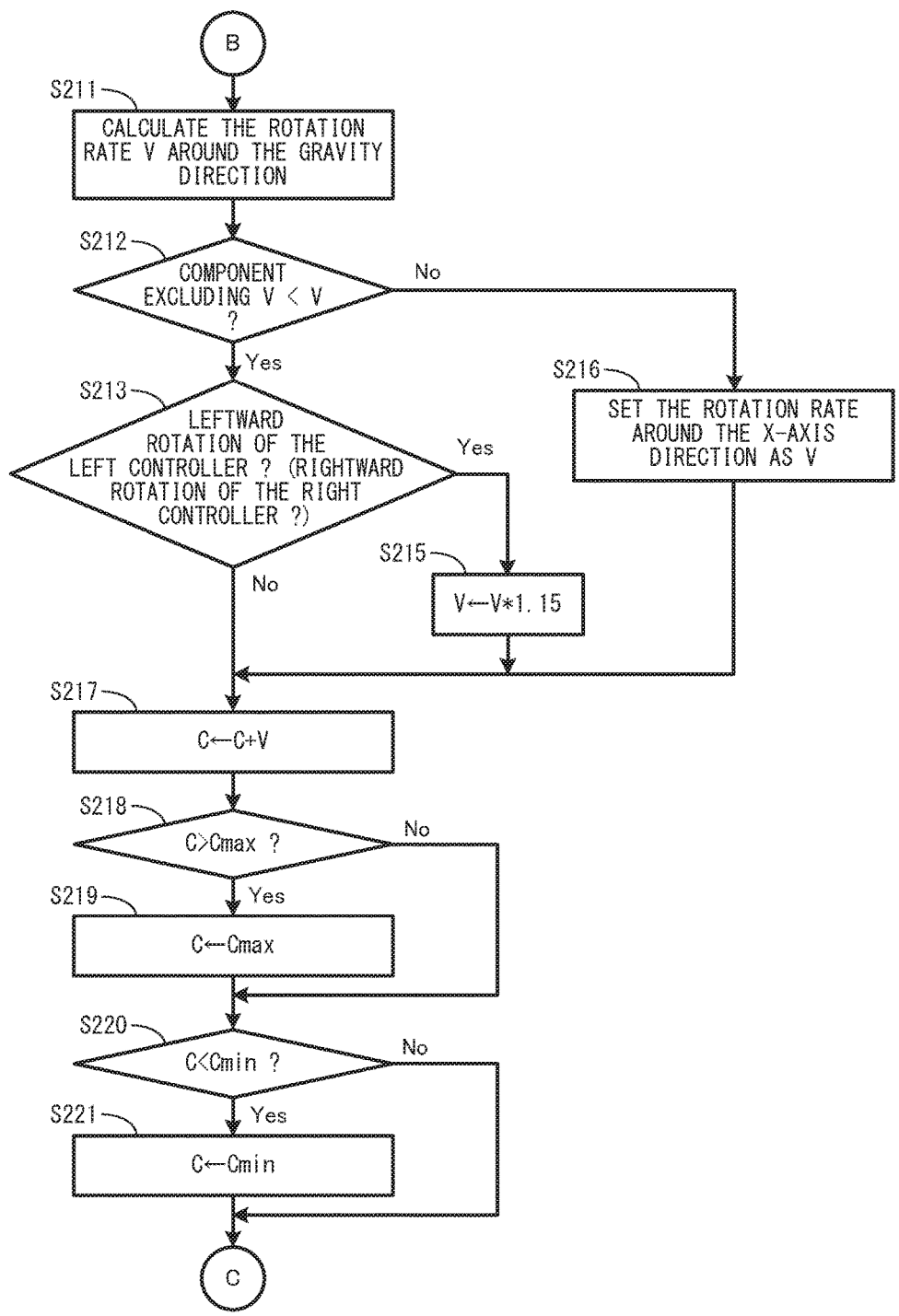
FIG. 21 shows a non-limiting example of sub routine representing details of the object track change process executed in step S146 and step S147 shown in FIG. 17.
Figure 22:
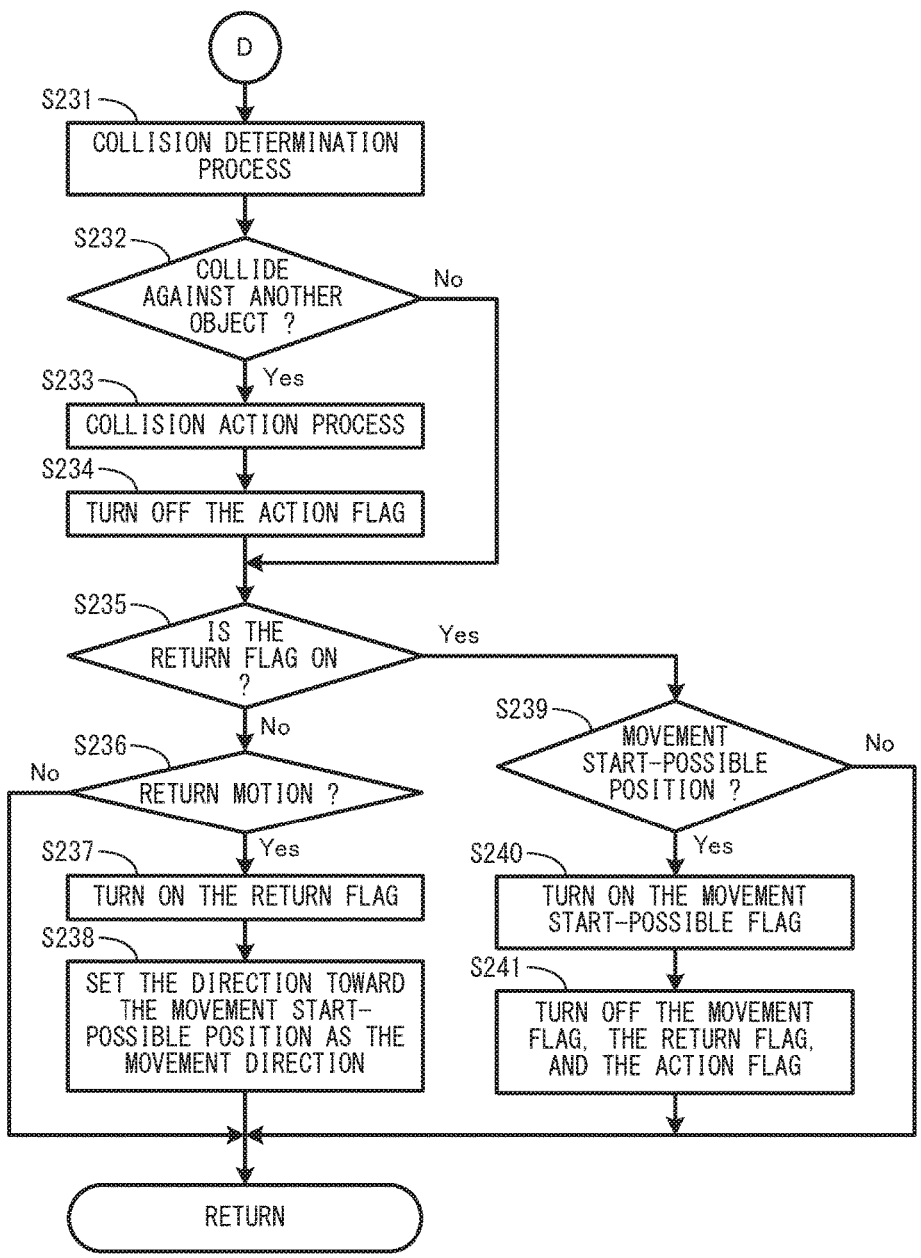
FIG. 22 shows a non-limiting example of sub routine representing details of the object track change process executed in step S146 and step S147 shown in FIG. 17.
Figure 23:
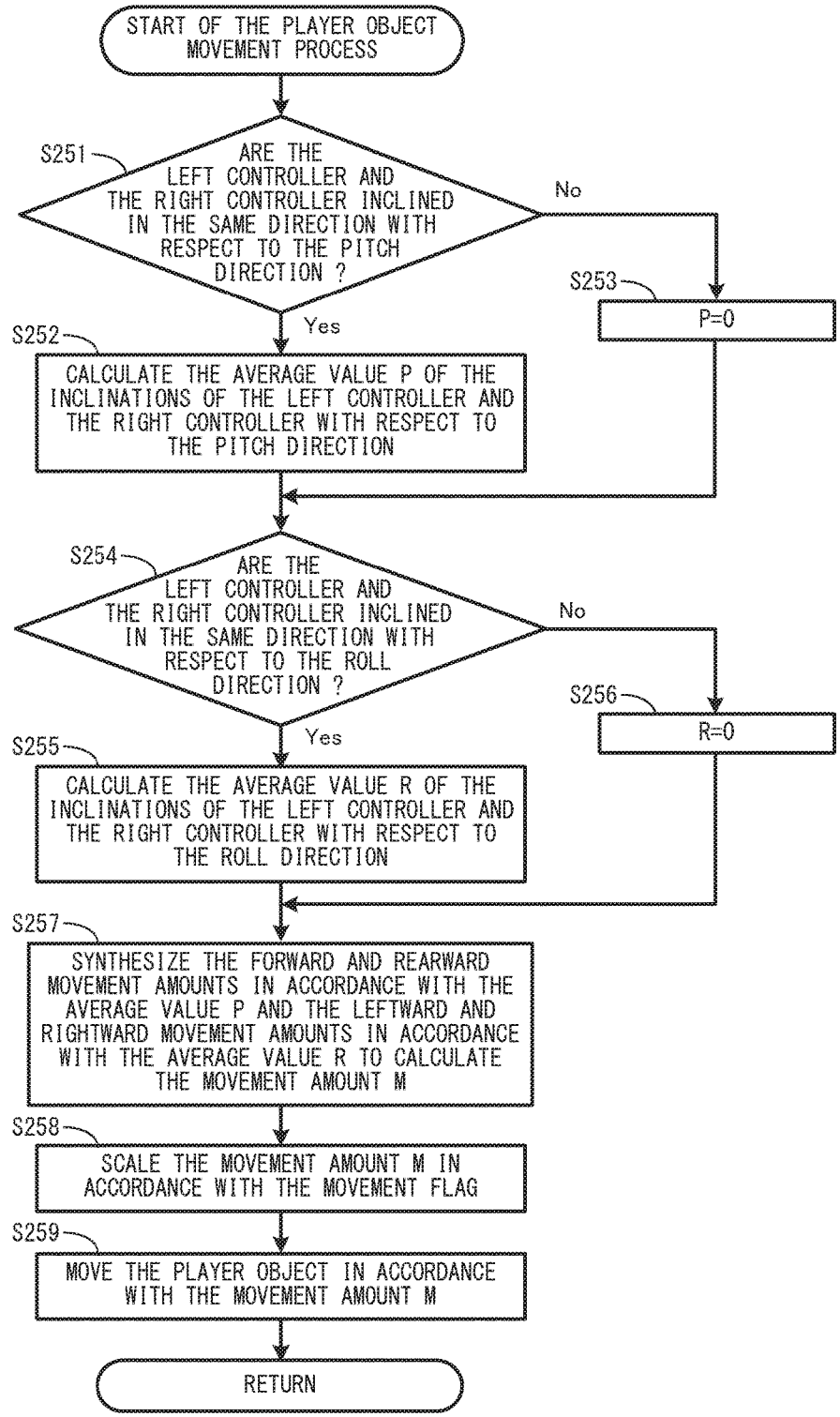
FIG. 23 shows a non-limiting example of sub routine representing details of a player object movement process executed in step S148 and shown in FIG. 17.

Now, an example of information process (game process) in the exemplary embodiment will be described in detail. FIG. 17 is a flowchart showing an example of game process executed by the information processing system 1. FIG. 18 and FIG. 19 provides a flowchart showing, in detail, a sub routine of a controller swing recognition process executed in step S144 and step S145 shown in FIG. 17. FIG. 20 through FIG. 22 provide a flowchart showing, in detail, a sub routine of an object track change process executed in step S146 and step S147 shown in FIG. 17. FIG. 23 is a flowchart showing, in detail, a sub routine of a player object movement process executed in step S148 shown in FIG. 17. In the exemplary embodiment, the series of processes shown in FIG. 17 through FIG. 23 is executed by the CPU 81 executing a communication program and a predetermined application program (game program) included in the various programs Pa. The timing to start the game process shown in FIG. 17 through FIG. 23 is optional.

The process in each of the steps shown in FIG. 17 through FIG. 23 is merely illustrative, and the order of the processes executed in the steps may be changed as long as substantially the same result is obtained. Another process may be executed in addition to (or instead of) the processes executed in the steps. In the exemplary embodiment, the process in each of the steps will be described as being executed by the CPU 81. A part of the processes in the steps may be executed by a processor other than the CPU 81 or a dedicated circuit. A part of the processes executed by the main body apparatus 2 may be executed by another information processing apparatus communicable with the main body apparatus 2 (e.g., server communicable with the main body apparatus 2 via a network). Namely, the processes shown in FIG. 17 through FIG. 23 may be executed by cooperation of a plurality of information processing apparatuses including the main body apparatus 2.

Referring to FIG. 17, the CPU 81 performs initial settings for the game process (step S141) and advances the game process to the next step. For example, in the initial settings, the CPU 81 initializes parameters usable to perform the processes described below. Also in the initial settings, the CPU 81 sets a game field in which the game is played, and sets initial positions of the player object OP and the opponent object EO on the game field to update the player object position data Dm and the opponent object position data Do. The CPU 81 also sets the movement directions of the first object G1 and the second object G2 to default values (e.g., forward direction) as the initial values to update the player object position data Dm. The CPU 81 sets the movement start-possible flag represented by the movement start-possible flag data Dl to ON.

Next, the CPU 81 acquires the operation data from the left controller 3 and the right controller 4 to update the operation data Da (step S142), and advances the game process to the next step.

Next, the CPU 81 calculates the attitude, the angular velocity, and the acceleration of each of the left controller 3 and the right controller 4 (step S143), and advances the game process to the next step. For example, the CPU 81 acquires, from the operation data Da, data representing the acceleration caused in each of the left controller 3 and the right controller 4, calculates the direction of the gravitational acceleration acting on each of the left controller 3 and the right controller 4, and updates the attitude data Db by use of the data representing the direction. The gravitational acceleration may be extracted by any method. For example, an acceleration component caused, on average, to each of the left controller 3 and the right controller 4 may be calculated and extracted as the gravitational acceleration. The CPU 81 calculates, as the attitude of the left controller 3, the X-, Y- and Z-axis directions of the left controller 3 with respect to the direction of the gravitational acceleration calculated regarding the left controller 3, and updates the attitude data Db by use of the data representing the attitude. The CPU 81 calculates, as the attitude of the right controller 4, the X-, Y- and Z-axis directions of the right controller 4 with respect to the direction of the gravitational acceleration calculated regarding the right controller 4, and updates the attitude data Db by use of the data representing the attitude. The CPU 81 acquires, from the operation data Da, data representing the angular velocity caused in each of the left controller 3 and the right controller 4, calculates the angular velocity of each of the left controller 3 and the right controller 4 about each of the X, Y and Z axes, and updates the angular velocity data Dc by use of the data representing the angular velocity. The CPU 81 acquires, from the operation data Da, data representing the acceleration caused in each of the left controller 3 and the right controller 4, deletes the above-mentioned gravitational acceleration component from the acceleration caused in each of the left controller 3 and the right controller 4 in the X-, Y- and Z-axis directions, and updates the acceleration data Dd by use of the data representing the post-deletion acceleration.

After the X-, Y- and Z-axis directions with respect to the gravitational acceleration are calculated, the attitude of each of the left controller 3 and the right controller 4 may be updated only in accordance with the angular velocity about each of the X, Y and Z axes. Alternatively, in order to prevent a situation where the relationship between the attitude of each of the left controller 3 and the right controller 4 and the gravitational acceleration direction is shifted as a result of errors being accumulated, the X-, Y- and Z-axis directions with respect to the gravitational acceleration direction may be calculated at each predetermined cycle to correct the attitude of each of the left controller 3 and the right controller 4.

Next, the CPU 81 executes a left controller swing recognition process (step S144), and advances the game process to step S145. Hereinafter, with reference to FIG. 18 and FIG. 19, the left controller swing recognition process executed in step S144 will be described.

Referring to FIG. 18, the CPU 81 sets the swing flag that is set for the process on the left controller 3 to OFF to update the swing flag data Dh (step S161), and advances the game process to the next step.

Next, the CPU 81 determines whether or not to skip a swing determination on the left controller 3 (step S162). For example, when the left controller 3 is in a swung-back state, the CPU 81 skips the swing determination. When the swing determination on the left controller 3 is to be skipped, the CPU 81 advances the game process to step S163. By contrast, when the swing determination on the left controller 3 is to be made, the CPU 81 advances the game process to step S164.

In a first example of method by which the left controller 3 is determined to be in the swung-back state, the CPU 81 refers to the attitude data Db to acquire the angular velocity of the left controller 3 about the Y axis. When the left controller 3 is rotated toward the user (e.g., when the left controller 3 is rotated such that the positive Z-axis direction is directed toward the user), the CPU 81 provides a positive determination result in step S162. In a second example of method by which the left controller 3 is determined to be in the swung-back state, the CPU 81 refers to the attitude data Db to acquire the attitude of the left controller 3. When the left controller 3 is inclined rearward with respect to the gravitational acceleration direction (e.g., when the positive X-axis direction of the left controller 3 is upward with respect to the horizontal direction in the real space), the CPU 81 provides a positive determination result in step S162. In a third example of method by which the left controller 3 is determined to be in the swung-back state, the CPU 81 refers to the acceleration data Dd to acquire the acceleration caused in the left controller 3. When the left controller 3 is moving toward the player (e.g., when the acceleration caused in the left controller 3 includes a negative X-axis direction component of the left controller 3), the CPU 81 provides a positive determination result in step S162.

In step S163, when the magnitude of the acceleration caused in the left controller 3 at the current point is larger than a threshold value usable to make the swing determination on the left controller 3, the CPU 81 sets, as the threshold value, the magnitude of the acceleration caused in the left controller 3 at the current point to update the threshold value data De, and advances the game process to step S164. As is made clear below, in the exemplary embodiment, when the magnitude of the acceleration caused in the left controller 3 excluding a Y-axis direction component (hereinafter, such a magnitude of the acceleration will be referred to as an "XZ acceleration") exceeds the threshold value, the left controller 3 is determined to have been swung. In step S163, when the magnitude of the acceleration caused in the left controller 3 at the current point (i.e., the magnitude of the acceleration caused in the left controller 3 at the current point excluding the Y-axis direction component) is larger than the threshold value, the magnitude of the acceleration is set as the threshold value usable for the swing determination. As a result, the CPU 81 determines not to skip the swing determination in step S162. Namely, step S163 is executed when the left controller 3 is in the swung-back state. Thus, when the left controller 3 is swung back after an operation of throwing a punch, the left controller 3 is prevented from being incorrectly determined to have been swung so as to throw a punch.

In step S164, the CPU 81 determines whether or not the magnitude of the XZ acceleration caused in the left controller 3 is larger than the threshold value. When the magnitude of the XZ acceleration caused in the left controller 3 is larger than the threshold value, the CPU 81 advances the game process to step S165. By contrast, when the magnitude of the XZ acceleration caused in the left controller 3 is less than, or equal to, the threshold value, the CPU 81 advances the game process to step S168. In the exemplary embodiment, in order to determine whether or not the left controller 3 is swung so as to throw a punch, namely, whether or not the left controller 3 is swung so as to move in the positive X-axis direction, the magnitude of the acceleration caused in the left controller 3 excluding the Y-axis direction component is compared against a predetermined value (threshold value set in step S163 described above or in step S167 or S168 described below). Therefore, in step S164, the CPU 81 refers to the acceleration data Dd to acquire the acceleration caused in each of the X-axis direction and the Z-axis direction of the left controller 3 and calculates the magnitude of the XZ acceleration caused in the left controller 3 by use of the acquired accelerations. When the left controller 3 is not in the swung-back state, if the magnitude of the XZ acceleration exceeds the predetermined value or a threshold value based on the predetermined value, the CPU 81 determines that the left controller 3 has been swung so as to throw a punch.

In step S165, the CPU 81 determines whether or not a temporary variant B is 0. When the temporary variant B is 0, the CPU 81 advances the game process to step S166. By contrast, when the temporary variant B is not 0, the CPU 81 advances the game process to step S167.

In step S166, the CPU 81 sets the swing flag that is set for the process on the left controller 3 to ON to update the swing flag data Dh, sets a predetermined frame number as the temporary variant B, and advances the game process to step S167. As can be seen, the swing flag set for the process on the left controller 3 is set to ON when the left controller 3 is determined to have been swung so as to throw a punch and the temporary variant B is 0.

In step S166, the "predetermined frame number" set as the temporary variant B is temporarily set as a time period in which, immediately after the left controller 3 is determined to have been swung so as to throw a punch, the next swing determination is skipped (time period in which the swing flag is not permitted to be set to ON). In the exemplary embodiment, the "predetermined frame number" is set to, for example, 12 frames. For example, even after the left controller 3 is determined to have been swung, the acceleration caused in the left controller 3 may be kept increased. In such a case, the swing determination in step S164 keeps on providing a positive determination result. If all such positive determination results are regarded as indicating that the left controller 3 has been swung so as to throw a punch, the determination on the punch cannot be made as being intended. Therefore, in the exemplary embodiment, the swing determination is skipped for a predetermined time period (e.g., 12 frames) after the left controller 3 is determined to have been swung so as to throw a punch. In another embodiment, a time period, in which the acceleration caused in the left controller 3 is kept increasing (specifically, time period in which the XZ acceleration is kept increasing) after the left controller 3 is determined to have been swung so as to throw a punch and the swing flag is set to ON, may be set as a time period in which the swing flag is not permitted to be set to ON again.

In step S167, the CPU 81 sets the magnitude of the acceleration caused in the left controller 3 at the current point as the threshold value usable to make a swing determination on the left controller 3 to update the threshold value data De, and advances the game process to step S169.

When, in step S164, the magnitude of the XZ acceleration caused in the left controller 3 is determined to be less than, or equal to, the threshold value, the CPU 81 makes the threshold value, usable to make a swing determination on the left controller 3, close to a predetermined value to update the threshold value data De, and advances the game process to step S169. In an example, the CPU 81 makes the threshold value represented by the threshold value data De closer to the predetermined value by a predetermined amount to set a new threshold value, and updates the threshold value data De by use of the new threshold value. In another example, the CPU 81 makes the threshold value represented by the threshold value data De closer to the predetermined value by a predetermined ratio to set a new threshold value, and updates the threshold value data De by use of the new threshold value. As can be seen, in a case where the threshold value usable to make a swing determination on the left controller 3 is made closer to the predetermined value, even if the threshold value is increased by execution of the processes in step S163 or step S167, the swing determination on the left controller 3 is permitted to be made by use of the intended predetermined value when a predetermined time period lapses.

In step S169, the CPU 81 determines whether or not the temporary variant B is larger than 0. When the temporary variant B is larger than 0, the CPU 81 advances the game process to step S170. By contrast, when the temporary variant B is 0, the CPU 81 advances the game process to step S171 (see FIG. 19).

In step S170, the CPU 81 subtracts 1 from the temporary variant B to set a new temporary variant B, and advances the game process to step S171 (see FIG. 19).

Referring to FIG. 19, in step S171, the CPU 81 refers to the swing flag data Dh to determine whether or not the swing flag set for the process on the left controller 3 is set to ON. When the swing flag set for the process on the left controller 3 is set to ON, the CPU 81 advances the game process to step S172. By contrast, when the swing flag set for the process on the left controller 3 is set to OFF, the CPU 81 advances the game process to step S173.

In step S172, the CPU 81 sets a predetermined frame number as a temporary variant S usable to count the number of frames processed after the left controller 3 is determined to have been swung so as to throw a punch, and advances the game process to step S175. In a case where the first object G1 is put into the first movement start-possible state within a predetermined time period after the left controller 3 is determined to have been swung so as to throw a punch, a process to start moving the first object G1 is executed. The predetermined frame number set as the temporary variant S is a parameter corresponding to the predetermined time period. In the exemplary embodiment, the temporary variant S is set to 15 frames, for example. Thus, even in a case where the first object G1 is not in the first movement start-possible state, when the first object G1 is put into the first movement start-possible state within 15 frames after the left controller 3 is determined to have been swung so as to throw a punch, a process to start moving the first object G1 is executed.

When, in step S171, determining that the swing flag is set to OFF, the CPU 81 determines whether or not the temporary variant S is larger than 0. When the temporary variant S is larger than 0, the CPU 81 advances the game process to step S174. By contrast, when temporary variant S is 0, the CPU 81 advances the game process to step S175.

In step S174, the CPU 81 subtracts 1 from the temporary variant S to set a new temporary variant S, and advances the game process to step S175.

In step S175, the CPU 81 determines whether or not the temporary variant S is larger than 0. When the temporary variant S is larger than 0, the CPU 81 advances the game process to step S176. By contrast, when temporary variant S is 0, the CPU 81 finishes the process in this sub routine.

In step S176, the CPU 81 refers to the movement start-possible flag data Dl to determine whether or not the movement start-possible flag set for the process on the first object G1 is set to ON. When the movement start-possible flag set for the process on the first object G1 is set to ON, the CPU advances the game process to step S177. By contrast, when the movement start-possible flag set for the process on the first object G1 is set to OFF, the CPU finishes the process in this sub routine.

In step S177, the CPU 81 sets the movement flag set for the process on the first object G1 to ON to update the movement flag data Di, and advances the game process to step S178. As described above, when the left controller 3 is determined to have been swung so as to throw a punch, and also when the movement start-possible flag is set to ON (i.e., the first object G1 is put into the first movement start-possible state) within a predetermined number of frames (e.g., 15 frames) after such a determination, the movement flag set for the process on the first flag G1 is set to ON.

Next, the CPU 81 sets the movement start-possible flag set for the process on the first object G1 to OFF to update the movement start-possible flag data Dl, sets the temporary variant S to 0 (step S178), and advances the game process to step S179. As described above, when the movement flag indicating that the first object G1 is moving in the virtual space, is set to ON, the movement start-possible flag for the first object G1 is set to OFF because the first object G1 is not in the first movement start-possible state anymore, and the predetermined frame number of set to 0. When the player object PO is in a state of not being capable of attacking the opponent object EO (e.g., when the player object PO is damaged and is temporarily in a knocked-down state), the movement start-possible flag may be appropriately set to OFF to update the movement start-possible flag data Dl. In this case, when the player object PO is recovered from the above-described state of not being capable of attacking, the movement start-possible flag is set to ON.

Next, the CPU 81 determines whether or not the current point is within a predetermined frame number (e.g., 4 frames) after the start of the movement of the second object G2 (step S179). For example, the CPU 81 executes substantially the same process as the left controller swing recognition process on the right controller 4 in step S145 described below. For example, when determining, in step S145, that the current point is within the predetermined frame number after the movement flag set for the process on the right controller 4 is set to ON in step S145, the CPU 81 provides a positive determination result. When the current point is within the predetermined frame number after the start of the movement of the second object G2, the CPU 81 advances the game process to step S180. By contrast, when the current point is not within the predetermined frame number after the start of the movement of the second object G2, the CPU 81 finishes the process in this sub routine.

In step S180, the CPU 81 sets the action flag to ON to update the action flag data Dj and finishes the process in this sub routine. As described above, in a case where one of the first object G1 and the second object G2 starts moving within a predetermined number of frames after the other of the first object G1 and the second object G2 starts moving, the action flag is set to ON.

Returning to FIG. 17, after the left controller swing recognition process in step S144, the CPU 81 executes a right controller swing recognition process (step S145), and advances the game process to step S146. The controller swing recognition process described above with reference to FIG. 18 and FIG. 19 is a sub routine usable for the right controller swing recognition process in step S145. Namely, substantially the same process may be executed by use of the same sub routine except that the targets of the process in the right controller swing recognition process are the right controller 4 and the second object G2, instead of the left controller 3 and the first object G1 in the left controller swing recognition process. Thus, the right controller swing recognition process in step S145 will not be described in detail.

Next, the CPU 81 executes a first object track change process (step S146), and advances the game process to step S147. Hereinafter, with reference to FIG. 20 through FIG. 22, the first object track change process in step S146 will be described.

Referring to FIG. 20, the CPU 81 refers to the movement flag data Di to determine whether or not the movement flag set for the process on the first object G1 is set to ON (step S191). When the movement flag set for the process on the first object G1 is set to ON, the CPU 81 advances the game process to step S192. By contrast, when the movement flag set for the process on the first object G1 is set to OFF, the CPU 81 finishes the process in this sub routine.

In step S192, the CPU 81 determines whether or not the temporary variant S is larger than, or equal to, a predetermined value. When the temporary variant S is larger than, or equal to, the predetermined value, the CPU 81 advances the game process to step S193. By contrast, when the temporary variant S is less than the predetermined value, the CPU 81 advances the game process to step S211 (see FIG. 21). In step 192, the CPU 81 determines whether or not the current point is within a time period after the left controller 3 is determined to have been swung so as to throw a punch until the punch operation is finished. In accordance with whether the current point is determined to be during the punch operation or after the punch operation, different tracks are set. Thus, the predetermined value used in step S192 may be any frame number by which the above-described distinction is possible. The predetermined value is set to, for example, 7.

In step S193, the CPU 81 calculates the inclination of the Y-axis direction of the left controller 3 with respect to the gravitational acceleration direction, and advances the game process to step S194. For example, the CPU 81 refers to the attitude data Dd to acquire the attitude of the left controller 3, and calculates the inclination of the Y-axis direction of the left controller 3 with respect to the gravitational acceleration direction.

Next, the CPU 81 calculates the curve value of the C of the first object G1 in accordance with the inclination angle of the Y-axis direction of the left controller 3 to update the curve value data Df (step S194), and advances the game process to step S195. The curve value C of the first object G1 is a coefficient usable to change the track of the first object G1 leftward or rightward. For example, the curve value C is set to $-1 \leq C \leq 1$. In step S194, when the Y-axis direction of the left controller 3 is inclined rightward with respect to the positive X-axis direction, the curve value C is set to a positive value. When the Y-axis direction is inclined at 40 degrees rightward with respect to the horizontal direction, the curve value is set to C=1. Even when the Y-axis direction is inclined at more than 40 degrees rightward with respect to the horizontal direction, the curve value is set to 1, which is the upper limit. When the Y-axis direction of the left controller 3 is inclined leftward with respect to the positive X-axis direction, the curve value C is set to a negative value. When the Y-axis direction is inclined at 40 degrees leftward with respect to the horizontal direction, the curve value is set to C=−1. Even when the Y-axis direction is inclined at more than 40 degrees leftward with respect to the horizontal direction, the curve value is set to −1, which is the lower limit.

Referring to FIG. 21, when the temporary variant S is less than the predetermined value, the CPU 81 calculates the rotation rate V of the left controller 3 about the gravitational acceleration direction (step S211), and advances the game process to step S212. For example, the CPU 81 refers to the attitude data Db to acquire the direction of the gravitational acceleration acting on the left controller 3. The CPU 81 refers to the angular velocity data Dc to acquire the angular velocity caused in the left controller 3 about each of the X, Y and Z axes. The CPU 81 uses the angular velocity about each of the X, Y and Z axes and the gravitational acceleration direction to calculate the angular velocity of the left controller 3 about the gravitational acceleration direction, and calculates the rotation rate V of the left controller 3 in accordance with the angular velocity to update the rotation rate data Dg.

Next, the CPU 81 determines whether or not the magnitude of the rotation rate V is larger than the magnitude of a component obtained as a result of subtracting the angular velocity corresponding to the rotation rate V from the angular velocity caused in the left controller 3 (step S212). When the rotation rate V is larger, the CPU 81 advances the game process to step S213. By contrast, when the rotation rate V is smaller than, or equal to, the magnitude of the component obtained as a result of subtracting the angular velocity corresponding to the rotation rate V from the angular velocity caused in the left controller 3, the CPU 81 advances the game process to step S216. The process in step S212 is executed in order to determine mainly about which direction the angular velocity is caused in the left controller 3. More specifically, the process in step S212 is executed in order to determine whether the motion of the left controller 3 in the real space is mainly the motion of rotating in the yaw direction, namely, about the gravitational acceleration direction, or is mainly the motion of rotating about another direction.

In step S213, the CPU 81 determines, based on the angular velocity of the left controller 3 about the gravitational acceleration direction, whether or not the left controller 3 is rotated in the left yaw direction about the gravitational acceleration direction. When the left controller 3 is rotated in the left yaw direction about the gravitational acceleration direction, the CPU 81 multiplies the rotation rate V of the left controller 3 by 1.15 to update the rotation rate data Dg (step S215), and advances the game process to step S217. By contrast, when the left controller 3 is not rotated in the left yaw direction about the gravitational acceleration direction, the CPU 81 advances the game process directly to step S217. In general, considering the direction in which a human wrist is rotated, the operation of rotating the left controller 3, held with the left hand of the user, in the left yaw direction is more difficult to make than the operation of rotating the left controller 3 in the right yaw direction. The processes in step S213 and step S215 are executed in consideration the level of easiness of the operation. With such an arrangement, even when the controller is to be rotated in a such a difficult direction of rotation, the object is controllable like in the other operations.

In a case where this sub routine is used to execute the track change process on the second object G2, the CPU 81 determines, in step S213, whether or not the right controller 4 is rotated in the right yaw direction about the gravitational acceleration direction. When the right controller 4 is rotated in the right yaw direction about the gravitational acceleration direction, the CPU 81 multiplies the rotation rate V of the right controller 4 by 1.15 to update the rotation rate data Dg.

When, in step S212, the rotation rate V is smaller than, or equal to, the magnitude of the component obtained as a result of subtracting the angular velocity corresponding to the rotation rate V from the angular velocity caused in the left controller 3, the CPU 81 calculates the rotation rate V in accordance with the angular velocity of the left controller 3 about the X-axis direction (step S216), and advances the game process to step S217. For example, the CPU 81 refers to the angular velocity data Dc to acquire the angular velocity of the left controller 3 about the X-axis direction, and calculates the rotation rate V of the left controller 3 in accordance with the angular velocity to update the rotation rate data Dg.

In step S217, the CPU 81 adds the rotation rate V of the left controller 3 to the curve value C of the first object G1 to calculate a new curve value C, and advances the game process to step S218. For example, the CPU 81 refers to the curve value data Df and the rotation rate data Dg to acquire the curve value C of the first object G1 and the rotation rate V of the left controller 3, and updates the curve value data Df by use of the new curve value D of the first object G1 obtained by adding the rotation rate V to the acquired curve value C.

Next, the CPU 81 determines whether or not the curve value C of the first object G1 exceeds a predetermined upper limit Cmax (e.g., Cmax=1) (step S218). When the curve value C of the first object G1 exceeds the predetermined upper limit Cmax, the CPU 81 sets the curve value C of the first object G1 as the upper limit Cmax to update the curve value data Df (step S219), and advances the game process to step S220. By contrast, when the curve value C of the first object G1 does not exceed the predetermined upper limit Cmax, the CPU 81 advances the game process directly to step S220.

In step S220, the CPU 81 determines whether or not the curve value C of the first object G1 is smaller than a predetermined lower limit Cmin (e.g., Cmin=−1). When the curve value C of the first object G1 is smaller than the predetermined lower limit Cmin, the CPU 81 sets the curve value C of the first object G1 as the lower limit Cmin to update the curve value data Df (step S221), and advances the game process to step S195 (see FIG. 20). By contrast, when the curve value C of the first object G1 is larger than, or equal to, the predetermined lower limit Cmin, the CPU 81 advances the game process directly to step S195.

Returning to FIG. 20, in step S195, the CPU 81 uses the curve value C of the first object G1 to calculate the movement direction of the first object G1, and advances the game process to step S196. For example, the CPU 81 refers to the curve value data Df to acquire the curve value C of the first object G1, and refers to the player object position data Dm to acquire the movement direction of the first object G1. When the acquired curve value C of the first object G1 is a positive value, the CPU 81 changes the acquired movement direction of the first object G1 rightward in accordance with the magnitude of the curve value C, and updates the player object position data Dm by use of the post-change movement of the first object G1. When the acquired curve value C of the first object G1 is a negative value, the CPU 81 changes the acquired movement direction of the first object G1 leftward in accordance with the magnitude of the curve value C, and updates the player object position data Dm by use of the post-change movement of the first object G1.

In a case where the first object G1 is moving in the return path toward the movement start position in the virtual space, the movement direction may not be changed in accordance with the curve value C of the first object G1, but the movement direction may be secured and set to a direction from the current position of the first object G1 toward the movement start position. Whether or not the first object G1 is moving in the return path may be distinguished based on whether or not the return flag (described below) is set to ON.

Next, the CPU 81 moves the first object G1 based on the movement direction of the first object G1 (step S196), and advances the game process to step S197. For example, the CPU 81 refers to the player object position data Dm to acquire the position and the movement direction of the first object G1, moves the first object G1 from the position of the first object G1 based on the movement direction, and updates the player object position data Dm by use of the post-movement position of the first object G1.

Next, the CPU 81 refers to the action flag data Dj to determine whether or not the action flag is set to ON (step S197). When the action flag is set to ON, the CPU 81 advances the game process to step S198. By contrast, when the action flag is set to OFF, the CPU 81 advances the game process to step S231 (see FIG. 22).

In step S198, the CPU 81 sets the collision region A between the first object G1 and the second object G2, and advances the game process to step S231 (see FIG. 22). For example, the CPU 81 refers to the player object position data Dm to acquire the position of the first object G1 and the position of the second object G2, and, based on the positions, sets the position, the shape and the range in the virtual space of the collision region A to update the collision region data Dn. As can be seen, in a case where the movement direction and the post-movement position of the first object G1 (and the second object G2) are set in a state where the action flag is ON, the collision region A is set between the first object G1 and the second object G2.

Referring to FIG. 22, the CPU 81 executes a collision determination process (step S221), and advances the game process to step S232. For example, the CPU 81 refers to the player object position data Dm, the collision region data Dn and the opponent object position data Do to make a collision determination process on the first object G1 and the collision region A in the virtual space against another object in the virtual space (e.g., the opponent object EO).

Next, the CPU 81 determines whether or not at least one of the first object G1 and the collision region A has collided against another object in the virtual space (step S232). When at least one of the first object G1 and the collision region A has collided against another object in the virtual space, the CPU 81 advances the game process to step S233. By contrast, when neither of the first object G1 nor the collision region A has collided against another object in the virtual space, the CPU advances the game process to step S235.

In step S233, the CPU 81 executes a collision action process on the another object, and advances the game process to step S234. When, for example, the first object G1 has collided against the opponent object EO, the CPU 81 gives damage in accordance with the collision to the opponent object EO and sets a predetermined action in accordance with the damage. When the collision region A has collided against the opponent object EO, the CPU 81 gives damage in accordance with the collision to the opponent object EO and sets the "both-hand punch action", by which the first object G1 and the second object G2 act as a pair.

In the exemplary embodiment, in a time period in which the first object G1 is moving toward the opponent object EO, and also in a time period in which the first object G1 is returning toward the player object PO, the collision action process is executed when the first object G1 collides against another object. Alternatively, the collision action process may be executed on another object only in the time period in which the first object G1 is moving toward the opponent object EO. In such a case, it may be constantly determined that the first object G1 has not collided against another object in the time period in which the first object G1 is returning toward the player object PO (in a state where the return flag is ON), so that the collision action process is not executed.

Next, the CPU 81 sets the action flag to OFF to update the action flag data Dj, sets the collision region data Dn such that there is no collision region (e.g., Null), and advances the game process to step S235. As can be seen, in a case where an action by which either one of the first object G1, the second object G2 and the collision region A collides against another object is set, the action flag is set to OFF and the data regarding the collision region is deleted.

In step S235, the CPU 81 refers to the return flag Dk to determine whether or not the return flag set for the process on the first object G1 is set to ON. When the return flag set for the process on the first object G1 is set to OFF, the CPU 81 advances the game process to step S236. By contrast, when the return flag set for the process on the first object G1 is set to ON, the CPU 81 advances the game process to step S239.

In step S236, the CPU 81 determines whether or not the first object G1 is to make a motion of moving in the return path toward the movement start position in the virtual space. For example, the CPU 81 determines that the first object G1 is to make a motion of moving in the return path in a case where a certain condition is fulfilled, for example, when the first object G1 has arrived at a position away from the movement start position by a predetermined distance, when a predetermined time period has lapsed after the first object G1 passed the position of the opponent object EO, or when a predetermined time period has lapsed after the first object G1 or the collision region A collided against another object. When the first object G1 is to make a motion of moving in the return path, the CPU 81 advances the game process to step S237. By contrast, when the first object G1 is not to make a motion of moving in the return path, the CPU 81 finishes the process in this sub routine.

In step S237, the CPU 81 sets the return flag that is set for the process on the first object G1 to ON to update the return flag data Dk, and advances the game process to step S238. As can be seen, when the motion of the first object G1 of moving in the return path is set, the return flag set for the process on the first object G1 is set to ON.

Next, the CPU 81 sets a direction toward the movement start position as the movement direction of the first object G1 (step S238), and finishes the process in this sub routine. For example, the CPU 81 refers to the player object position data Dm to calculate a direction from the current position of the first object G1 to the movement start position as the movement direction of the first object G1, and updates the player object position data Dm by use of the calculated movement direction. The movement direction of the first object G1 set in step S238 may be a direction along an object coupled with the first object G1 (e.g., arm object extended from the player object PO) or a direction opposite to the track by which the first object G1 moved from the movement start position.

When the return flag is set to ON in step S235, the CPU 81 determines whether or not the first object G1 has returned to the movement start position (step S239). For example, the CPU 81 refers to the player object position data Dm. When the position of the first object G1 is set to the movement start position, the CPU 81 provides a positive determination result in step S239. When the first object G1 returns to the movement start position, the CPU 81 advances the game process to step S240. By contrast, when the first object G1 has not returned to the movement start position, the CPU 81 finishes the process in this sub routine.

In step S240, the CPU 81 sets the movement start-possible flag set for the process on the first object G1 to ON to update the movement start-possible flag data Dl, and advances the game process to step S241. As can be seen, in a case where the first object G1 is permitted to move in the virtual space again, the movement start-possible flag of the first object G1 is set to ON because the first object G1 is in the first movement start-possible state. In step S240, the movement start-possible flag of the first object G1 is set to ON to put the first object G1 into the first movement start-possible state immediately after the fist object G1 returns to the movement start position. The first movement start-possible state may be started at any other timing. For example, the first movement start-possible state may be started when a predetermined time period (e.g., 8 frames) lapses after the first object G1 returns to the movement start position.

Next, the CPU 81 sets the movement flag and the return flag set for the processes on the first object G1 to OFF, sets the action flag to OFF, sets the data regarding the movement direction of the collision region A and the first object G1 to a default value (step S241), and finishes the process in this sub routine. For example, the CPU 81 sets the movement flag and the return flag set for the processes on the first object G1 to OFF to update the movement flag data Di and the return flag data Dk. The CPU 81 sets the action flag to OFF to update the action flag data Dj. The CPU 81 sets data regarding the collision region such that there is no collision region (e.g., Null) to update the collision region data Dn. The CPU 81 sets the movement direction of the first object G1 to a default value (e.g., forward direction) to update the player object position data Dm.

Returning to FIG. 17, after the first object track change process in step S146, the CPU 81 executes a second object track change process (step S147), and advances the game process to step S148. The object track change process described above with reference to FIG. 20 through FIG. 22 is a sub routine usable for the second object track change process in step S147. Namely, substantially the same process may be executed by use of the same sub routine except that the targets of the process in the second object track change process are the right controller 4 and the second object G2, instead of the left controller 3 and the first object G1 in the first object track change process. Thus, the second object track change process in step S147 will not be described in detail.

Next, the CPU 81 executes a player object movement process (step S148), and advances the game process to step S149. Hereinafter, with reference to FIG. 23, the player object movement process in step S148 will be described.

Referring to FIG. 23, the CPU 81 determines whether or not the left controller 3 and the right controller 4 are inclined in the same direction with respect to the pitch direction in the real space (step S251). For example, the CPU 81 refers to the attitude data Db. When the positive X-axis direction of the left controller 3 and the positive X-axis direction of the right controller 4 are both an elevation angle direction or a depression angle direction with respect to the horizontal direction in the real space, the CPU 81 provides a positive determination result in step S251. When the left controller 3 and the right controller 4 are inclined in the same direction with respect to the pitch direction in the real space, the CPU 81 advances the game process to step S252. By contrast, when the left controller 3 and the right controller 4 are not inclined in the same direction with respect to the pitch direction in the real space, the CPU 81 advances the game process to step S253.

In step S252, the CPU 81 calculates an average value P of the inclination angles of the left controller 3 and the right controller 4 with respect to the pitch direction in the real space, and advances the game process to step S254. For example, the CPU 81 refers to the attitude data Db to calculate the difference between the positive X-axis direction of the left controller 3 and the horizontal direction in the real space, and the difference between the positive X-axis direction of the right controller 4 and the horizontal direction in the real space, and calculates the average value P of these differences. For example, the above-described difference is calculated so as to have a positive value when the positive X-axis direction is a depression angle direction and so as to have a negative value when the positive X-axis direction is an elevation angle direction.

When determining, in step S251, that the left controller 3 and the right controller 4 are not inclined in the same direction with respect to the pitch direction in the real space, the CPU 81 sets the average value P to 0 (step S253), and advances the game process to step S254.

In step S254, the CPU 81 determines whether or not left controller 3 and the right controller 4 are inclined in the same direction with respect to the roll direction in the real space. For example, the CPU 81 refers to the attitude data Db. When the positive Y-axis direction of the left controller 3 and the positive Y-axis direction of the right controller 4 are both an elevation angle direction or a depression angle direction with respect to the horizontal direction in the real space, the CPU 81 provides a positive determination result in step S254. When the left controller 3 and the right controller 4 are inclined in the same direction with respect to the roll direction in the real space, the CPU 81 advances the game process to step S255. By contrast, when the left controller 3 and the right controller 4 are not inclined in the same direction with respect to the roll direction in the real space, the CPU 81 advances the game process to step S256.

In step S255, the CPU 81 calculates an average value R of the inclination angles of the left controller 3 and the right controller 4 with respect to the roll direction in the real space, and advances the game process to step S257. For example, the CPU 81 refers to the attitude data Db to calculate the difference between the positive Y-axis direction of the left controller 3 and the horizontal direction in the real space, and the difference between the positive Y-axis direction of the right controller 4 and the horizontal direction in the real space, and calculates the average value R of these differences. For example, the above-described difference is calculated so as to have a positive value when the positive Y-axis direction is a depression angle direction and so as to have a negative value when the positive Y-axis direction is an elevation angle direction.

When determining, in step S254, that the left controller 3 and the right controller 4 are not inclined in the same direction with respect to the roll direction in the real space, the CPU 81 sets the average value R to 0 (step S256), and advances the game process to step S257.

In step S257, the CPU 81 synthesizes a front-rear movement amount in accordance with the average value P and a left-right movement amount in accordance with the average value R to calculate a movement amount M, and advances the game process to step S258. For example, the CPU 81 calculates, in accordance with the magnitude of the average value P, a front-rear movement amount by which a forward movement is made in the virtual space when the average value P is a positive value and by which a rearward movement is made in the virtual space when the average value P is a negative value. The CPU 81 calculates, in accordance with the magnitude of the average value R, a left-rear movement amount by which a rightward movement is made in the virtual space when the average value R is a positive value and by which a leftward movement is made in the virtual space when the average value R is a negative value. The CPU 81 synthesizes the front-rear movement amount and the left-right movement amount to calculate the movement amount M for the virtual space.

Next, the CPU 81 scales the movement amount M in accordance with the set state of the movement flag (step S258), and advances the game process to step S259. For example, the CPU refers to the movement flag data Di. When the movement flags respectively set for the processes on the first object G1 and the second object G2 are both set to OFF, the CPU 81 keeps the movement amount M with no change. When one of the movement flags respectively set for the processes on the first object G1 and the second object G2 is set to ON, the CPU 81 decreases the movement M by a predetermined magnification (e.g., by 0.9 times). When the movement flags respectively set for the processes on the first object G1 and the second object G2 are both set to ON, the CPU 81 sets the movement amount M to 0.

Next, the CPU 81 moves the player object PO in the virtual space in accordance with the movement amount M scaled in step S258 (step S259), and finishes the process in this sub routine. For example, the CPU 81 moves the position in the virtual space of the player object PO represented by the player object position data Dm in accordance with the movement amount M, and updates the player object position data Dm by use of the post-movement position of the player object PO.

Returning to FIG. 17, after the player object movement process in step S148, the CPU 81 executes a display control process (step S149), and advances the game process to step S150. For example, the CPU 81 uses the player object position data Dm and the opponent object position data Do to locate the player object PO, the first object G1, the second object G2 and the opponent object EO on the game field. When the action flag represented by the action flag data Dj is set to ON and the data regarding the collision region A is set in the collision region data Dn, the CPU 81 locates an object corresponding to the collision region A between the first object G1 and the second object G2. When the collision action is set in step S233, the CPU 81 causes each of the virtual objects to make a motion in accordance with the contents of the setting. Then, the CPU 81 executes a process of generating a virtual space image of the game field as seen from a virtual camera located at a predetermined position (e.g., rear to the player object PO) and displaying the virtual space image on the display screen of a display device (e.g., the stationary monitor 6).

Next, the CPU 81 determines whether or not to finish the game (step S150). A condition under which the game is to be finished in step S150 is, for example, that the result of the game is fixed, or that the user has made an operation of finishing the game. When determining not to finish the game, the CPU 81 returns the game process in step S142 to repeat the above-described processes. When determining to finish the game, the CPU 81 finishes the process in this flowchart. The series of processes in steps S142 through S150 are repeated until it is determined to finish the game in step S150.

As can be seen, in the exemplary embodiment, the first movement start-possible state, in which the first object G1 is permitted to start moving, and the second movement start-possible state, in which the second object G2 is permitted to start moving, intermittently occur. The left controller 3 is swung in the first movement start-possible state, so that the motion of the first object G1 is made controllable. The right controller 4 is swung in the second movement start-possible state, so that the motion of the second object G2 is made controllable. In the exemplary embodiment, even when the first object G1 is not in the first movement start-possible state, as long as the first object G1 is put into the first movement start-possible state within a predetermined time period after the left controller 3 is swung, the motion of the first object G1 is made controllable based on the determination result on the left controller 3. Even when the second object G2 is not in the second movement start-possible state, as long as the second object G2 is put into the second movement start-possible state within a predetermined time period after the right controller 4 is swung, the motion of the second object G2 is made controllable based on the determination result on the right controller 4. Therefore, even in a game in which the first movement start-possible state and/or the second movement start-possible state intermittently occurs, operations may be made easily.

In the above-described game example, the track of the first object G1 or the second object G2 may be changed by an operation made by use of the left controller 3 or the right controller 4 even while the first object G1 or the second object G2 is moving. Thus, it is assumed as a premise that a time period after one first movement start-possible state is finished until the next first movement start-possible state is caused, or a time period after one second movement start-possible state is finished until the next second movement start-possible state is caused, is long. In a game in which a time period until the next movement is permitted to be started is long, a game specification of accepting an operation of starting the movement (the operation of swinging) before the start of the next movement is made possible is effective. In another specification, the time period until the next movement is permitted to be started may be long. For example, in the above-described game example, the arm of the player object PO is extended to make the motion controllable during the movement. The exemplary embodiment is applicable to a game in which any one of the other limbs (e.g., leg) or the head of the player object is extended or a game in which an item carried by the player object (whip object, bellows object, etc.) is extended. The exemplary embodiment is applicable to a game in which the player object PO operates a remote-controllable item (e.g., radio-controlled item, robot, "rocket punch" weapon, etc.) while the remote-controllable item is moving, and the next movement of the remote-controllable item is permitted when being returned to the player object.

The exemplary embodiment may be applicable even to a game in which the track of an item is not changeable while the item is moving. For example, the exemplary embodiment is applicable to a game of attacking an opponent with shooting or bombardment, more specifically, to a game in which the time period until the weapon is loaded with the next bullet or cannonball is long and thus the time period until the next shooting or bombardment is made possible is long. In this case, when a shooting operation or bombardment operation is made before a predetermined time when the next shooting or bombardment is made possible, the next bullet or cannonball is fired by such a shooting operation or bombardment operation. In another example, the exemplary embodiment is applicable to a game in which an object once released (bird, boomerang, bowling ball, etc.) is returned.

The "both-hand punch action" is described above as an example of action made by the first object G1 and the second object G2 acting as a pair. Alternatively, the "both-hand punch action" may be a mere movement of the first object G1 and the second object G2 acting as a pair. In this case, the first object G1 and the second object G2 are merely moved as a pair in the game image. In a case where at least one of the first object G1 and the second object G2 collides against the opponent object EO, the damage given to the opponent object EO may be heavier than in a case where only one of the first object G1 and the second object G2 collides against the opponent object EO.

In the above-described game example, the positions of the first object G1 and the second object G2 in the left-right direction in the virtual space are controllable in accordance with an operation made by use of the left controller 3 and the right controller 4. Alternatively, the positions of the first object G1 and the second object G2 in the up-down direction and/or in the front-rear direction in the virtual space may be controllable. In this case, the positions of the first object G1 and/or the second object G2 in the up-down direction in the virtual space may be controllable in accordance with the motions of the left controller 3 and/or the right controller 4 in the up-down direction and/or the attitudes the left controller 3 and/or the right controller 4 in the pitch direction in the real space. The positions of the first object G1 and/or the second object G2 in the front-rear direction in the virtual space may be controllable in accordance with the motions of the left controller 3 and/or the right controller 4 in the front-rear direction, and/or the attitudes the left controller 3 and/or the right controller 4 in the pitch direction in the real space. The attitudes of the first object G1 and the second object G2 in the virtual space may be controllable in accordance with an operation made by use of the left controller 3 and the right controller 4. In this case, the attitudes of the first object G1 and/or the second object G2 in the roll direction in the virtual space may be controllable in accordance with the attitudes of the left controller 3 and/or the right controller 4 in the roll direction in the real space. The attitudes of the first object G1 and/or the second object G2 in the pitch direction in the virtual space may be controllable in accordance with the attitudes of the left controller 3 and/or the right controller 4 in the pitch direction in the real space. The attitudes of the first object G1 and/or the second object G2 in the yaw direction in the virtual space may be controllable in accordance with the attitudes of the left controller 3 and/or the right controller 4 in the yaw direction in the real space.

In the exemplary embodiment described above, the method for detecting the motion or the attitude of the left controller 3 or the right controller 4 is merely illustrative. Another method or another data may be used to detect the motion or the attitude of the left controller 3 or the right controller 4. In the exemplary embodiment described above, a game image in accordance with the operation made by use of the left controller 3 or the right controller 4 is displayed on the stationary monitor 6. Alternatively, such a game image may be displayed on the display 12 of the main body apparatus 2. The controllers usable to control the motion of the first object G1 and/or the second object G2 are not limited to the pair of the left controller 3 or the right controller 4. The left controller 3 or the right controller 4 may be combined with another controller, or other controllers may be combined together.

In another embodiment, the main body apparatus 2 may be directly communicable with the stationary monitor 6. For example, the main body apparatus 2 and the stationary monitor 6 may be directly communicable with each other by wired communication or wireless communication. In this case, the main body apparatus 2 may determine where the image is to be displayed based on whether or not the main body apparatus 2 and the stationary monitor 6 are directly communicable with each other.

An additional device (e.g., cradle 5) may be any additional device allowing the main body apparatus 2 to be attached thereto or detached therefrom. The additional device may have a function of charging the main body apparatus 2 as in the exemplary embodiment, or may not have such a function.

The information processing system 1 may be any apparatus, for example, a mobile game apparatus, a mobile electronic device (a PDA (personal digital assistant), a mobile phone, a personal computer, a camera, a tablet, etc.) or the like.

An example of executing the information process (game process) by the information processing system 1 is described above. Alternatively, at least a part of the above-described processing steps may be executed by another apparatus. For example, in a case where the information processing system 1 is configured to be communicable with another apparatus (e.g., another server, another image display apparatus, another game apparatus, another mobile terminal, etc.), at least a part of the above-described processing steps may be executed by cooperation of the information processing system 1 and the another apparatus. In a case where at least a part of the above-described processing steps is executed by another apparatus as described above, substantially the same processes as the above-described processes may be executed. The above-described information process (game process) may be executed by one processor or by cooperation of a plurality of processors included in an information processing system formed of at least one information processing apparatus. In the exemplary embodiment described above, the CPU 81 of the information processing system 1 may execute a predetermined program to perform the information process. A part of, or the entirety of, the above-described processes may be executed by a dedicated circuit included in the information processing system 1.

In the above-described variations, the exemplary embodiment may be realized by a system form of so-called cloud computing, or a system form of distributed wide area network or local area network. For example, in a system form of distributed local area network, the above-described processes may be executed by cooperation of a stationary information processing apparatus (stationary game apparatus) and a mobile information processing apparatus (mobile game apparatus). In such a system form, there is no particular limitation on which apparatus performs which of the above-described processes. In whichever manner the processes may be divided, the exemplary embodiment is realized.

The orders of processes, the set values, the conditions used for the determinations, and the like that are used in the information processing described above are merely illustrative. The exemplary embodiment is realized also other orders, other values, and other conditions.

The above-described program may be supplied to the information processing system 1 via an external storage medium such as an external memory or the like, or via a wired or wireless communication link. The program may be stored in advance on a non-volatile storage device located in the apparatus. Examples of the information storage medium on which the program may be stored may include CD-ROMs, DVDs, optical disk storage mediums similar thereto, flexible disks, hard disks, magneto-optical disks, magnetic tapes and the like, as well as non-volatile memories. Alternatively, the information storage medium on which the program may be stored may be a volatile memory. Such a storage medium is considered as a computer-readable storage medium. For example, a program stored on such a storage medium may be loaded on, and executed by, a computer or the like, so that various functions described above are provided.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses may be improved and modified in various manners without departing from the spirit and scope of the appended claims. It is understood that the scope of the systems, the methods, the devices, and the apparatuses should be interpreted only by the scope of the appended claims. It is understood that the specific descriptions of the exemplary embodiment enable a person skilled in the art to carry out an equivalent scope thereto on the basis of the descriptions of the exemplary embodiment and general technological knowledge. It should be understood that the descriptions of the components and the like made in the specification in the singular form with the word "a" or "an" preceding the components do not exclude the plurals of the components. It should be understood that, unless otherwise stated, the terms used in the specification are used in their common meanings in the art. Thus, unless otherwise defined, all the jargons and the technical terms used in the specification have the same meanings as those generally understood by a person skilled in the art of the exemplary embodiment. If there is a contradiction, the specification (including definitions) takes precedence.

As described above, the exemplary embodiment is usable as a game apparatus, a game program, a game system, a game processing method or the like that allows an operation to be made easily in a game or the like in which a state where an operation instruction is issuable is caused intermittently.

What is claimed is:

1. A game apparatus configured to execute a game process based on an operation made by use of a first operation device and a second operation device each including an acceleration sensor and a gyrosensor, the game apparatus comprising a computer configured to:

acquire, from the first operation device, first operation data including first acceleration data based on a detection result provided by the acceleration sensor and first angular velocity data based on a detection result provided by the gyrosensor; and acquire, from the second operation device, second operation data including second acceleration data based on a detection result provided by the acceleration sensor and second angular velocity data based on a detection result provided by the gyrosensor;

make a swing input determination on whether or not a first swing input on the first operation device has been made based on at least the first acceleration data; and make the swing input determination on whether or not a second swing input on the second operation device has been made based on at least the second acceleration data;

perform an object movement control to control a movement of a first object in a virtual space based on the first operation data, and perform the object movement control to control a movement of a second object in the virtual space based on the second operation data; and perform the game process based on the first object and the second object in the virtual space;

wherein in the object movement control, the computer is configured to:

make a movement start determination on whether or not to start moving the first object in the virtual space based on at least the first swing input when the first swing input is determined to have been made in a first movement start-possible state, in which the first object is allowed to start moving, and when the first object is put into the first movement start-possible state within a predetermined time period after the first swing input is determined to have been made; and make the movement start determination on whether or not to start moving the second object in the virtual space based on at least the second swing input when the second swing input is determined to have been made in a second movement start-possible state, in which the second object is allowed to start moving, and when the second object is put into the second movement start-possible state within a predetermined time period after the second swing input is determined to have been made;

calculate an attitude of the first operation device based on at least the first angular velocity data, and make a movement direction setting to set a movement direction of the first object in the virtual space based on the attitude of the first operation device; and calculate an attitude of the second operation device based on at least the second angular velocity data, and make the movement direction setting to set a movement direction of the second object in the virtual space based on the attitude of the second operation device;

start moving the first object in the movement direction set for the first object in the movement direction setting when it is determined in the movement start determination to start moving the first object; and start moving the second object in the movement direction set for the second object in the movement direction setting when it is determined in the movement start determination to start moving the second object;

perform a track control to change a track of the first object in the virtual space in accordance with a change in the attitude of the first operation device after the first object starts moving; and perform the track control to change a track of the second object in the virtual space in accordance with a change in the attitude of the second operation device after the second object starts moving; and locate the first object at a first predetermined position to put the first object into the first movement start-possible state after the movement of the first object is finished based on a predetermined condition; and locate the second object at a second predetermined position to put the second object into the second movement start-possible state after the movement of the second object is finished based on a predetermined condition.

2. The game apparatus according to claim 1, wherein in the movement start determination, the computer is configured to, when it is determined to start moving one of the first object and the second object within a predetermined time period after the other of the first object and the second object starts moving, further determine whether or not to start a predetermined action to be made by the first object and the second object as a pair.

3. The game apparatus according to claim 2, wherein:
in the game process, the computer is configured to make a collision determination on whether or not the first object and/or the second object has collided against another object in the virtual space, and when the collision determination provides a positive determination result, to perform a predetermined process on the another object; and in the collision determination, the computer is configured to, when it is determined in the movement start determination to start the predetermined action, further determine whether or not a predetermined region set between the first object and the second object has collided against the another object in the virtual space.

4. The game apparatus according to claim 2, wherein in the track control, the computer is configured to, even while the predetermined action is being made, change the track of the first object in accordance with the change in the attitude of the first operation device, and change the track of the second object in accordance with the change in the attitude of the second operation device.

5. The game apparatus according to claim 1, wherein in the swing input determination, the computer is configured to determine whether or not the first swing input has been made based on whether or not the magnitude of acceleration represented by the first acceleration data has exceeded a first threshold value, and to determine whether or not the second swing input has been made based on whether or not the magnitude of acceleration represented by the second acceleration data has exceeded a second threshold value.

6. The game apparatus according to claim 1, wherein in the movement direction setting, the computer is configured to calculate the attitude of the first operation device based on an inclination of a left-right direction axis of the first operation device with respect to a gravitational direction in a real space, and to calculate the attitude of the second operation device based on an inclination of a left-right direction axis of the second operation device with respect to the gravitational direction.

7. The game apparatus according to claim 1, wherein in the track control, the computer is configured to calculate the change in the attitude of the first operation device based on a change in a rotation angle of a left-right direction axis of the first operation device about a front-rear direction of the first operation device, and to calculate the change in the attitude of the second operation device based on a change in a rotation angle of a left-right direction axis of the second operation device about a front-rear direction of the second operation device.

8. The game apparatus according to claim 1, wherein in the track control, the computer is configured to calculate the change in the attitude of the first operation device based on a change in a rotation angle of a front-rear direction axis of the first operation device with respect to a gravitational direction in a real space, and to calculate the change in the attitude of the second operation device based on a change in a rotation angle of a front-rear direction axis of the second operation device with respect to the gravitational direction.

9. The game apparatus according to claim 1, wherein in the object movement control, the computer is configured to move a player object based on both of the attitude of the first operation device based on at least the first angular velocity data and the attitude of the second operation device based on at least the second angular velocity data, and thus to move the first predetermined position and the second predetermined position set at positions with respect to the position of the player object.

10. A non-transitory computer-readable storage medium having game program stored thereon a executable by a computer included in a game apparatus configured to execute a game process based on an operation made by use of a first operation device and a second operation device each including an acceleration sensor and a gyrosensor, the game program causing the computer to execute:

acquiring, from the first operation device, first operation data including first acceleration data based on a detection result provided by the acceleration sensor and first angular velocity data based on a detection result provided by the gyrosensor; and acquiring, from the second operation device, second operation data including second acceleration data based on a detection result provided by the acceleration sensor and second angular velocity data based on a detection result provided by the gyrosensor;

making a swing input determination on whether or not a first swing input on the first operation device has been made based on at least the first acceleration data; and making the swing input determination on whether or not a second swing input on the second operation device has been made based on at least the second acceleration data;

performing an object movement control to control a movement of a first object in a virtual space based on the first operation data, and performing the object movement control to control a movement of a second object in the virtual space based on the second operation data; and performing the game process based on the first object and the second object in the virtual space;

wherein performing the object movement control includes:
making a movement start determination on whether or not start moving the first object in the virtual space based on at least the first swing input when the first swing input is determined to have been made in a first movement start-possible state, in which the first object is allowed to start moving, and when the first object is put into the first movement start-possible state within a predetermined time period after the first swing input is determined to have been made; and making the movement start determination on whether or not to start moving the second object in the virtual space based on at least the second swing input when the second swing input is determined to have been made in a second movement start-possible state, in which the second object is allowed to start moving, and when the second object is put into the second movement start-possible state within a predetermined time period after the second swing input is determined to have been made;

calculating an attitude of the first operation device based on at least the first angular velocity data, and making a movement direction setting to set a movement direction of the first object in the virtual space based on the attitude of the first operation device; and calculating an attitude of the second operation device based on at least the second angular velocity data, and making the movement direction setting to set a movement direction of the second object in the virtual space based on the attitude of the second operation device;

starting moving the first object in the movement direction set for the first object in the movement direction setting when it is determined in the movement start determination to start moving the first object; and starting moving the second object in the movement direction set for the second object in the movement direction setting when it is determined in the movement start determination to start moving the second object;

performing a track control to change a track of the first object in the virtual space in accordance with a change in the attitude of the first operation device after the first object starts moving; and performing the track control to change a track of the second object in the virtual space in accordance with a change in the attitude of the second operation device after the second object starts moving; and locating the first object at a first predetermined position to put the first object into the first movement start-possible state after the movement of the first object is finished based on a predetermined condition; and locating the second object at a second predetermined position to put the second object into the second movement start-possible state after the movement of the second object is finished based on a predetermined condition.

11. The non-transitory computer-readable storage medium having the game program stored thereon according to claim 10, wherein making the movement start determination includes, when it is determined to start moving one of the first object and the second object within a predetermined time period after the other of the first object and the second object starts moving, further determining whether or not to start a predetermined action to be made by the first object and the second object as a pair.

12. The non-transitory computer-readable storage medium having the game program stored thereon according to claim 11, wherein:

performing the game process includes making a collision determination on whether or not the first object and/or the second object has collided against another object in the virtual space, and when the collision determination provides a positive determination result, performing a predetermined process on the another object; and making the collision determination includes, when it is determined in the movement start determination to start the predetermined action, further determining whether or not a predetermined region set between the first object and the second object has collided against the another object in the virtual space.

13. The non-transitory computer-readable storage medium having the game program stored thereon according to claim 11, wherein performing the track control includes, even while the predetermined action is being made, changing the track of the first object in accordance with the change in the attitude of the first operation device, and changing the track of the second object in accordance with the change in the attitude of the second operation device.

14. The non-transitory computer-readable storage medium having the game program stored thereon according to claim 10, wherein making the swing input determination includes determining whether or not the first swing input has been made based on whether or not the magnitude of acceleration represented by the first acceleration data has exceeded a first threshold value, and determining whether or not the second swing input has been made based on whether or not the magnitude of acceleration represented by the second acceleration data has exceeded a second threshold value.

15. The non-transitory computer-readable storage medium having the game program stored thereon according to claim 10, wherein making the movement direction setting includes calculating the attitude of the first operation device based on an inclination of a left-right direction axis of the first operation device with respect to a gravitational direction in a real space, and calculating the attitude of the second operation device based on an inclination of a left-right direction axis of the second operation device with respect to the gravitational direction.

16. The non-transitory computer-readable storage medium having the game program stored thereon according to claim 10, wherein performing the track control includes calculating the change in the attitude of the first operation device based on a change in a rotation angle of a left-right direction axis of the first operation device about a front-rear direction of the first operation device, and calculating the change in the attitude of the second operation device based on a change in a rotation angle of a left-right direction axis of the second operation device about a front-rear direction of the second operation device.

17. The non-transitory computer-readable storage medium having the game program stored thereon according to claim 10, wherein performing the track control includes calculating the change in the attitude of the first operation device based on a change in a rotation angle of a front-rear direction axis of the first operation device with respect to a gravitational direction in a real space, and calculating the change in the attitude of the second operation device based on a change in a rotation angle of a front-rear direction axis of the second operation device with respect to the gravitational direction.

18. The non-transitory computer-readable storage medium having the game program stored thereon according to claim 10, wherein performing the object movement control includes moving a player object based on both of the attitude of the first operation device based on at least the first angular velocity data and the attitude of the second operation device based on at least the second angular velocity data, and thus moving the first predetermined position and the second predetermined position set at positions with respect to the position of the player object.

19. A game system, comprising:
a first operation device and a second operation device each including an acceleration sensor and a gyrosensor; and
a game apparatus configured to execute a game process based on an operation made by use of the first operation device and the second operation device;
wherein:
the game apparatus includes a computer configured to:
acquire, from the first operation device, first operation data including first acceleration data based on a detection result provided by the acceleration sensor and first angular velocity data based on a detection result provided by the gyrosensor; and acquire, from the second operation device, second operation data including second acceleration data based on a detection result provided by the acceleration sensor and second angular velocity data based on a detection result provided by the gyrosensor;
make a swing input determination on whether or not a first swing input on the first operation device has been made based on at least the first acceleration data; and make the swing input determination on whether or not a second swing input on the second operation device has been made based on at least the second acceleration data;
perform an object movement control to control a movement of a first object in a virtual space based on the first operation data, and perform the object movement control to control a movement of a second object in the virtual space based on the second operation data; and
perform the game process based on the first object and the second object in the virtual space; and
in the object movement control, the computer is configured to:
make a movement start determination on whether or not to start moving the first object in the virtual space based on at least the first swing input when the first swing input is determined to have been made in a first movement start-possible state, in which the first object is allowed to start moving, and when the first object is put into the first movement start-possible state within a predetermined time period after the first swing input is determined to have been made; and make the movement start determination on whether or not to start moving the second object in the virtual space based on at least the second swing input when the second swing input is determined to have been made in a second movement start-possible state, in which the second object is allowed to start moving, and when the second object is put into the second movement start-possible state within a predetermined time period after the second swing input is determined to have been made;
calculate an attitude of the first operation device based on at least the first angular velocity data, and make a movement direction setting to set a movement direction of the first object in the virtual space based on the attitude of the first operation device; and calculate an attitude of the second operation device based on at least the second angular velocity data, and make the movement direction setting to set a movement direction of the second object in the virtual space based on the attitude of the second operation device;
start moving the first object in the movement direction set for the first object in the movement direction setting when it is determined in the movement start determination to start moving the first object; and start moving the second object in the movement direction set for the second object in the movement direction setting when it is determined in the movement start determination to start moving the second object;
perform a track control to change a track of the first object in the virtual space in accordance with a change in the attitude of the first operation device after the first object starts moving; and perform the track control to change a track of the second object in the virtual space in accordance with a change in the attitude of the second operation device after the second object starts moving; and
locate the first object at a first predetermined position to put the first object into the first movement start-possible state after the movement of the first object is finished based on a predetermined condition; and locate the second object at a second predetermined position to put the second object into the second movement start-possible state after the movement of the second object is finished based on a predetermined condition.

20. A game processing method for performing a game process based on an operation made by use of a first operation device and a second operation device each including an acceleration sensor and a gyrosensor, the game method comprising:
acquiring, from the first operation device, first operation data including first acceleration data based on a detection result provided by the acceleration sensor and first angular velocity data based on a detection result provided by the gyrosensor; and acquiring, from the second operation device, second operation data including second acceleration data based on a detection result provided by the acceleration sensor and second angular velocity data based on a detection result provided by the gyrosensor;
making a swing input determination on whether or not a first swing input on the first operation device has been made based on at least the first acceleration data; and making the swing input determination on whether or not a second swing input on the second operation device has been made based on at least the second acceleration data;
performing an object movement control to control a movement of a first object in a virtual space based on the first operation data, and performing the object movement control to control a movement of a second object in the virtual space based on the second operation data; and
performing the game process based on the first object and the second object in the virtual space;
wherein performing the object movement control includes:
making a movement start determination on whether or not to start moving the first object in the virtual space based on at least the first swing input when the first swing input is determined to have been made in a first movement start-possible state, in which the first object is allowed to start moving, and when the first object is put into the first movement start-possible state within a predetermined time period after the first swing input is determined to have been made; and making the movement start determination on whether or not to start moving the second object in the virtual space based on at least the second swing input when the second swing input is determined to have been made in a second movement start-possible state, in which the second object is allowed to start moving, and when the second object is put into the second movement start-possible state within a predetermined time period after the second swing input is determined to have been made;

calculating an attitude of the first operation device based on at least the first angular velocity data, and making a movement direction setting to set a movement direction of the first object in the virtual space based on the attitude of the first operation device; and calculating an attitude of the second operation device based on at least the second angular velocity data, and making the movement direction setting to set a movement direction of the second object in the virtual space based on the attitude of the second operation device;

starting moving the first object in the movement direction set for the first object in the movement direction setting when it is determined in the movement start determination to start moving the first object; and starting moving the second object in the movement direction set for the second object in the movement direction setting when it is determined in the movement start determination to start moving the second object;

performing a track control to change a track of the first object in the virtual space in accordance with a change in the attitude of the first operation device after the first object starts moving; and performing the track control to change a track of the second object in the virtual space in accordance with a change in the attitude of the second operation device after the second object starts moving; and locating the first object at a first predetermined position to put the first object into the first movement start-possible state after the movement of the first object is finished based on a predetermined condition; and locating the second object at a second predetermined position to put the second object into the second movement start-possible state after the movement of the second object is finished based on a predetermined condition.

* * * * *